(12) United States Patent
Nakazawa et al.

(10) Patent No.: US 12,720,182 B2
(45) Date of Patent: Aug. 25, 2026

(54) SOLID-STATE IMAGING ELEMENT, IMAGING DEVICE, AND METHOD FOR CONTROLLING SOLID-STATE IMAGING ELEMENT

(71) Applicant: Sony Semiconductor Solutions Corporation, Kanagawa (JP)

(72) Inventors: Keigo Nakazawa, Tokyo (JP); Ryohei Kawasaki, Tokyo (JP)

(73) Assignee: Sony Semiconductor Solutions Corporation, Kanagawa (JP)

( * ) Notice: Subject to any disclaimer, the term of this patent is extended or adjusted under 35 U.S.C. 154(b) by 106 days.

(21) Appl. No.: 18/838,491

(22) PCT Filed: Dec. 27, 2022

(86) PCT No.: PCT/JP2022/048207
§ 371 (c)(1),
(2) Date: Aug. 14, 2024

(87) PCT Pub. No.: WO2023/157489
PCT Pub. Date: Aug. 24, 2023

(65) Prior Publication Data

US 2025/0150730 A1 May 8, 2025

(30) Foreign Application Priority Data

Feb. 21, 2022 (JP) ................................ 2022-024398

(51) Int. Cl.
*H04N 25/78* (2023.01)
*G06V 10/12* (2022.01)
(Continued)

(52) U.S. Cl.
CPC ............. *H04N 23/61* (2023.01); *G06V 10/12* (2022.01); *H04N 23/80* (2023.01); *H04N 23/84* (2023.01);
(Continued)

(58) Field of Classification Search
CPC ........ H04N 23/61; H04N 23/80; H04N 23/84; H04N 25/531; H04N 25/532; H04N 25/65;
(Continued)

(56) References Cited

U.S. PATENT DOCUMENTS 6,959,099 B2 * 10/2005 Gutta .................. G06V 40/161 382/282
9,773,195 B2 * 9/2017 Feris ...................... G06V 10/82
(Continued)

FOREIGN PATENT DOCUMENTS

JP 2005287927 A 10/2005
JP 2018142954 A 9/2018
(Continued)

OTHER PUBLICATIONS

International Search Report (PCT/ISA/210), International Application No. PCT/JP2022/048207, dated Feb. 28, 2023.

*Primary Examiner* — Lin Ye
*Assistant Examiner* — Chriss S Yoder, III
(74) *Attorney, Agent, or Firm* — Michael Best & Friedrich LLP

(57) ABSTRACT

Improved frame image quality in a solid-state imaging element that processes the frame using metadata is disclosed. In one example, each of a plurality of pixels is provided with a sample-and-hold circuit that holds a pixel signal. A signal processing unit generates a first digital signal by performing signal processing on each of the held pixel signals, and generates a second digital signal by performing the signal processing on each of the held pixel signals. A metadata extraction unit extracts predetermined metadata from the first digital signal. An image processing unit performs predetermined image processing on the second digital signal using the metadata

17 Claims, 48 Drawing Sheets

(51) Int. Cl.

| | |
|---|---|
| ***G06V 10/764*** | (2022.01) |
| ***H04N 23/61*** | (2023.01) |
| ***H04N 23/80*** | (2023.01) |
| ***H04N 23/84*** | (2023.01) |
| ***H04N 25/531*** | (2023.01) |
| ***H04N 25/532*** | (2023.01) |
| ***H04N 25/65*** | (2023.01) |
| ***H04N 25/771*** | (2023.01) |
| *G06V 20/64* | (2022.01) |

(52) U.S. Cl.
CPC ......... *H04N 25/531* (2023.01); *H04N 25/532* (2023.01); *H04N 25/65* (2023.01); *H04N 25/771* (2023.01); *H04N 25/78* (2023.01); *G06V 10/764* (2022.01); *G06V 20/64* (2022.01); *G06V 2201/10* (2022.01)

(58) Field of Classification Search
CPC ...... H04N 25/78; H04N 25/771; G06V 10/12; G06V 10/764; G06V 20/64; G06V 2201/10
See application file for complete search history.

(56) References Cited

U.S. PATENT DOCUMENTS

| | | | | |
|---|---|---|---|---|
| 12,047,701 | B2 * | 7/2024 | Asakura | H04N 25/78 |
| 2008/0180539 | A1 * | 7/2008 | Jung | H04N 5/272<br>348/222.1 |
| 2022/0159176 | A1 * | 5/2022 | Vemury | G06T 7/70 |

FOREIGN PATENT DOCUMENTS

| | | | |
|---|---|---|---|
| JP | 2020054007 | A | 4/2020 |
| JP | 2021033686 | A | 3/2021 |
| WO | 2017099037 | A1 | 6/2017 |
| WO | 2021215105 | A1 | 10/2021 |

* cited by examiner a b a b a b a b a b

FIG. 47

| OPERATION | NOISE | RN ( μ Vrms) | | REMARKS |
|---|---|---|---|---|
| | | FIRST EMBODIMENT | SEVENTH EMBODIMENT | |
| GLOBAL SHUTTER | PIXEL kTC NOISE | 450 | 450 | SH CAPACITANCE 50fF |
| SEQUENTIAL READING | NOISE OF PRE-STAGE SF | 380 | 0 | — |
| | NOISE AFTER SF IN SUBSEQUENT STAGE | 160 | 160 | INCLUDING ADC NOISE |
| TOTAL | | 610 | 478 | — |

FIG. 48

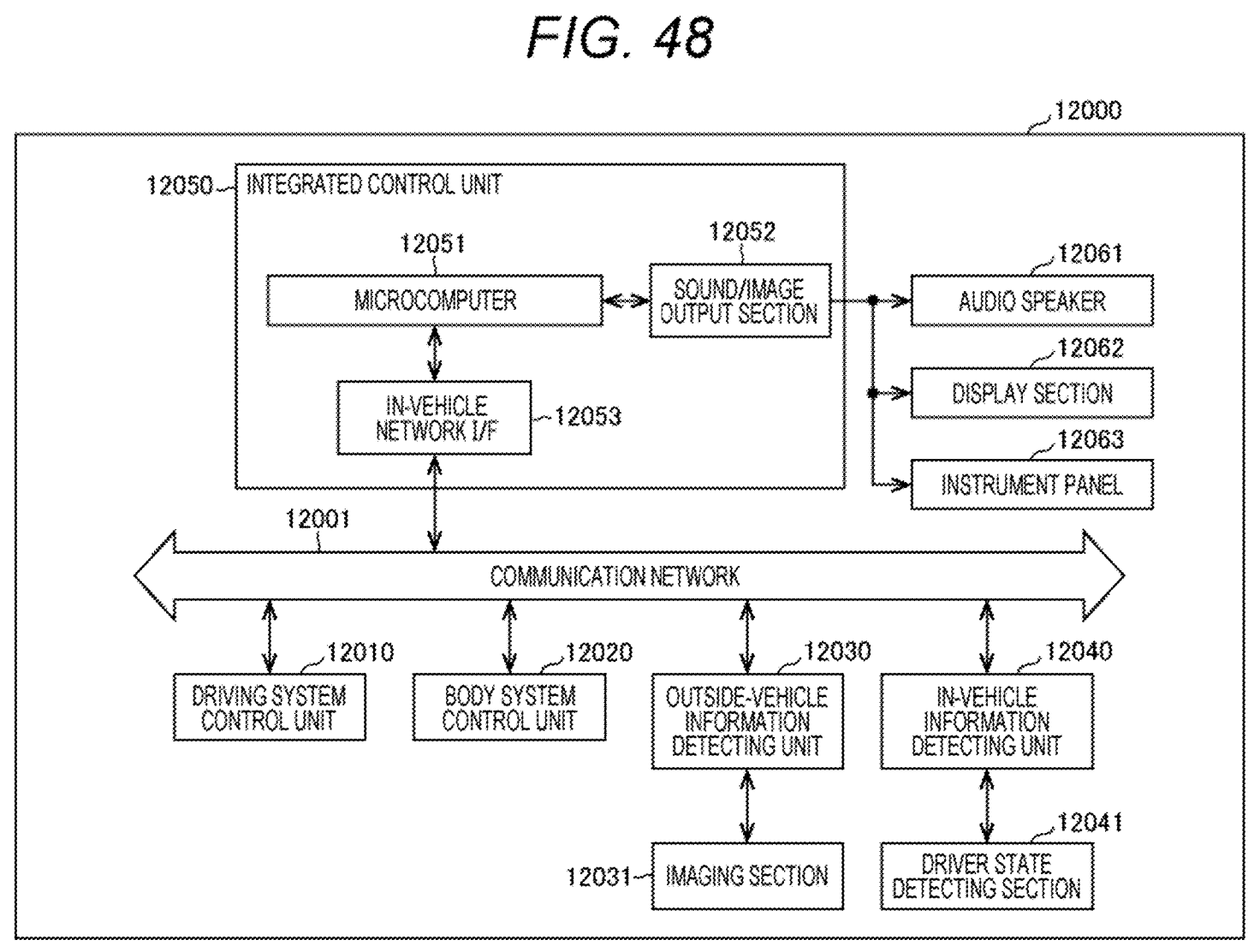

12000
12050 INTEGRATED CONTROL UNIT
12051 MICROCOMPUTER
12052 SOUND/IMAGE OUTPUT SECTION
12053 IN-VEHICLE NETWORK I/F
12061 AUDIO SPEAKER
12062 DISPLAY SECTION
12063 INSTRUMENT PANEL
12001 COMMUNICATION NETWORK
12010 DRIVING SYSTEM CONTROL UNIT
12020 BODY SYSTEM CONTROL UNIT
12030 OUTSIDE-VEHICLE INFORMATION DETECTING UNIT
12031 IMAGING SECTION
12040 IN-VEHICLE INFORMATION DETECTING UNIT
12041 DRIVER STATE DETECTING SECTION

SOLID-STATE IMAGING ELEMENT, IMAGING DEVICE, AND METHOD FOR CONTROLLING SOLID-STATE IMAGING ELEMENT

TECHNICAL FIELD

The present technology relates to a solid-state imaging element. Specifically, the present technology relates to a solid-state imaging element that performs exposure using a global shutter method, an imaging device, and a method for controlling a solid-state imaging element.

BACKGROUND ART

Conventionally, in imaging devices and the like, a global shutter method of simultaneously exposing all pixels has been widely used in order to avoid rolling shutter distortion. For example, there has been proposed a solid-state imaging element that performs object recognition on image data (in other words, frames) captured using a global shutter method and generates metadata indicating the result (see, for example, Patent Document 1).

CITATION LIST

Patent Document

Patent Document 1: Japanese Patent Application Laid-Open No. 2020-054007

SUMMARY OF THE INVENTION

Problems to be Solved by the Invention

By using the above-described related art, the solid-state imaging element can process the next frame F2 using metadata generated from a certain frame F1. However, in a case where the subject to be recognized is a moving body, the position of the subject may change between the frame F1 and the frame F2, and if the metadata of the frame F1 is used, there is a possibility that appropriate image processing based on a recognition result cannot be performed.

The present technology has been made in view of such a situation, and an object of the present technology is to perform appropriate image processing in a solid-state imaging element that processes frames using metadata.

Solutions to Problems

The present technology has been made to solve the above-described problems, and a first aspect thereof relates to a solid-state imaging element and a method for controlling the same, the solid-state imaging element including: a plurality of pixels each provided with a sample-and-hold circuit that holds a pixel signal; an analog-to-digital conversion unit that generates a first digital signal by performing analog-to-digital conversion processing on each of the held pixel signals and generates a second digital signal by performing the analog-to-digital conversion processing on each of the held pixel signals; a metadata extraction unit that extracts predetermined metadata from the first digital signal; and an image processing unit that performs predetermined image processing on the second digital signal using the metadata. This brings about an effect that appropriate image processing is executed.

Furthermore, in the first aspect, the metadata extraction unit may perform recognition processing of recognizing a predetermined object on a frame in which the first digital signals are arranged, and generate data indicating a result of the recognition processing as the metadata. This brings about an effect that appropriate image processing is executed based on the recognized result.

Furthermore, in the first aspect, the metadata may indicate a predetermined region, and the image processing unit may perform processing of replacing a color in the region with a specific color. This brings about an effect that a predetermined object is hidden.

Furthermore, in the first aspect, the metadata may indicate a predetermined region, and the image processing unit may perform mosaic processing on the region. This brings about an effect that a predetermined object is hidden.

Furthermore, in the first aspect, the metadata may indicate a predetermined region, and the image processing unit may extract the region as a region of interest from a frame in which the second digital signals are arranged. This brings about an effect that predetermined processing is performed on the region of interest.

Furthermore, in the first aspect, each of the plurality of pixels may include: a pre-stage circuit that generates a pixel signal; a sample-and-hold circuit that holds the pixel signal; and a post-stage circuit that reads the pixel signal from the sample-and-hold circuit and outputs the read pixel signal. This brings about an effect that pixel signals are held for each pixel.

Furthermore, in the first aspect, the sample-and-hold circuit may include: first and second capacitor elements; and a selection circuit that sequentially performs control to connect one of the first and second capacitor elements to a predetermined post-stage node and control to connect another of the first and second capacitor elements to the post-stage node. This brings about an effect that the reset level and signal level are held.

Furthermore, in the first aspect, the selection circuit may sequentially perform control to connect one of the first and second capacitor elements to a predetermined post-stage node, control to disconnect both the first and second capacitor elements from the post-stage node, and control to connect another of the first and second capacitor elements to the post-stage node. This brings about an effect of reducing noise.

Furthermore, in the first aspect, each of the plurality of pixels may further include a post-stage reset transistor that initializes a level of the post-stage node when both the first and second capacitor elements are disconnected from the post-stage node. This brings about an effect of reducing noise.

Furthermore, a second aspect of the present technology relates to an imaging device including: a plurality of pixels each provided with a sample-and-hold circuit that holds a pixel signal; a signal processing unit that generates a first digital signal by performing signal processing on each of the held pixel signals and generates a second digital signal by performing the signal processing on each of the held pixel signals; a metadata extraction unit that extracts predetermined metadata from the first digital signal; an image processing unit that performs predetermined image processing on the second digital signal using the metadata; and a recording unit that records a frame in which the second digital signals subjected to the processing are arranged. This brings about an effect that appropriate image processing is executed on the frame captured by the imaging device.

BRIEF DESCRIPTION OF DRAWINGS

FIG. 3 is a circuit diagram illustrating a configuration example of a pixel in a charge domain method according to the first embodiment of the present technology.

FIG. 47 is a diagram for describing effects according to the eighth embodiment of the present technology.

FIG. 48 is a block diagram illustrating a schematic configuration example of a vehicle control system.

MODE FOR CARRYING OUT THE INVENTION

Modes for carrying out the present technology (hereinafter referred to as embodiments) are hereinafter described. The description will be given in the following order.

1. First Embodiment (Example of Holding Pixel Signal and Performing Signal Processing Twice)
2. Second Embodiment (Example of Adding Post-Stage Reset Transistor, Holding Pixel Signal, and Performing Signal Processing Twice)
3. Third Embodiment (Example of Adding Discharge Transistor, Holding Pixel Signal, and Performing Signal Processing Twice)
4. Fourth Embodiment (Example of Holding Pixel Signal and Performing Signal Processing Twice to Control Reset Power Supply Voltage)
5. Fifth Embodiment (Example of Holding Pixel Signal and Performing Signal Processing Twice to Switch Levels to Be Held for Each Frame)
6. Sixth Embodiment (Example of Holding Pixel Signal and Performing Signal Processing Twice to Suppress Black Spot Phenomenon)
7. Seventh Embodiment (Example of Holding Pixel Signal and Performing Signal Processing Twice to Perform Rolling Shutter Operation)
8. Eighth Embodiment (Example of Turning Off Pre-stage Source Follower During Reading, Holding Pixel Signal, and Performing Signal Processing Twice)
9. Application Example to Mobile Body

1. First Embodiment

Configuration Example of Imaging Device

Figure 1:
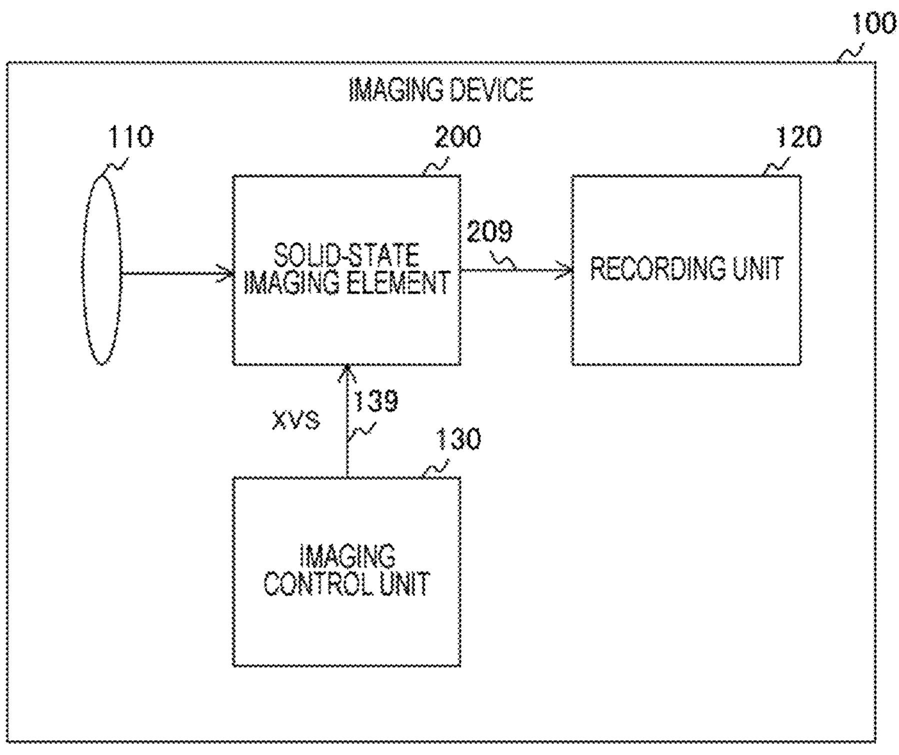
FIG. 1 is a block diagram illustrating a configuration example of an imaging device according to a first embodiment of the present technology.

FIG. 1 is a block diagram illustrating a configuration example of an imaging device 100 according to a first embodiment of the present technology. The imaging device 100 is a device that captures image data, and includes an imaging lens 110, a solid-state imaging element 200, a recording unit 120, and an imaging control unit 130. As the imaging device 100, a digital camera or an electronic device (a smartphone, a personal computer, or the like) having an imaging function is assumed.

The solid-state imaging element 200 captures image data (frames) under control of the imaging control unit 130. The solid-state imaging element 200 supplies frames to the recording unit 120 via a signal line 209.

The imaging lens 110 condenses light and guides the light to the solid-state imaging element 200. The imaging control unit 130 controls the solid-state imaging element 200 to capture frames. For example, the imaging control unit 130 supplies an imaging control signal including a vertical synchronization signal XVS to the solid-state imaging element 200 via a signal line 139. The recording unit 120 records frames.

Here, the vertical synchronization signal XVS is a signal indicating imaging timing, and a periodic signal of a constant frequency (60 hertz or the like) is used as the vertical synchronization signal XVS.

Note that, although the imaging device 100 records frames, the frames may be transmitted to the outside of the imaging device 100. In this case, an external interface for transmitting frames is further provided. Alternatively, the imaging device 100 may further display frames. In this case, a display section is further provided.

Configuration Example of Solid-State Imaging Element

Figure 2:
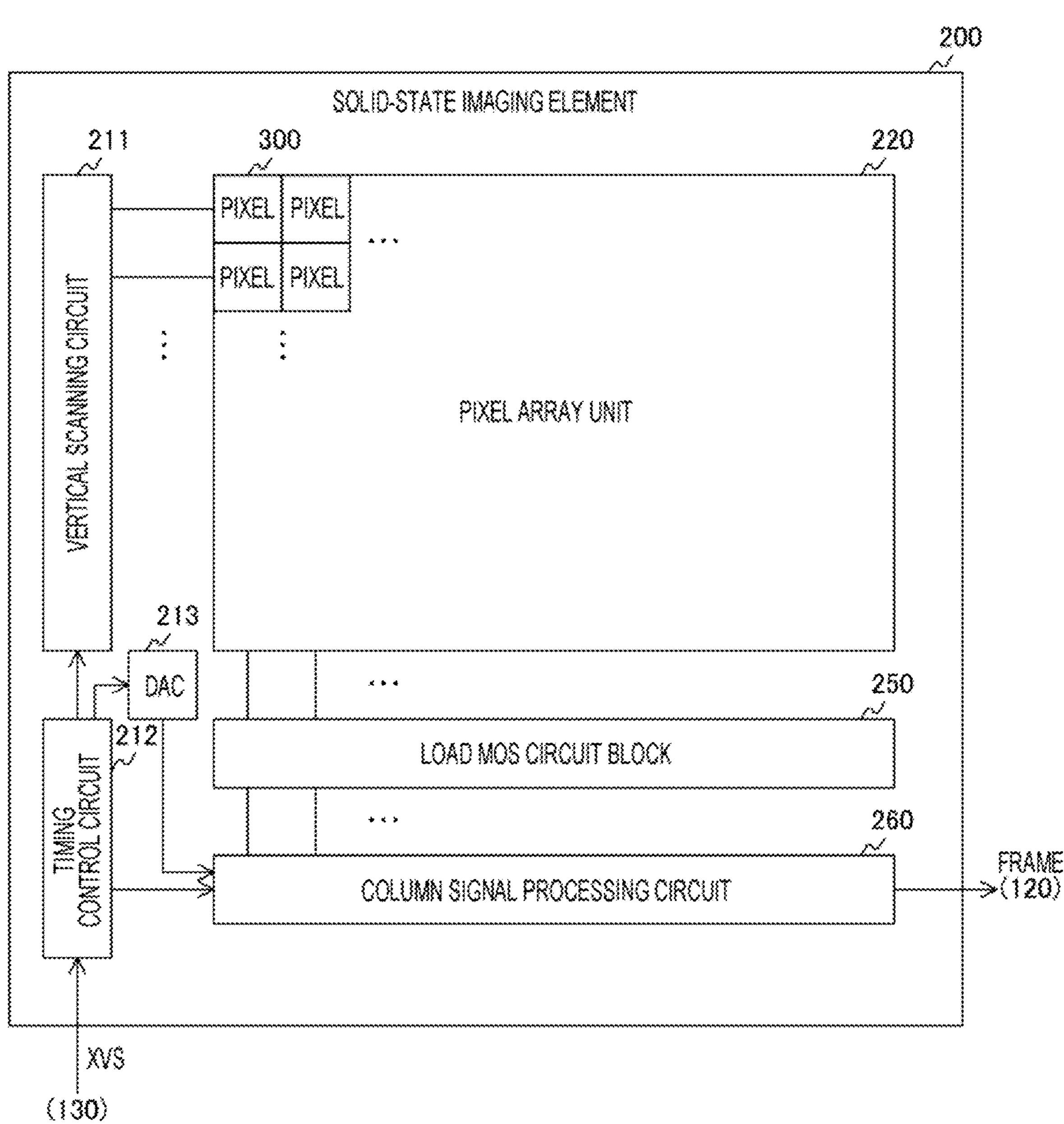
FIG. 2 is a block diagram illustrating a configuration example of a solid-state imaging element according to the first embodiment of the present technology.

FIG. 2 is a block diagram illustrating a configuration example of the solid-state imaging element 200 according to the first embodiment of the present technology. The solid-state imaging element 200 includes a vertical scanning circuit 211, a pixel array unit 220, a timing control circuit 212, a digital to analog converter (DAC) 213, a load MOS circuit block 250, and a column signal processing circuit 260. In the pixel array unit 220, a plurality of pixels 300 is arranged in a two-dimensional grid pattern. Furthermore, each circuit in the solid-state imaging element 200 is provided in, for example, a single semiconductor chip.

Hereinafter, a set of pixels 300 arranged in a horizontal direction is referred to as "row", and a set of pixels 300 arranged in a direction perpendicular to the row is referred to as "column".

The timing control circuit 212 controls operation timings of each of the vertical scanning circuit 211, the DAC 213, and the column signal processing circuit 260 in synchronization with the vertical synchronization signal XVS from the imaging control unit 130.

The DAC 213 generates a sawtooth-shaped ramp signal by digital to analog (DA) conversion. The DAC 213 supplies the generated ramp signal to the column signal processing circuit 260.

The vertical scanning circuit 211 sequentially selects and drives rows to output analog pixel signals. The pixel 300 photoelectrically converts incident light to generate the analog pixel signal. This pixel 300 supplies a pixel signal to the column signal processing circuit 260 via the load MOS circuit block 250.

In the load MOS circuit block 250, a MOS transistor that supplies a constant current is provided for each column.

The column signal processing circuit 260 executes signal processing such as AD conversion processing or CDS processing on the pixel signal for each column. The column signal processing circuit 260 supplies image data (frame) including the processed signals to the recording unit 120.

Configuration Example of Pixel

Figure 3:
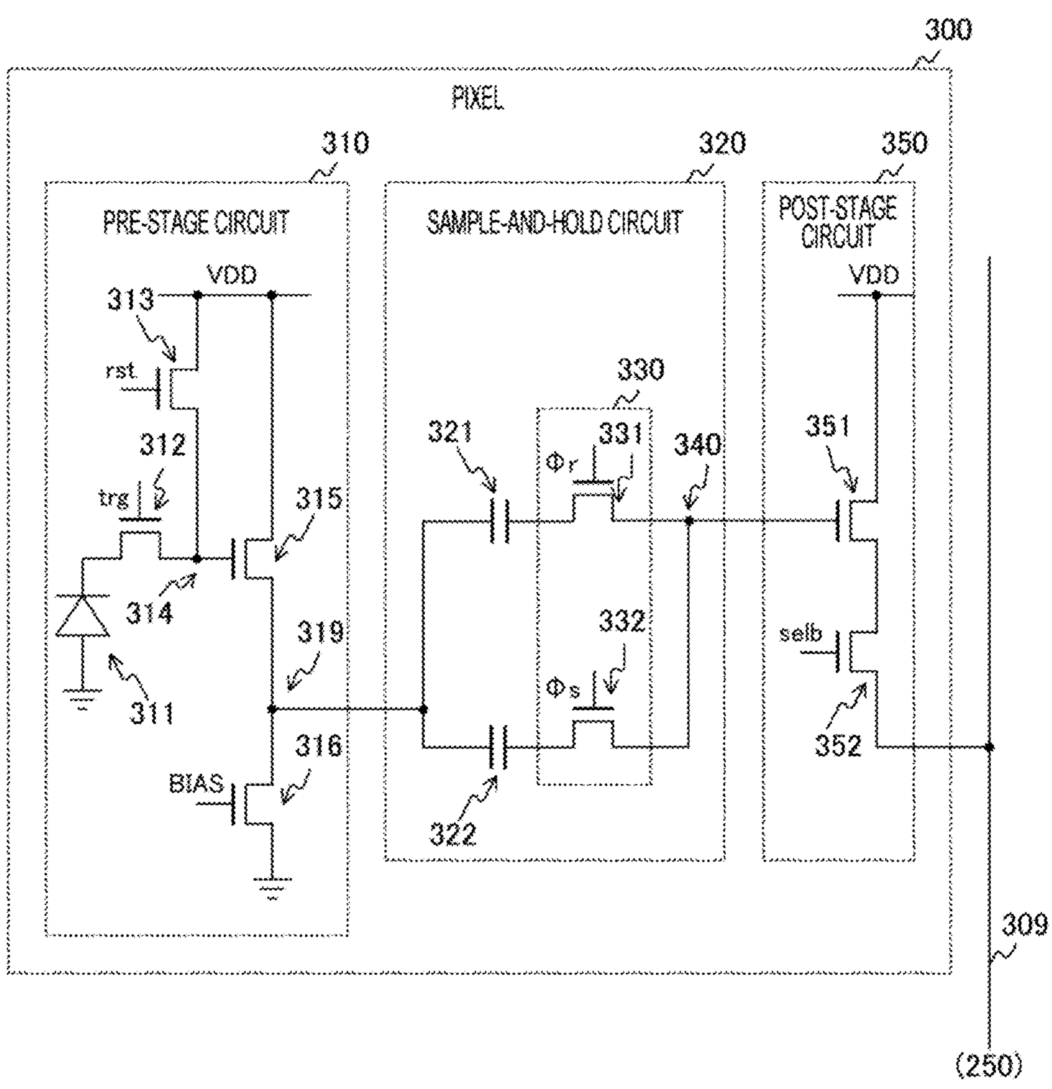
FIG. 3 is a circuit diagram illustrating a configuration example of a pixel according to the first embodiment of the present technology.

FIG. 3 is a circuit diagram illustrating a configuration example of the pixel 300 according to the first embodiment of the present technology. The pixel 300 includes a pre-stage circuit 310, a sample-and-hold circuit 320, and a post-stage circuit 350. In the pixel array unit 220, a vertical signal line 309 is wired for each column.

The pre-stage circuit 310 includes a photoelectric conversion element 311, a transfer transistor 312, a floating diffusion (FD) reset transistor 313, an FD 314, a pre-stage amplification transistor 315, and a current source transistor 316.

The photoelectric conversion element 311 generates Charges by the photoelectric conversion. The transfer transistor 312 transfers the charges from the photoelectric conversion element 311 to the FD 314 in accordance with a transfer signal trg from the vertical scanning circuit 211.

The FD reset transistor 313 extracts the charges from the FD 314 to initialize the FD 314 in accordance with an FD reset signal rst from the vertical scanning circuit 211. The FD 314 accumulates charges, and generates a voltage corresponding to a charge amount. The pre-stage amplification transistor 315 amplifies a level of a voltage of the FD 314, and outputs the amplified voltage to a pre-stage node 319.

Furthermore, the FD reset transistor 313 and the pre-stage amplification transistor 315 have their respective sources connected to a power supply voltage VDD. The current source transistor 316 is connected to a drain of the pre-stage amplification transistor 315. A predetermined bias voltage BIAS is supplied to a gate of this current source transistor 316.

The sample-and-hold circuit 320 includes capacitor elements 321 and 322 and a selection circuit 330. The capacitor elements 321 and 322 have their respective one ends commonly connected to the pre-stage node 319 and have their respective other ends connected to the selection circuit 330. Note that the capacitor elements 321 and 322 are examples of first and second capacitor elements described in the claims.

The selection circuit 330 includes a selection transistor 331 and a selection transistor 332. The selection transistor 331 opens and closes a path between the capacitor element 321 and a post-stage node 340 in accordance with a selection signal ør from the vertical scanning circuit 211. The selection transistor 332 opens and closes a path between the capacitor element 322 and the post-stage node 340 in accordance with a selection signal Φs from the vertical scanning circuit 211.

The post-stage circuit 350 includes a post-stage amplification transistor 351, and a post-stage selection transistor 352. The post-stage amplification transistor 351 amplifies the level of the post-stage node 340. The post-stage selection transistor 352 outputs a signal at the level amplified by the post-stage amplification transistor 351 to a vertical signal line 309 as a pixel signal in accordance with a post-stage selection signal selb from the vertical scanning circuit 211.

Note that, for example, n-channel metal oxide semiconductor (nMOS) transistors are used as various transistors (transfer transistor 312 and the like) in the pixel 300.

The vertical scanning circuit 211 supplies a high-level FD reset signal rst and a high-level transfer signal trg to all pixels at the start of exposure. Accordingly, the photoelectric conversion element 311 is initialized. Hereinafter, this control is referred to as "PD reset".

Then, the vertical scanning circuit 211 supplies a high-level FD reset signal rst over a pulse period while setting the selection signal Φr to the high level for all pixels immediately before the end of exposure. Accordingly, the FD 314 is initialized, and a level corresponding to the level of the FD 314 at that time is held in the capacitor element 321. This control is hereinafter referred to as "FD reset".

The level of the FD 314 at the time of FD reset and a level corresponding to the level of the FD 314 (the level held in the capacitor element 321 and the level of the vertical signal line 309) are hereinafter collectively referred to as "P-phase" or "reset level".

At the end of exposure, the vertical scanning circuit 211 supplies a high-level transfer signal trg over the pulse period while setting the selection signal Φs to the high level for all pixels. Accordingly, signal Charges corresponding to an exposure amount are transferred to the FD 314, and a level corresponding to the level of the FD 314 at that time is held in the capacitor element 322.

The level of the FD 314 during signal charge transfer and a level corresponding to the level of the FD 314 (the level held in the capacitor element 322 and the level of the vertical signal line 309) are hereinafter collectively referred to as "D-phase" or "signal level".

The exposure control of simultaneously starting and ending the exposure for all pixels in this manner is called a global shutter method. Through this exposure control, the pre-stage circuit 310 of all pixels generates pixel signals (reset level and signal level). The reset level of the pixel signal is held in the capacitor element 321, and the signal level is held in the capacitor element 322.

After the end of exposure, the vertical scanning circuit 211 sequentially selects a row, and sequentially outputs the reset level and the signal level of the row. In a case of outputting the reset level, the vertical scanning circuit 211 supplies a high-level selection signal Ør over a predetermined period while setting the FD reset signal rst and the post-stage selection signal selb of the selected row to the high level. Accordingly, the capacitor element 321 is connected to the post-stage node 340, and the reset level is read.

After reading the reset level, the vertical scanning circuit 211 supplies a high-level selection signal Φs over a predetermined period while keeping the FD reset signal rst and the post-stage selection signal selb of the selected row at the high level. Accordingly, the capacitor element 322 is connected to the post-stage node 340, and the signal level is read.

Through the above-described read control, the selection circuit 330 of the selected row sequentially performs control to connect the capacitor element 321 to the post-stage node 340, and control to connect the capacitor element 322 to the post-stage node 340. Furthermore, the post-stage circuit 350 of the selected row sequentially reads the pixel signal (reset level and signal level) from the sample-and-hold circuit 320 via the post-stage node 340, and outputs the pixel signal to the vertical signal line 309.

Configuration Example of Column Signal Processing Circuit

Figure 4:
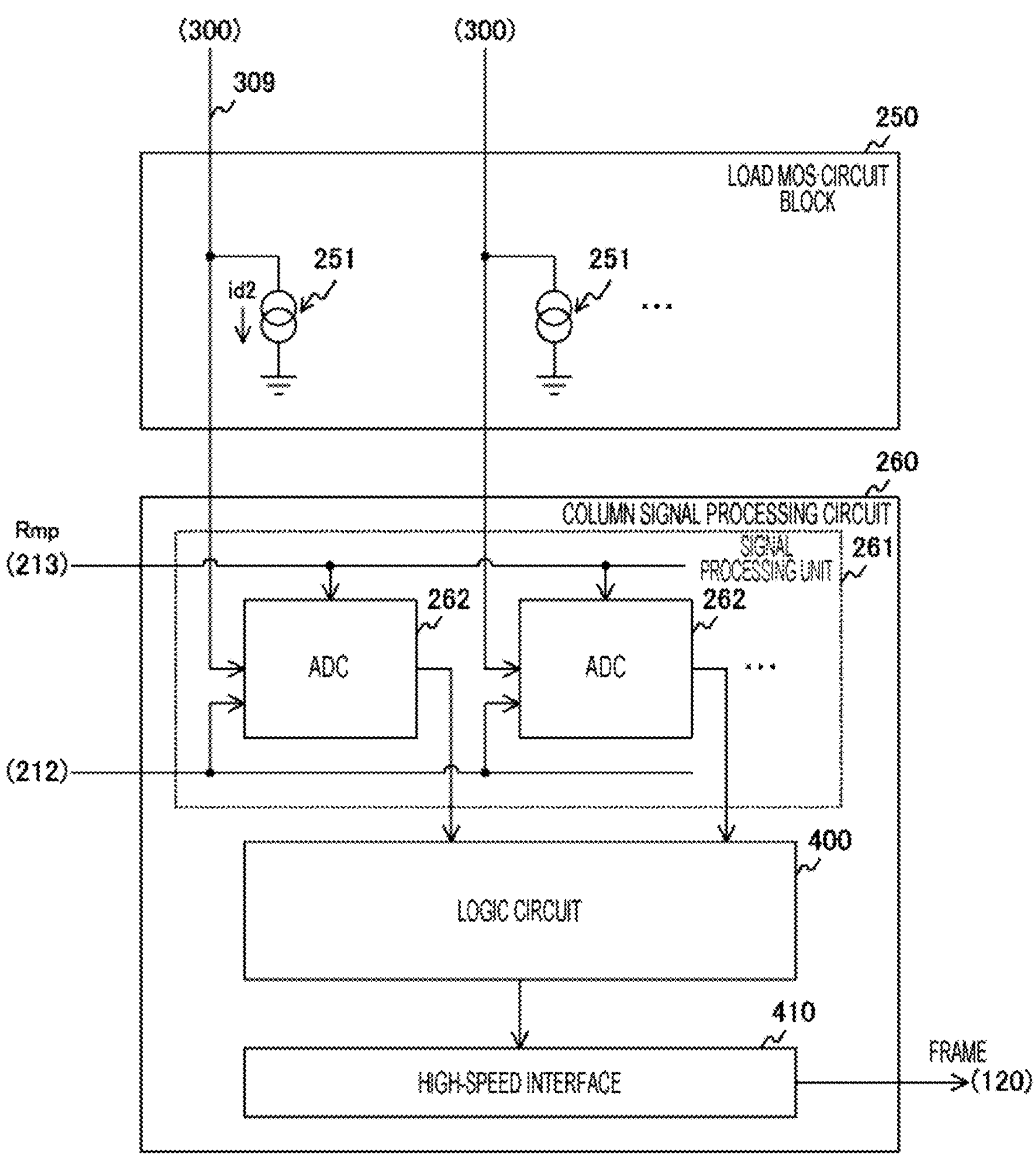
FIG. 4 is a block diagram illustrating a configuration example of a load metal oxide semiconductor (MOS) circuit block and a column signal processing circuit according to the first embodiment of the present technology.

FIG. 4 is a block diagram illustrating a configuration example of the load MOS circuit block 250 and the column signal processing circuit 260 according to the first embodiment of the present technology.

In the load MOS circuit block 250, the vertical signal line 309 is wired for each column. In a case where the number of columns is I (I is an integer), I vertical signal lines 309 are wired. Furthermore, a load MOS transistor 251 that supplies a constant current id2 is connected to each of the vertical signal lines 309.

In the column signal processing circuit 260, a signal processing unit 261, a logic circuit 400, and a high-speed interface 410 are disposed. The signal processing unit 261 includes a plurality of ADCs 262. The ADC 262 is disposed for each column. In a case where the number of columns is I, I ADCs 262 are disposed.

The ADC 262 converts an analog pixel signal from the corresponding column into a digital signal using a ramp signal Rmp from the DAC 213. The ADC 262 supplies a digital signal to the logic circuit 400. For example, a single-slope ADC including a comparator and a counter is disposed as the ADC 262. For example, the counter in the ADC 262 performs down counting when the reset level is AD-converted, and performs up counting when the signal level is AD-converted. Accordingly, correlated double sampling (CDS) processing of obtaining a difference between the reset level and the signal level is performed. Note that a CDS circuit may be added in the signal processing unit 261, the ADC 262 may perform only AD conversion processing, and the CDS circuit may perform CDS processing. In this way, the signal processing unit 261 performs signal processing including AD conversion processing and CDS processing.

The logic circuit 400 performs various types of signal processing other than CDS processing on each of the digital signals for each column. The logic circuit 400 supplies a frame including the processed digital signal to the high-speed interface 410. The high-speed interface 410 outputs the frame to the recording unit 120.

Note that the circuit configuration of the pixel 300 is not limited to that illustrated in FIG. 3 as long as the pixel signal can be generated and sampled and held.

Figure 5:
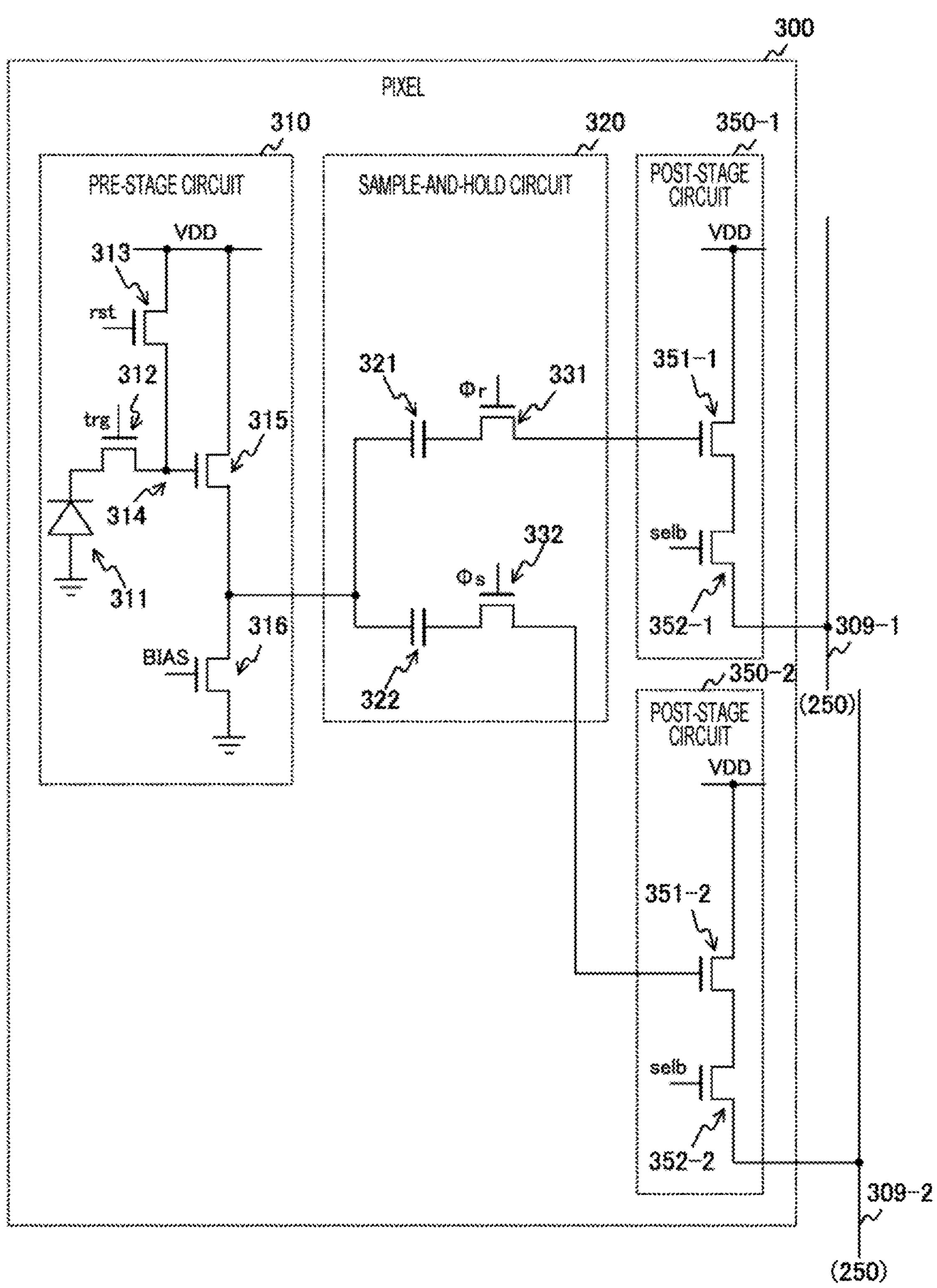
FIG. 5 is a circuit diagram illustrating a configuration example of a pixel provided with two systems of post-stage circuits according to the first embodiment of the present technology.

For example, as illustrated in FIG. 5, two systems of post-stage circuit can be provided for each pixel. In this case, it is sufficient if the selection transistor 331 opens and closes the path between the capacitor element 321 and the post-stage circuit 350-1, and the selection transistor 332 opens and closes the path between the capacitor element 322 and the post-stage circuit 350-2. The post-stage circuit 350-1 includes a post-stage amplification transistor 351-1 and a post-stage selection transistor 352-1, and the post-stage circuit 350-2 includes a post-stage amplification transistor 351-2 and a post-stage selection transistor 352-2. Furthermore, two vertical signal lines are wired for each column, the post-stage circuit 350-1 outputs a pixel signal to a vertical signal line 309-1, and the post-stage circuit 350-2 outputs a pixel signal to a vertical signal line 309-2.

Figure 6:
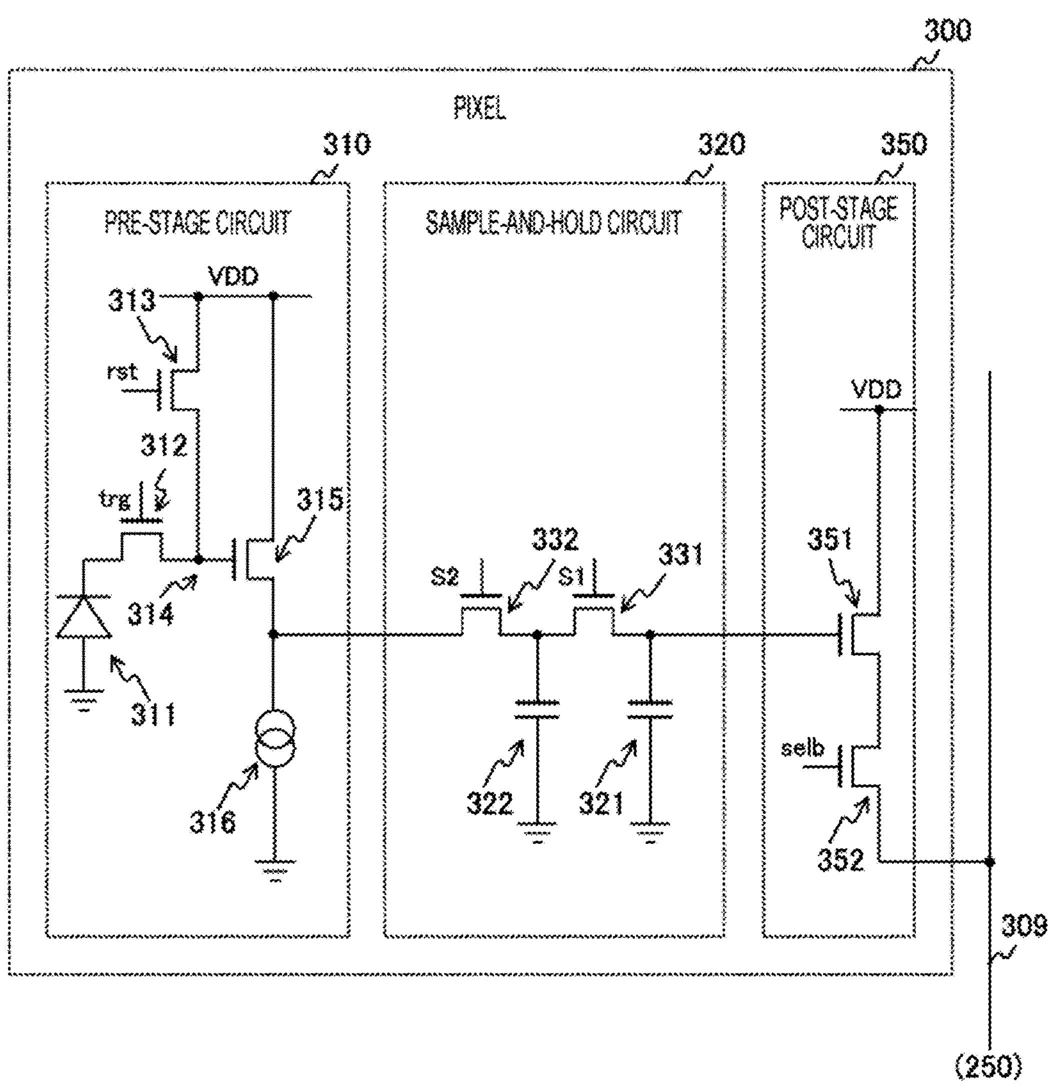
FIG. 6 is a circuit diagram illustrating another example of the pixel according to the first embodiment of the present technology.

Furthermore, as illustrated in FIG. 6, the selection transistors 331 and 332 can be connected in series between the pre-stage circuit 310 and the post-stage circuit 350. In this case, the capacitor element 322 is connected to a connection node between the selection transistors 331 and 332, and the capacitor element 321 is connected to a connection node between the selection transistor 331 and the post-stage circuit 350. The control method for this sample-and-hold circuit 320 is described in, for example, "Chen Xu et al., A Stacked Global-Shutter CMOS Imager with SC-Type Hybrid-GS Pixel and Self-Knee Point Calibration Single-Frame HDR and On-Chip Binarization Algorithm for Smart Vision Applications ISSCC2019".

Figure 7:
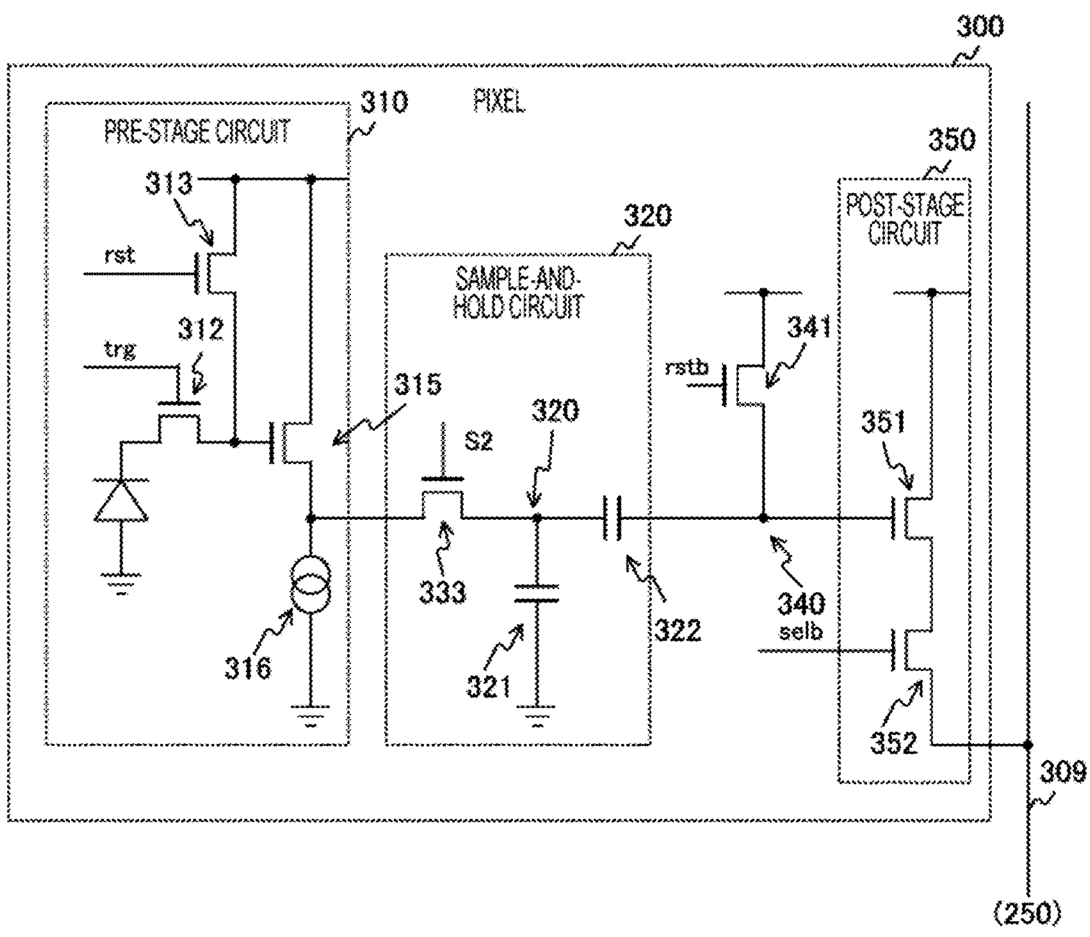
FIG. 7 is a circuit diagram illustrating a configuration example of a pixel in which the number of transistors in a sample-and-hold circuit is reduced in the first embodiment of the present technology.

Furthermore, as illustrated in FIG. 7, a sampling transistor 333 and the capacitor element 321 can be inserted in series between the pre-stage circuit 310 and the post-stage circuit 350, and the capacitor element 322 can also be connected to their connection node. In this case, a post-stage reset transistor 341 that initializes the post-stage node 340 is further provided. The control method for this circuit is described in, for example, "Jae-kyu Lee, et al., A 2.1e-Temporal Noise and −105 dB Parasitic Light Sensitivity Backside-Illuminated 2.3 μm-Pixel Voltage-Domain Global Shutter CMOS Image Sensor Using High-Capacity DRAM Capacitor Technology, ISSCC 2020".

Figure 8:
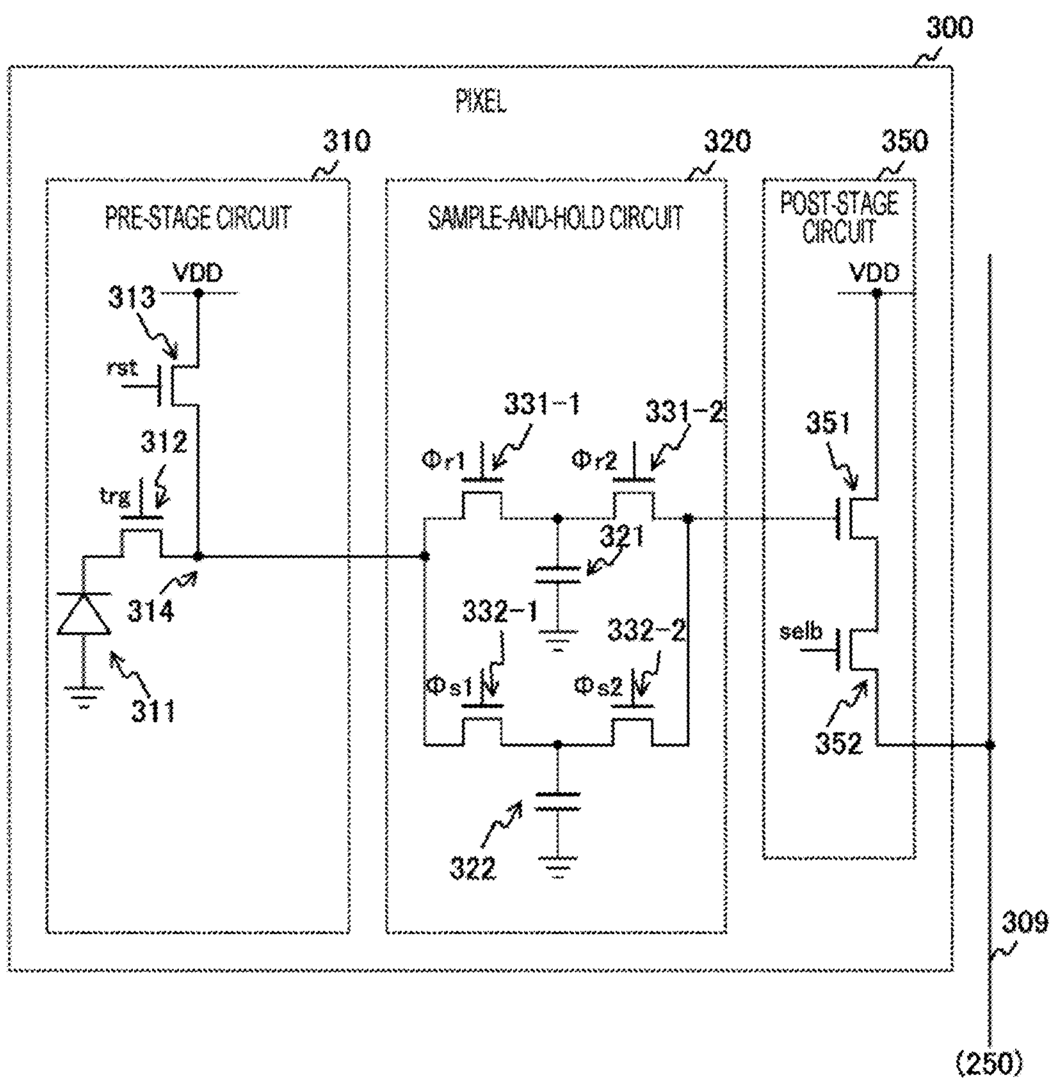

Each of the sample-and-hold circuits 320 in FIGS. 3, 5, 6, and 7 described above is a circuit in a voltage domain method that holds a voltage, but a circuit in a charge domain method that holds a charge can also be used as illustrated in FIG. 8.

In the charge domain method of FIG. 8, for example, selection transistors 331-1 and 331-2 are inserted in series between the pre-stage circuit 310 and the post-stage circuit 350. In addition, the selection transistors 332-1 and 332-2 connected in series are inserted in parallel to the circuit including the selection transistors 331-1 and 331-2. The capacitor element 321 is connected to a connection node between the selection transistors 331-1 and 331-2, and the capacitor element 322 is connected to a connection node between the selection transistors 332-1 and 332-2.

Configuration Example of Logic Circuit

Figure 9:
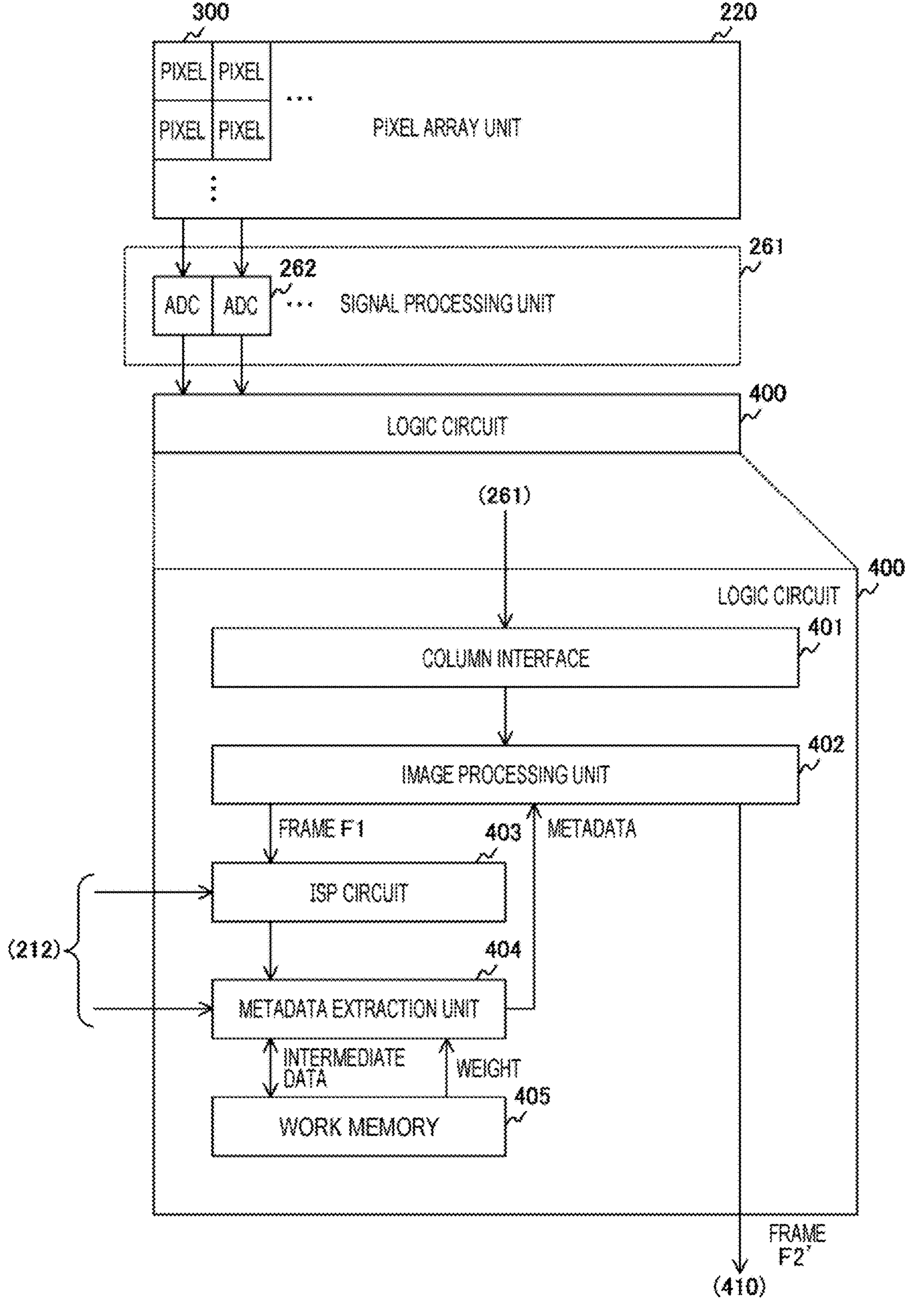
FIG. 9 is a block diagram illustrating a configuration example of a logic circuit according to the first embodiment of the present technology.

FIG. 9 is a block diagram illustrating a configuration example of the logic circuit 400 according to the first embodiment of the present technology. The logic circuit 400 includes a column interface 401, an image processing unit 402, an image signal processor (ISP) circuit 403, a metadata extraction unit 404, and a work memory 405.

Here, each of the above-described pixels 300 holds a pixel signal in synchronization with the vertical synchronization signal XVS. The signal processing unit 261 performs signal processing (AD conversion processing and CDS processing) of converting a pixel signal into a digital signal after CDS processing for each pixel twice in synchronization with the vertical synchronization signal XVS. Since each of the signal processing includes AD conversion processing for the reset level, and AD conversion processing and CDS processing for the signal level, four times of AD conversion processing and two times of CDS processing are executed in two times of signal processing.

The column interface 401 receives digital signals from the signal processing unit 261 and supplies image data (frame) in which the digital signals are arranged to the image processing unit 402. Since the signal processing is performed twice for each pixel in synchronization with the vertical synchronization signal XVS, two frames are generated for each period of the vertical synchronization signal XVS. These frames are the same data, but hereinafter, a first frame will be referred to as "F1" and a second frame will be referred to as "F2" in order to distinguish them.

The image processing unit 402 performs various types of processing such as correction of a defective pixel and dark correction on the frame from the column interface 401. The image processing unit 402 processes the first frame F1 and supplies the frame F1 to the ISP circuit 403.

The ISP circuit 403 performs processing for reducing the data amount on the frame F1 as necessary. In a case where the processing load of the metadata extraction unit 404 is large, the data amount is reduced by the ISP circuit 403. For example, downscaling and tone reduction are performed. Furthermore, in a case where the image from the signal processing unit 261 is a Bayer array image and the format of the input image of the metadata extraction unit 404 is a color image of three colors of R, G, and B for each pixel, the ISP circuit 403 executes demosaic processing of converting the Bayer array image into a color image. The ISP circuit 403 supplies the processed frame F1 to the metadata extraction unit 404.

The metadata extraction unit 404 extracts predetermined metadata from the frame F1. For example, the metadata extraction unit 404 performs recognition processing of recognizing a predetermined object on the frame F1, and generates data indicating the processing result as metadata. The metadata includes, for example, information as to whether or not the recognition target has been recognized, information about the type, name, and attribute of the recognized object, information indicating the region of the object, and the like. The attribute includes, for example, gender, age, and the like. The metadata extraction unit 404 supplies the extracted metadata to the image processing unit 402.

The work memory 405 holds data used in the recognition processing. For example, recognition processing is executed by a neural network, and intermediate data exchanged between layers in the neural network is temporarily held in the work memory 405. Further, weights used in the neural network are held in the work memory 405 in advance.

The image processing unit 402 performs predetermined processing on the second frame F2 using the metadata extracted from the first frame F1. For example, processing of replacing the color of the region of the object indicated by the metadata with a specific color (black or the like) is performed on the frame F2. The image processing unit 402 supplies the processed frame as F2' to the high-speed interface 410.

As described above, each of the pixels 300 is provided with a sample-and-hold circuit that holds a pixel signal. In synchronization with the vertical synchronization signal XVS, the signal processing unit 261 performs processing of generating a digital signal after CDS processing twice by signal processing (AD conversion processing and CDS processing) for each of the pixel signals held in the pixel 300. The frame in which the first digital signals are arranged is F1, and the frame in which the second digital signals are arranged is F2. Note that the first digital signal is an example of a first digital signal described in the claims, and the second digital signal is an example of a second digital signal described in the claims.

The metadata extraction unit 404 extracts metadata from the frame F1 and supplies the metadata to the image processing unit 402. The image processing unit 402 performs predetermined processing on the frame F2 using the metadata of the frame F1.

Operation Example of Solid-State Imaging Element

Figure 10:
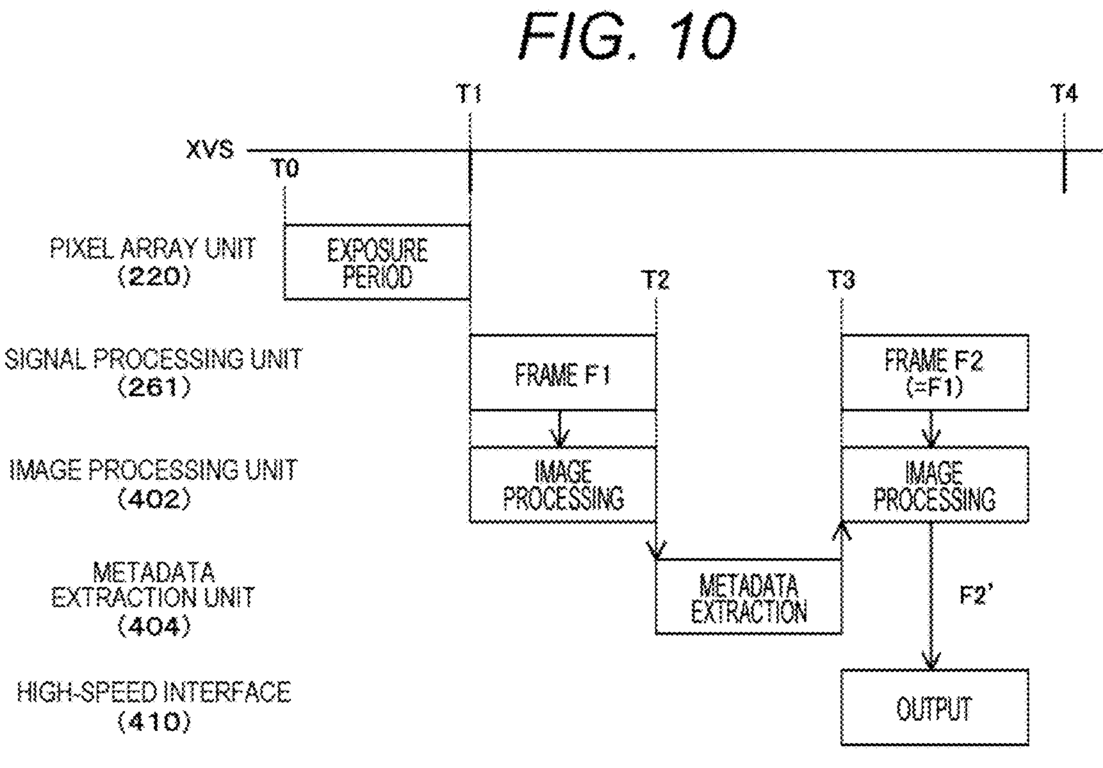
FIG. 10 is a timing chart illustrating an example of an operation of the solid-state imaging element according to the first embodiment of the present technology.

FIG. 10 is a timing chart illustrating an example of an operation of the solid-state imaging element 200 according to the first embodiment of the present technology.

The vertical scanning circuit 211 exposes all pixels in the pixel array unit 220 over an exposure period from timing T0 to timing T1. In addition, at timing T1, the vertical synchronization signal XVS falls.

Over a period from timing T1 to timing T2, the signal processing unit 261 sequentially reads the held pixel signals row by row and performs signal processing (AD conversion processing and CDS processing) to generate a frame F1. In addition, the image processing unit 402 performs image processing such as defective pixel correction on the frame F1, and supplies the processed frame F1 to the metadata extraction unit 404 via the ISP circuit 403 (not illustrated).

During a period from timing T2 to timing T3, the metadata extraction unit 404 extracts metadata from the frame F1 and supplies the metadata to the image processing unit 402.

Over a period from timing T3 to immediately before timing T4, the signal processing unit 261 sequentially reads the held pixel signals row by row and performs signal processing to generate a frame F2. Since the signal processing is executed on the same pixel signal as the first time, the frame F2 becomes the same data as the frame F1. The image processing unit 402 performs predetermined processing on the frame F2 using the metadata, and supplies the processed frame F2' to the high-speed interface 410. The high-speed interface 410 outputs the frame F2' to the outside. In addition, at timing T4, the vertical synchronization signal XVS falls. Note that, in a case where a plurality of frames is captured in synchronization with the vertical synchronization signal XVS, all pixels are exposed within an exposure period from the predetermined timing to timing T4, and the next pixel signal is generated.

Here, a configuration in which the sample-and-hold circuit 320 is not disposed in the pixel is assumed as a comparative example.

Figure 11:
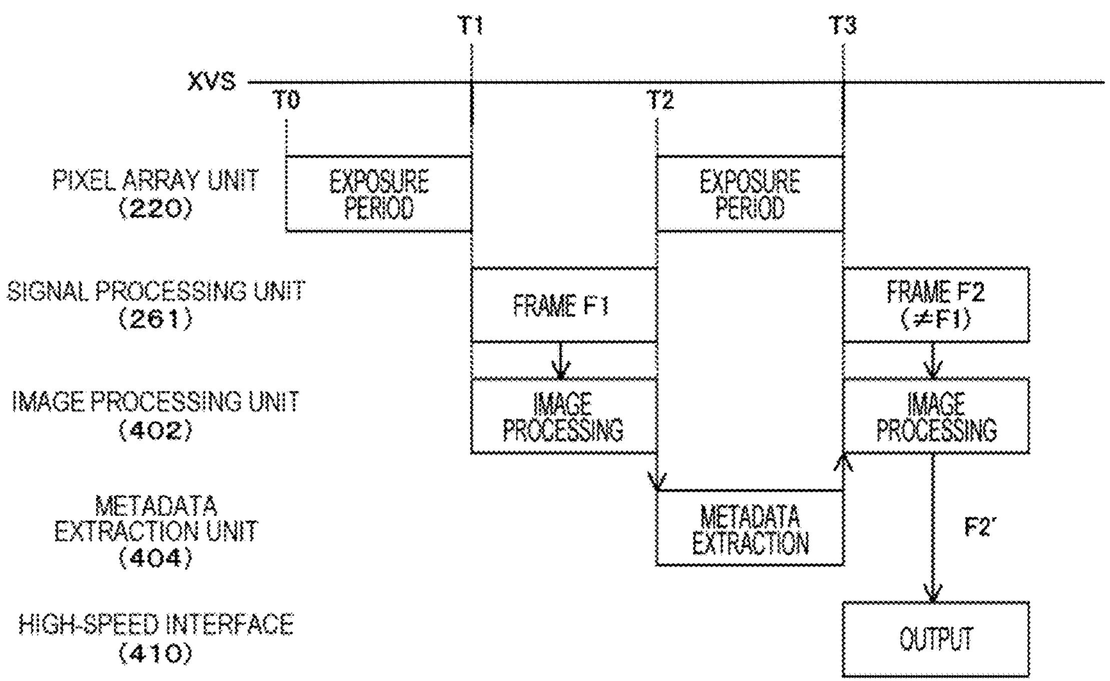
FIG. 11 is a timing chart illustrating an example of an operation of a solid-state imaging element in a comparative example.

FIG. 11 is a timing chart illustrating an example of an operation of the solid-state imaging element 200 in the comparative example. The vertical scanning circuit 211 exposes all pixels in the pixel array unit 220 over the exposure period from timing T0 to timing T1.

Over the period from timing T1 to timing T2, the signal processing unit 261 sequentially reads the pixel signals row by row and performs signal processing (AD conversion processing and CDS processing) to generate a frame F1. In addition, the image processing unit 402 performs image processing such as defective pixel correction on the frame F1, and supplies the processed frame F1 to the metadata extraction unit 404 via the ISP circuit 403 (not illustrated).

The vertical scanning circuit 211 exposes all pixels in the pixel array unit 220 over the exposure period from timing T2 to timing T3. The vertical synchronization signal XVS falls at timing T3. Further, within the exposure period, the metadata extraction unit 404 extracts metadata from the frame F1 and supplies the metadata to the image processing unit 402.

Over a predetermined period from timing T3, the signal processing unit 261 sequentially reads the pixel signals row by row and performs signal processing to generate a frame F2. The pixel signals generated by the exposure at timing T0 to timing T1 are destroyed by the exposure at timing T2 to timing T3. Therefore, in a case where a moving body is imaged, the frame F2 becomes data different from the frame F1.

Over a predetermined period from timing T3, the image processing unit 402 performs predetermined processing on the frame F2 using the metadata, and supplies the processed frame F2' to the high-speed interface 410. The high-speed interface 410 outputs the frame F2' to the outside.

As illustrated in the drawing, in the comparative example in which the sample-and-hold circuit 320 is not disposed for each pixel, a pixel signal is not held, and signal processing cannot be performed twice on the same pixel signal. Therefore, in a case where the frame F2 is processed using the metadata of the frame F1, the object recognized in the frame F1 may move and change its position in the frame 2. As a result, the processing using the metadata is not performed on an appropriate region, and there is a possibility that appropriate image processing without positional deviation cannot be performed on the frame F2'.

On the other hand, in a case where the sample-and-hold circuit 320 is disposed for each pixel, signal processing can be performed twice on the same pixel signal as illustrated in FIG. 10. Therefore, the position of the object is the same in each of the frame F1 and the frame F2. Therefore, the image processing unit 402 can execute processing using the metadata on an appropriate region, and can perform appropriate image processing on the frame F2'.

Figure 12:
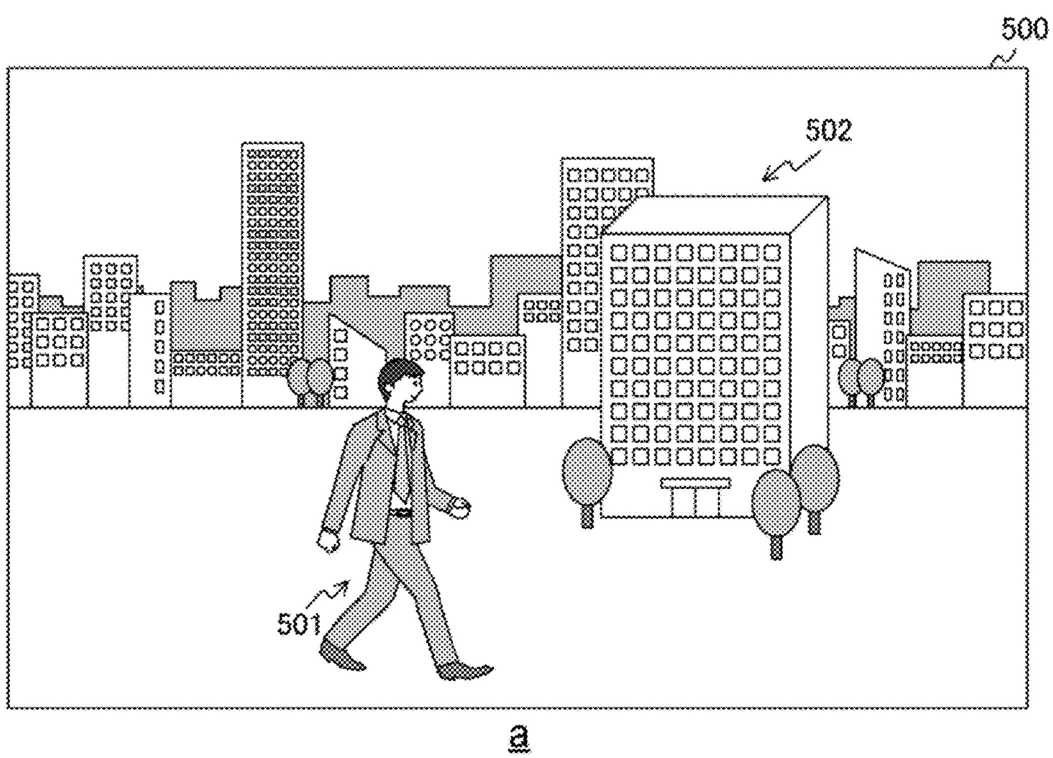
FIG. 12 is a diagram illustrating an example of a first frame and a recognition result according to the first embodiment of the present technology.
Figure 12:
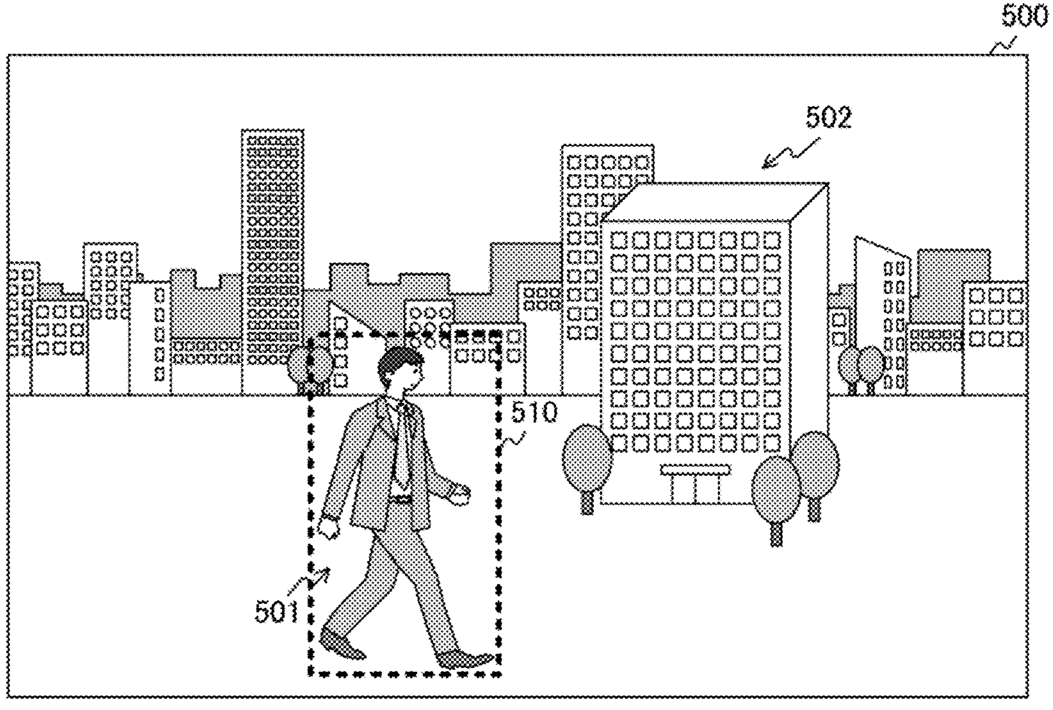

FIG. 12 is a diagram illustrating an example of a first frame and a recognition result according to the first embodiment of the present technology. In the drawing, a is an example of a first frame 500, and b in the drawing is a diagram illustrating an example of a recognition result.

As illustrated in a of the drawing, the frame 500 includes subjects such as a human 501 and a building 502. In the recognition processing, it is assumed that the recognition target is a human. In this case, as illustrated in b of the drawing, the human 501 is recognized, and information indicating a rectangular region 510 including the object is generated as metadata. In the drawing, the rectangular region 510 indicated by a bold dotted line corresponds to a region indicated by metadata.

Figure 13:
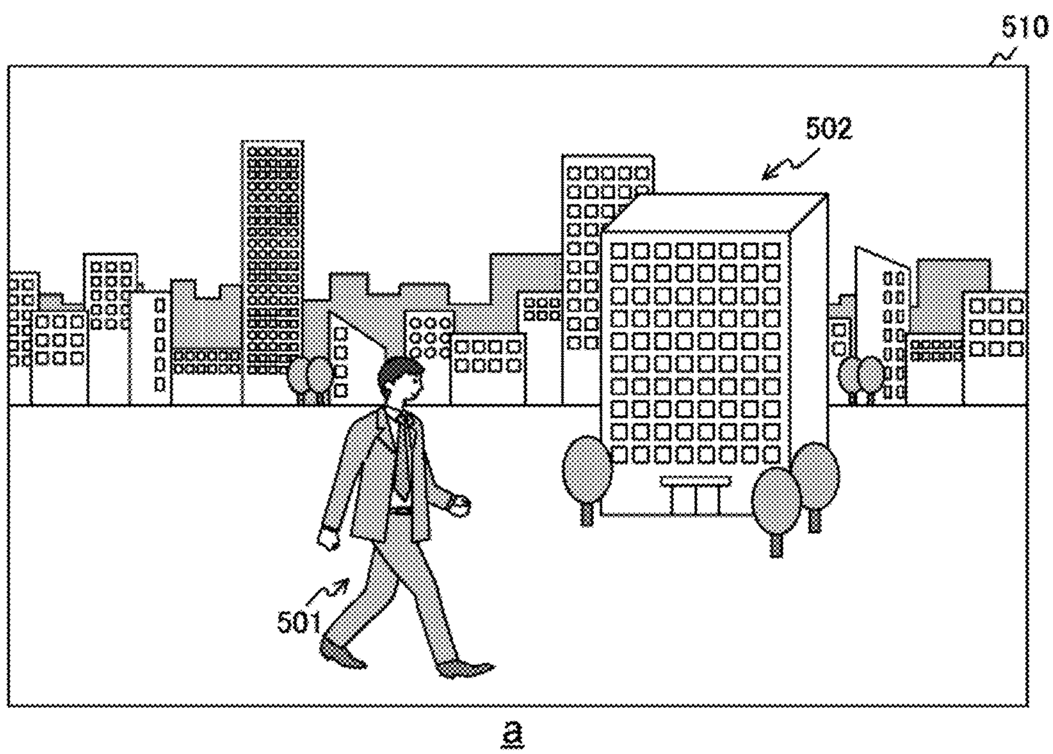
FIG. 13 is a diagram illustrating an example of a second frame and a processed frame according to the first embodiment of the present technology.
Figure 13:
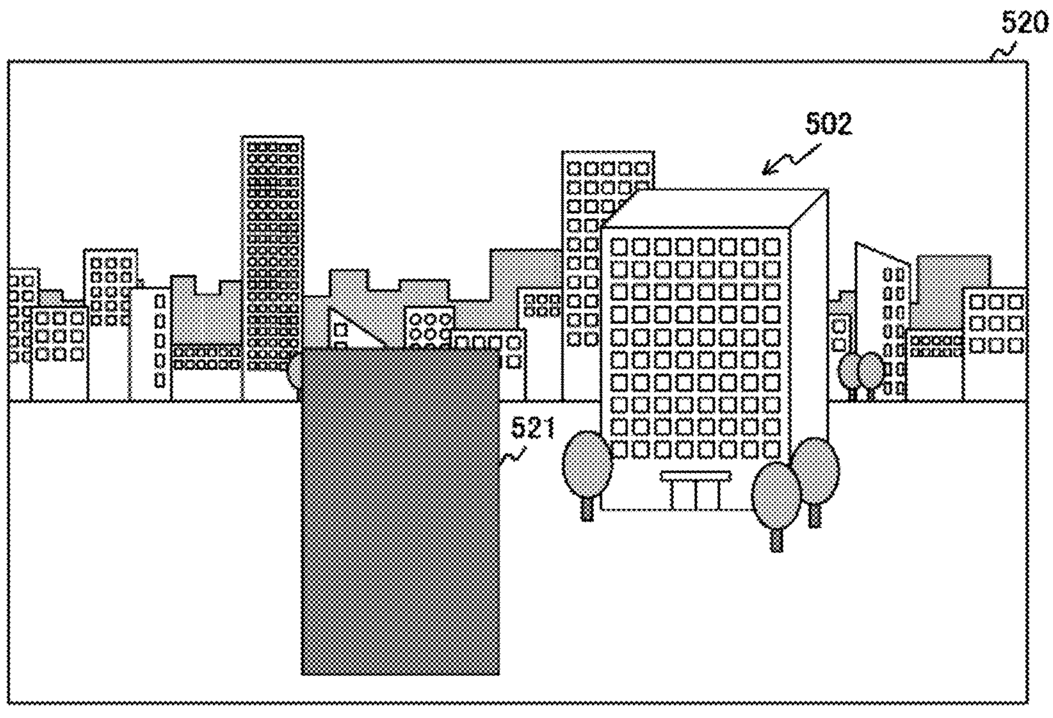

FIG. 13 is a diagram illustrating an example of a second frame and a processed frame according to the first embodiment of the present technology. In the drawing, a is an example of a second frame 510, and b in the drawing is an example of a frame 520 processed using metadata.

As illustrated in a of the drawing, the same frame 510 as the first frame 500 is generated by the second signal processing. Then, as illustrated in b of the drawing, the region 521 indicated by the metadata is filled with a specific color (black or the like).

Figure 14:
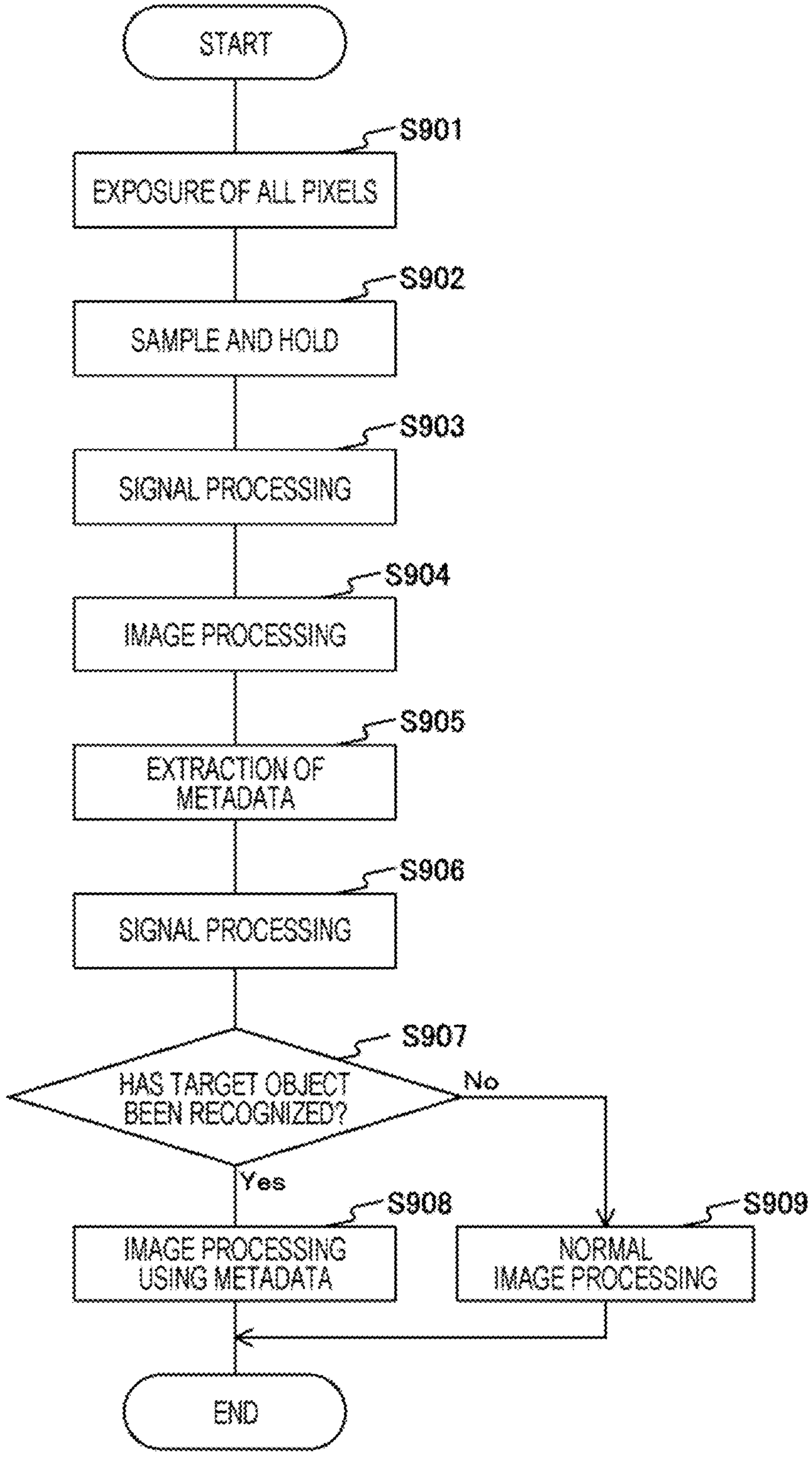
FIG. 14 is a flowchart illustrating an example of an operation of the solid-state imaging element according to the first embodiment of the present technology.

FIG. 14 is a flowchart illustrating an example of an operation of the solid-state imaging element 200 according to the first embodiment of the present technology. This operation is started, for example, in a case where a predetermined application for capturing a frame is executed. The vertical scanning circuit 211 in the solid-state imaging element 200 simultaneously exposes all pixels (step S901). For each pixel, the Sample-and-hold circuit 320 in the pixel samples and holds the pixel signal (step S902).

The signal processing unit 261 performs signal processing (AD conversion processing and CDS processing) on each of the held pixel signals to generate a first frame (step S903). The image processing unit 402 performs image processing on the frame (step S904), and the metadata extraction unit 404 extracts metadata from the processed frame (step S905).

Furthermore, the signal processing unit 261 performs signal processing on each of the held pixel signals to generate a second frame (step S906). The image processing unit 402 refers to the metadata and determines whether or not the target object has been recognized (step S907). In a case where the target object has been recognized (step S907: Yes), the image processing unit 402 performs image processing such as filling using the metadata (step S908). On the other hand, in a case where the target object has not been recognized (step S907: No), the image processing unit 402 performs normal image processing such as defective pixel correction without using the metadata (step S909). After step S908 or S909, the solid-state imaging element 200 ends the operation for capturing the frame.

Note that, in a case where a plurality of frames is captured in synchronization with the vertical synchronization signal XVS, the processing of steps S901 to S909 is repeatedly executed in synchronization with the vertical synchronization signal XVS.

In this way, according to the first embodiment of the present technology, since the pixel signal is held for each pixel and the second frame that is the same as the first frame is processed using the metadata extracted from the first frame, it is possible to perform appropriate image processing as compared with the comparative example in which the pixel signal is not held.

First Modification Example

In the first embodiment described above, the image processing unit 402 performs processing of filling in the region indicated by the metadata with a specific color (such as black) for the frame F2. However, the processing performed using the metadata is not limited to the processing of filling in black or the like. A solid-state imaging element 200 according to a first modification example of the first embodiment is different from the solid-state imaging element 200 of the first embodiment in that mosaic processing is performed on a region indicated by metadata.

Figure 15:
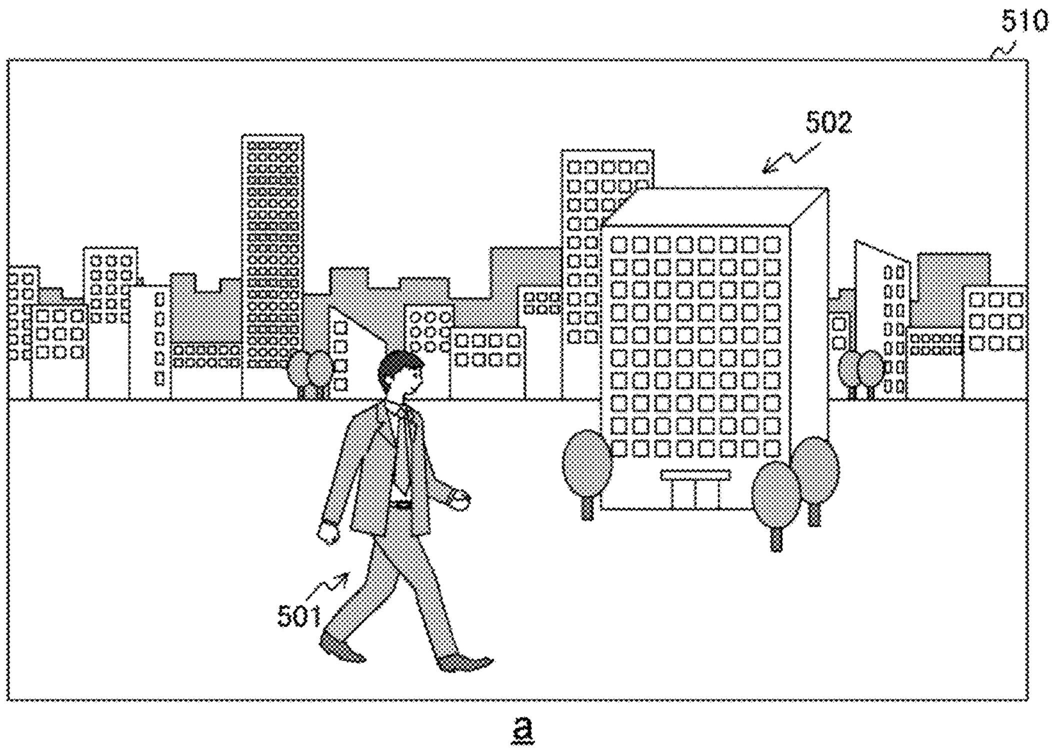
FIG. 15 is a diagram illustrating an example of a second frame and a processed frame according to a first modification example of the first embodiment of the present technology.
Figure 15:
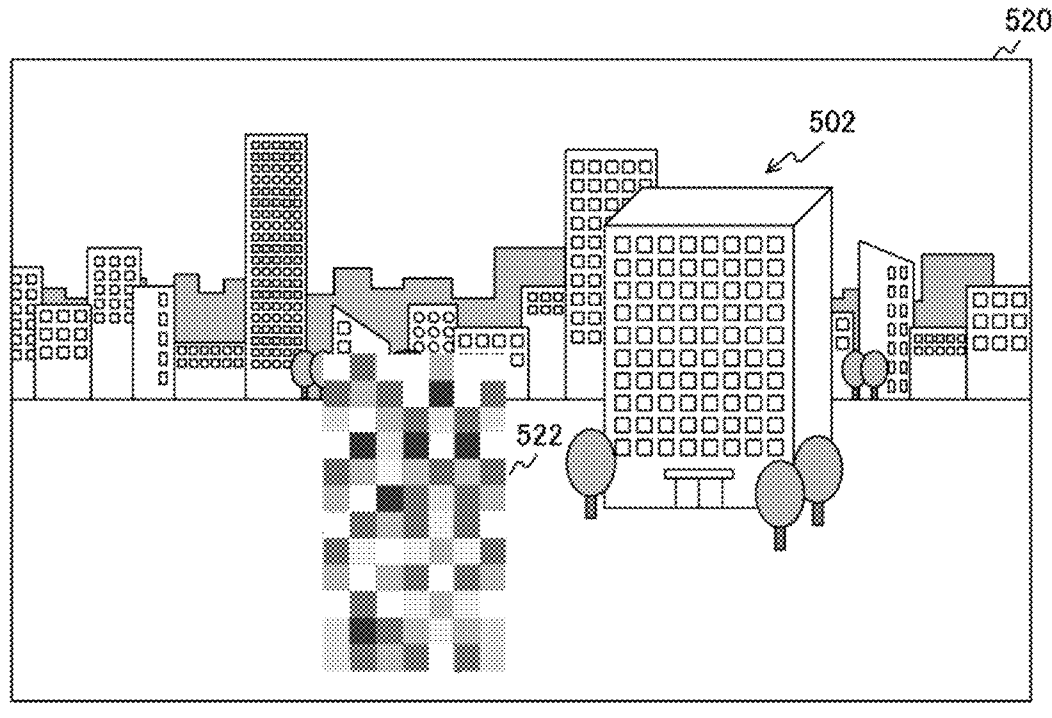

FIG. 15 is a diagram illustrating an example of a second frame and a processed frame according to the first modification example of the first embodiment of the present technology. In the drawing, a is an example of a second frame 510, and b in the drawing is an example of a frame 520 processed using metadata.

As illustrated in b of the drawing, the image processing unit 402 executes mosaic processing on a region 522 indicated by the metadata.

In this way, according to the first modification example of the first embodiment of the present technology, since mosaic processing is performed on the region 522 indicated by the metadata, the recognized object can be hidden by mosaic.

Second Modification Example

In the first embodiment described above, the image processing unit 402 performs processing of filling in the region indicated by the metadata with a specific color (such as black) for the frame F2. However, the processing performed using the metadata is not limited to the processing of filling in black or the like. A solid-state imaging element 200 according to a second modification example of the first embodiment is different from the solid-state imaging element 200 of the first embodiment in that a region indicated by metadata is extracted as a region of interest (ROI).

Figure 16:
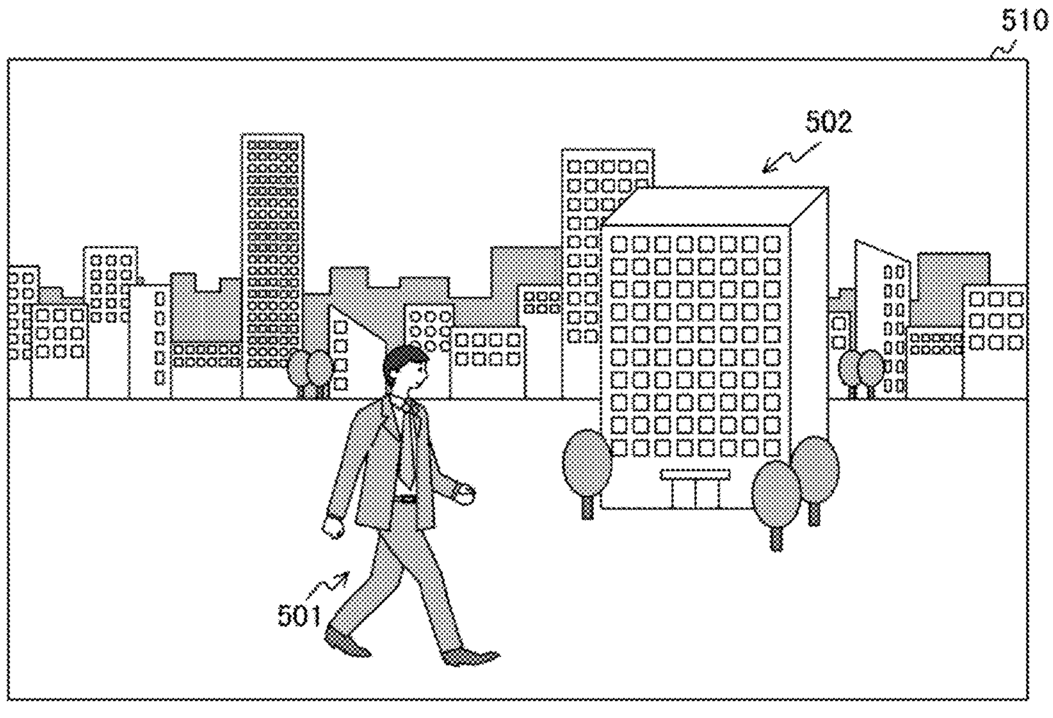
FIG. 16 is a diagram illustrating an example of a second frame and a region of interest according to a second modification example of the first embodiment of the present technology.
Figure 16:
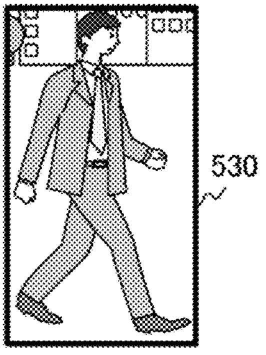

FIG. 16 is a diagram illustrating an example of a second frame and a region of interest according to the second modification example of the first embodiment of the present technology. In the drawing, a is an example of a second frame 510, and b in the drawing is an example of a region of interest 530.

As illustrated in b of the drawing, the image processing unit 402 extracts a region indicated by the metadata as the region of interest 530 from the frame 510. As the metadata, for example, a detection result of suspicious behavior, possession of a dangerous article, or presence or absence of a suspicious object is used. Then, the image processing unit 402 performs various types of image processing such as defective pixel correction on the region of interest 530.

Note that, in FIGS. 13, 15, and 16, the entire human is a recognition target, but only the face can be a recognition target. In addition, an object other than a human, such as a license plate of a vehicle, can be set as a recognition target.

In this way, according to the second modification example of the first embodiment of the present technology, since the region indicated by the metadata is extracted as a region of interest (ROI), the ROI can be set on the basis of the detection result (metadata) of the presence or absence of suspicious behavior or the like.

2. Second Embodiment

In the first embodiment described above, the selection circuit 330 sequentially connects the capacitor elements 321 and 322 to the post-stage node 340, but with this configuration, there is a possibility that noise cannot be sufficiently suppressed. A pixel 300 of this second embodiment is different from the pixel 300 of the first embodiment in that the post-stage node 340 is initialized when the selection circuit 330 disconnects the capacitor elements 321 and 322 from the post-stage node 340.

Figure 17:
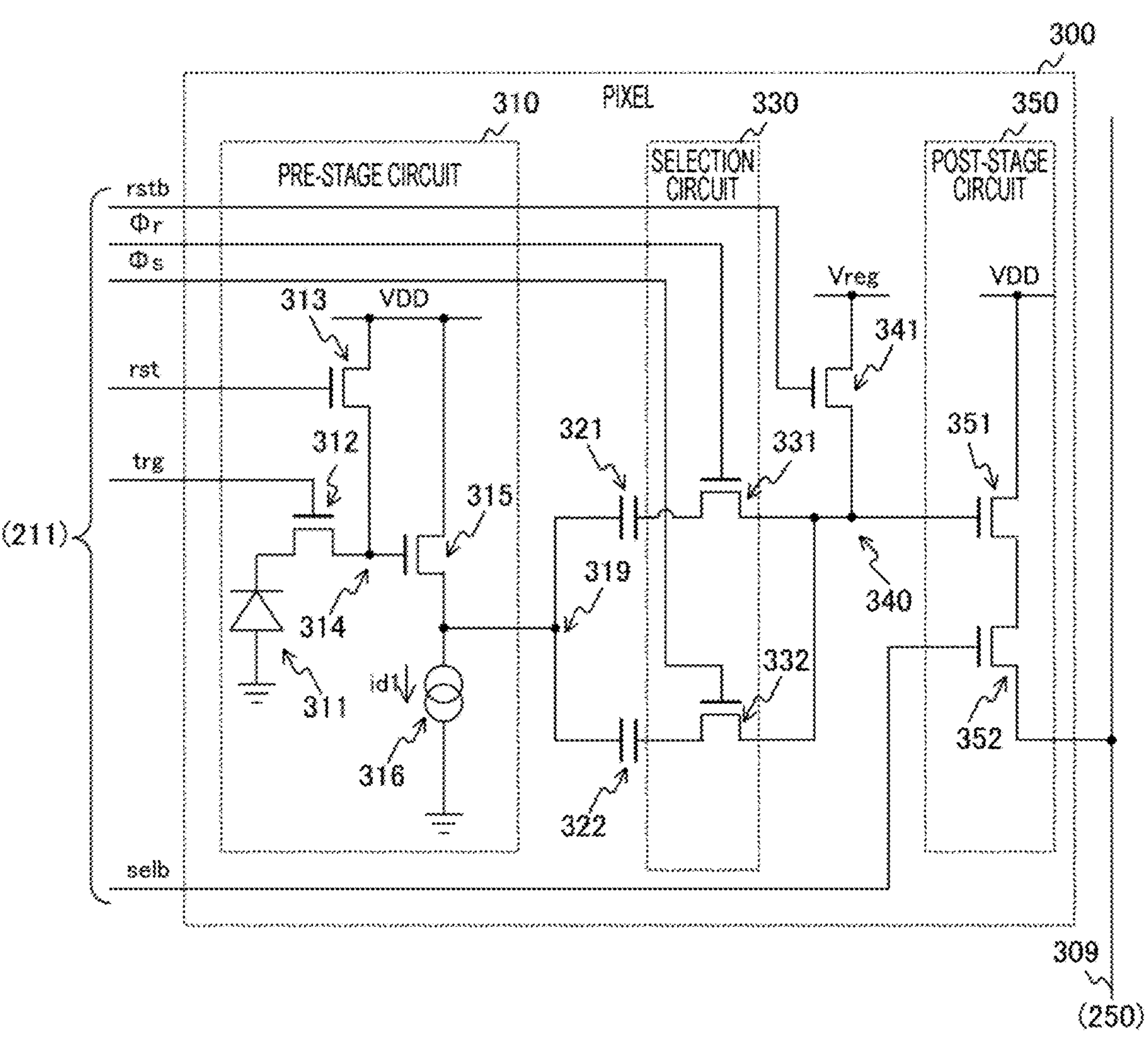
FIG. 17 is a circuit diagram illustrating a configuration example of a pixel according to a second embodiment of the present technology.

FIG. 17 is a circuit diagram illustrating a configuration example of the pixel 300 according to the second embodiment of the present technology. The pixel 300 of the second embodiment is different from the pixel 300 of the first embodiment in that a post-stage reset transistor 341 is further provided.

The post-stage reset transistor 341 initializes a level of the post-stage node 340 to a predetermined potential Vreg in accordance with a post-stage reset signal rstb from the vertical scanning circuit 211. A potential different from the power supply potential VDD (for example, a potential lower than VDD) is set as the potential Vreg.

After reading the reset level, the vertical scanning circuit 211 supplies a high-level post-stage reset signal rstb over the pulse period while keeping the FD reset signal rst and the post-stage selection signal selb of the selected row at the high level. Accordingly, the level of the post-stage node 340 is initialized. At this time, both the selection transistor 331 and the selection transistor 332 are in an open state, and the capacitor elements 321 and 322 are disconnected from the post-stage node 340.

After the initialization of the post-stage node 340, the vertical scanning circuit 211 supplies a high-level selection signal Φs over a predetermined period while keeping the FD reset signal rst and the post-stage selection signal selb of the selected row at the high level. Accordingly, the capacitor element 322 is connected to the post-stage node 340, and the signal level is read.

Through the above-described read control, the selection circuit 330 of the selected row sequentially performs control to connect the capacitor element 321 to the post-stage node 340, control to disconnect the capacitor elements 321 and 322 from the post-stage node 340, and control to connect the capacitor element 322 to the post-stage node 340. Furthermore, when the capacitor elements 321 and 322 are disconnected from the post-stage node 340, the post-stage reset transistor 341 of the selected row initializes the level of the post-stage node 340. Furthermore, the post-stage circuit 350 of the selected row sequentially reads the reset level and the signal level from the capacitor elements 321 and 322 via the post-stage node 340, and outputs the reset level and the signal level to the vertical signal line 309.

Figure 18:
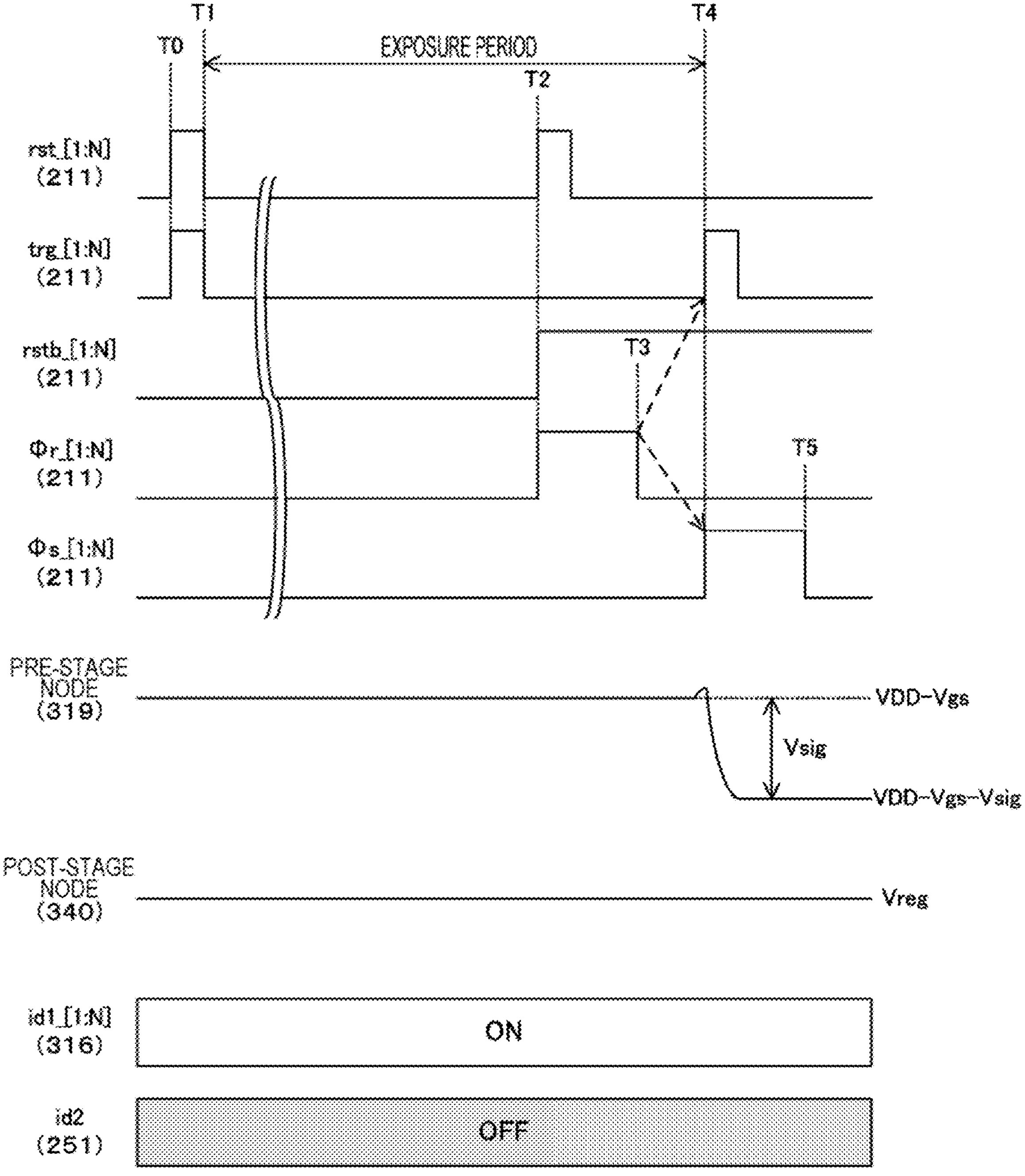
FIG. 18 is a timing chart illustrating an example of a global shutter operation according to the second embodiment of the present technology.

FIG. 18 is a timing chart illustrating an example of a global shutter operation according to the second embodiment of the present technology. The vertical scanning circuit 211 supplies a high-level FD reset signal rst and the high-level transfer signal trg to all rows (in other words, all pixels) over a period from timing TO immediately before the start of exposure to timing T1 after the pulse period has elapsed. Accordingly, all pixels are PD reset, and the exposure simultaneously starts in all rows.

Here, rst_[n] and trg_[n] in the drawing indicate signals to pixels in an n-th row among N rows. N is an integer indicating the total number of rows, and n is an integer from 1 to N.

Then, at timing T2 immediately before the end of the exposure period, the vertical scanning circuit 211 supplies a high-level FD reset signal rst over the pulse period while setting the post-stage reset signal rstb and the selection signal Φr to the high level for all pixels. Accordingly, all pixels are FD reset, and the reset level is sampled and held. Here, rstb [n] and Φr [n] in the drawing indicate signals to pixels in the n-th row.

At timing T3 after timing T2, the vertical scanning circuit 211 returns the selection signal Φr to the low level.

At timing T4 at the end of exposure, the vertical scanning circuit 211 supplies a high-level transfer signal trg over the pulse period while setting the post-stage reset signal rstb and the selection signal Φs to the high level for all pixels. Accordingly, the signal level is sampled and held. Furthermore, the level of the pre-stage node 319 decreases from the reset level (VDD-Vgs) to the signal level (VDD-Vgs-Vsig). Here, VDD is a power supply voltage, and Vsig is a net signal level obtained by the CDS processing. Vgs indicates a gate-source voltage of the pre-stage amplification transistor 315. Furthermore, Φs_[n] in the drawing indicates signals to pixels in the n-th row.

At timing T5 after timing T4, the vertical scanning circuit 211 returns the selection signal Φs to the low level.

Furthermore, the vertical scanning circuit 211 controls the current source transistors 316 of all rows (all pixels) to supply a current id1. Here, id1 [n] in the drawing indicates a current of pixels in the n-th row. The larger the current id, the larger IR drop becomes, so that it is required that the current id1 be on the order of several nanoamperes (nA) to several tens of nanoamperes (nA). On the other hand, the load MOS transistors 251 of all columns are in the off state, and the current id2 is not supplied to the vertical signal line 309.

Figure 19:
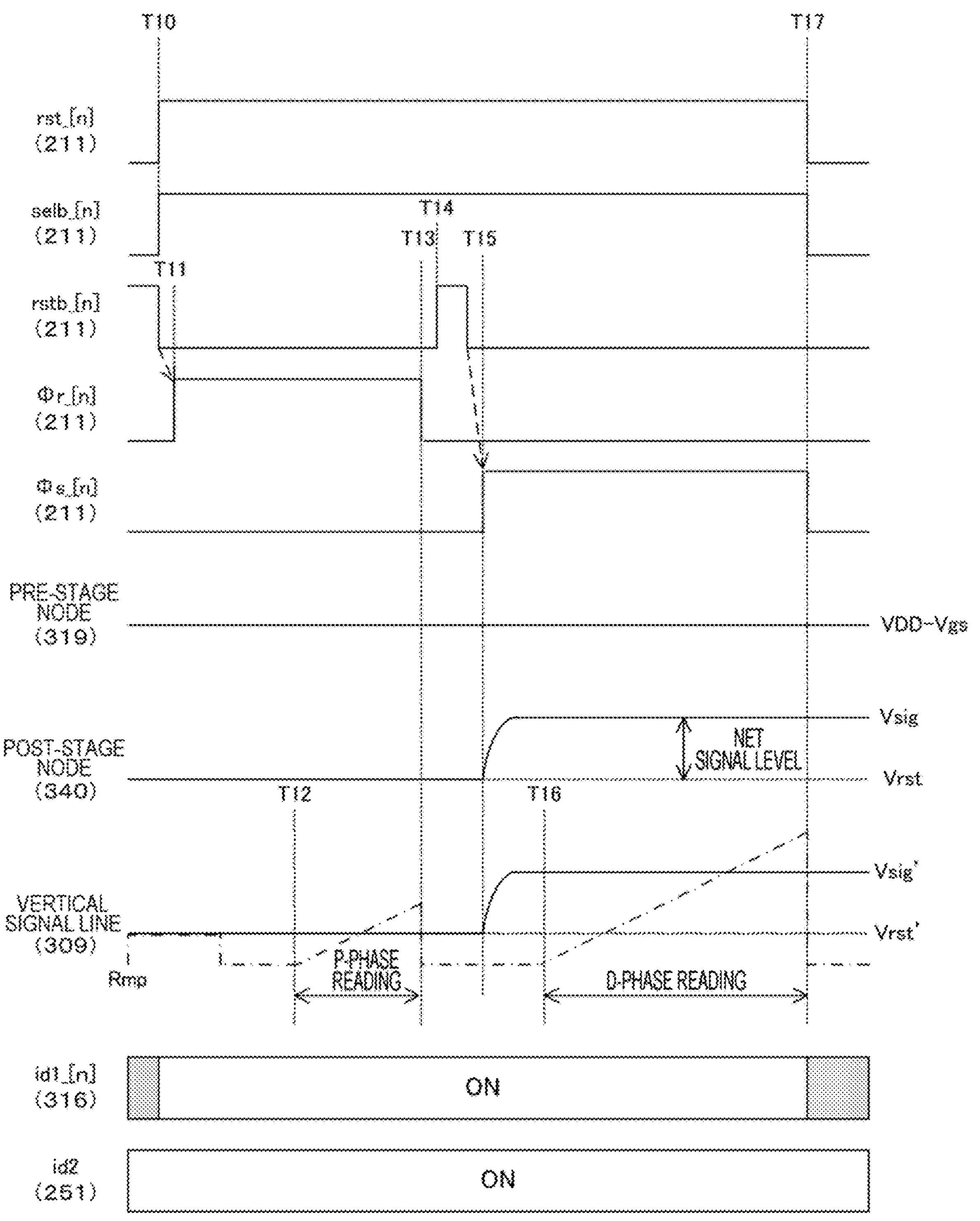
FIG. 19 is a timing chart illustrating an example of a read operation according to the second embodiment of the present technology.

FIG. 19 is a timing chart illustrating an example of a read operation according to the second embodiment of the present technology. During a read period of the n-th row from timing T10 to timing T17, the vertical scanning circuit 211 sets the FD reset signal rst and the post-stage selection signal selb of the n-th row to the high level. Furthermore, during the read period, the post-stage reset signal rstb of all rows is controlled to the low level. Here, selb_[n] in the drawing indicates signals to pixels in the n-th row.

The vertical scanning circuit 211 supplies a high-level selection signal Φr to the n-th row over a period from timing Ti1 immediately after timing T10 to timing T13. The potential of the post-stage node 340 becomes a reset level Vrst.

The DAC 213 gradually increases the ramp signal Rmp over a period from timing T12 after timing Ti1 to timing T13. The ADC 262 compares the ramp signal Rmp with the level Vrst' of the vertical signal line 309, and counts a count value over a period until the comparison result is inverted. Accordingly, the P-phase level (reset level) is read.

The vertical scanning circuit 211 supplies a high-level post-stage reset signal rstb to the n-th row over the pulse period from timing T14 immediately after timing T13. Accordingly, in a case where a parasitic capacitance exists in the post-stage node 340, the history of the previous signal held in the parasitic capacitance can be erased.

The vertical scanning circuit 211 supplies a high-level selection signal Φs to the n-th row over a period from timing T15 immediately after the initialization of the post-stage node 340 to timing T17. The potential of the post-stage node 340 becomes a signal level Vsig. During exposure, the signal level is lower than the reset level, but during reading, the signal level is higher than the reset level because the post-stage node 340 is used as a reference. A difference between the reset level Vrst and the signal level Vsig corresponds to a net signal level from which reset noise and offset noise of the FD have been removed.

The DAC 213 gradually increases the ramp signal Rmp over a period from timing T16 after timing T15 to timing T17. The ADC 262 compares the ramp signal Rmp with the level Vrst' of the vertical signal line 309, and counts a count value over a period until the comparison result is inverted. Accordingly, the D-phase level (signal level) is read.

Furthermore, the vertical scanning circuit 211 controls the current source transistor 316 of the n-th row to be read over the period from timing T10 to timing T17 to supply the current id1. Furthermore, the timing control circuit 212 controls the load MOS transistors 251 of all columns to supply the current id2 within the read period of all rows.

Figure 20:
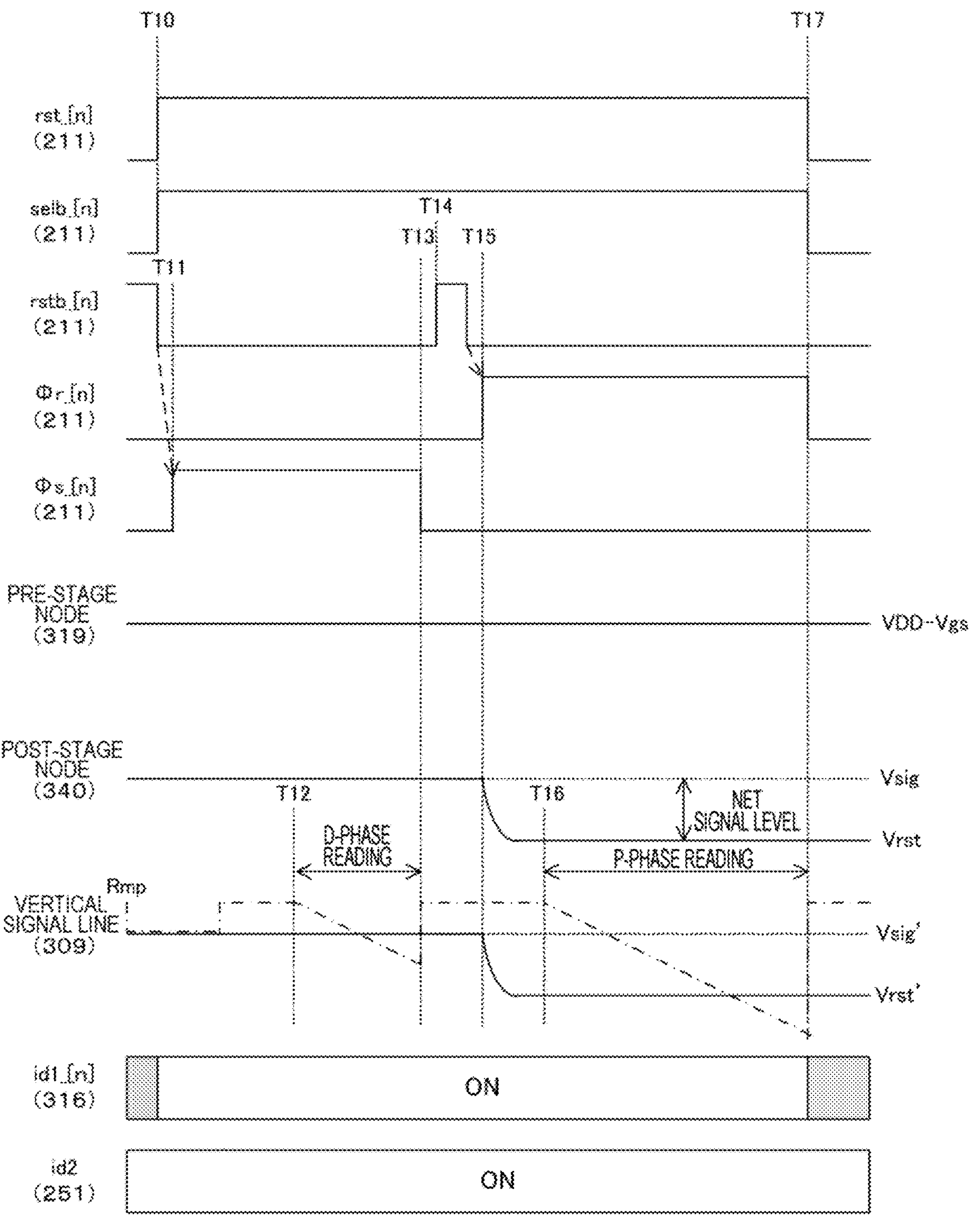
FIG. 20 is a timing chart illustrating another example of the read operation according to the second embodiment of the present technology.

Note that the solid-state imaging element 200 reads the signal level after the reset level, but is not limited to this order. Alternatively, as illustrated in FIG. 20, the solid-state imaging element 200 may read the reset level after the signal level. In this case, as illustrated in the drawing, the vertical scanning circuit 211 supplies a high-level selection signal Φr after the high-level selection signal Φs. Furthermore, in this case, it is necessary to reverse the inclination of the slope of the ramp signal.

Further, each of the first and second modification examples of the first embodiment can be applied to the second embodiment.

In this way, according to the second embodiment of the present technology, the post-stage reset transistor 341 initializes the post-stage node 340 when the selection circuit 330 disconnects the capacitor elements 321 and 322 from the post-stage node 340. Since the capacitor elements 321 and 322 are disconnected, the level of the reset noise generated by the driving becomes a level corresponding to a parasitic capacitance smaller than the capacitances of the capacitor elements 321 and 322. By reducing this noise, the image quality of image data can be improved.

First Modification Example

In the second embodiment described above, the pre-stage circuit 310 reads a signal with the pre-stage circuit 310 connected to the pre-stage node 319, but this configuration cannot block noise from the pre-stage node 319 during reading. A pixel 300 of a first modification example of the second embodiment is different from the pixel 300 of the second embodiment in that a transistor is inserted between the pre-stage circuit 310 and the pre-stage node 319.

Figure 21:
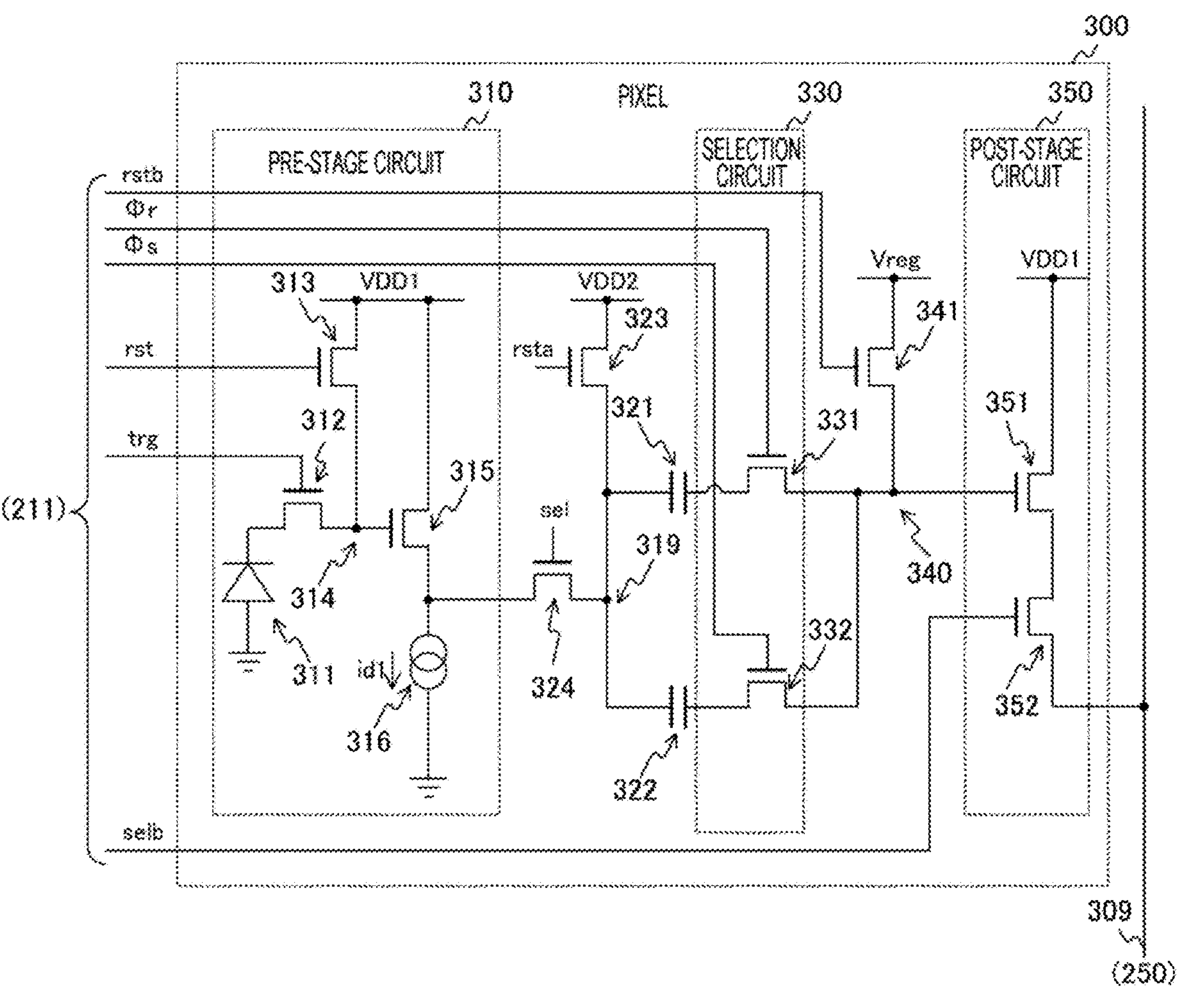
FIG. 21 is a circuit diagram illustrating a configuration example of a pixel according to a first modification example of the second embodiment of the present technology.

FIG. 21 is a circuit diagram illustrating a configuration example of the pixel 300 according to the first modification example of the second embodiment of the present technology. The pixel 300 of the first modification example of the second embodiment is different from the pixel 300 of the second embodiment in that a pre-stage reset transistor 323 and a pre-stage selection transistor 324 are further provided.

Furthermore, the power supply voltage of the pre-stage circuit 310 and the post-stage circuit 350 of the first modification example of the second embodiment is denoted as VDD1.

The pre-stage reset transistor 323 initializes the level of the pre-stage node 319 with a power supply voltage VDD2. It is desirable that the power supply voltage VDD2 be set to a value satisfying the following expression.

$$VDD2 = VDD1 - Vgs \quad \text{Expression 1}$$

In the above expression, Vgs is a gate-source voltage of the pre-stage amplification transistor 315.

Setting to the value satisfying Expression 1 allow a reduction in variations in potential between the pre-stage node 319 and the post-stage node 340 in the dark. This makes it possible to improve photo response non-uniformity (PRNU).

The pre-stage selection transistor 324 opens and closes a path between the pre-stage circuit 310 and the pre-stage node 319 in accordance with a pre-stage selection signal se1 from the vertical scanning circuit 211.

Figure 22:
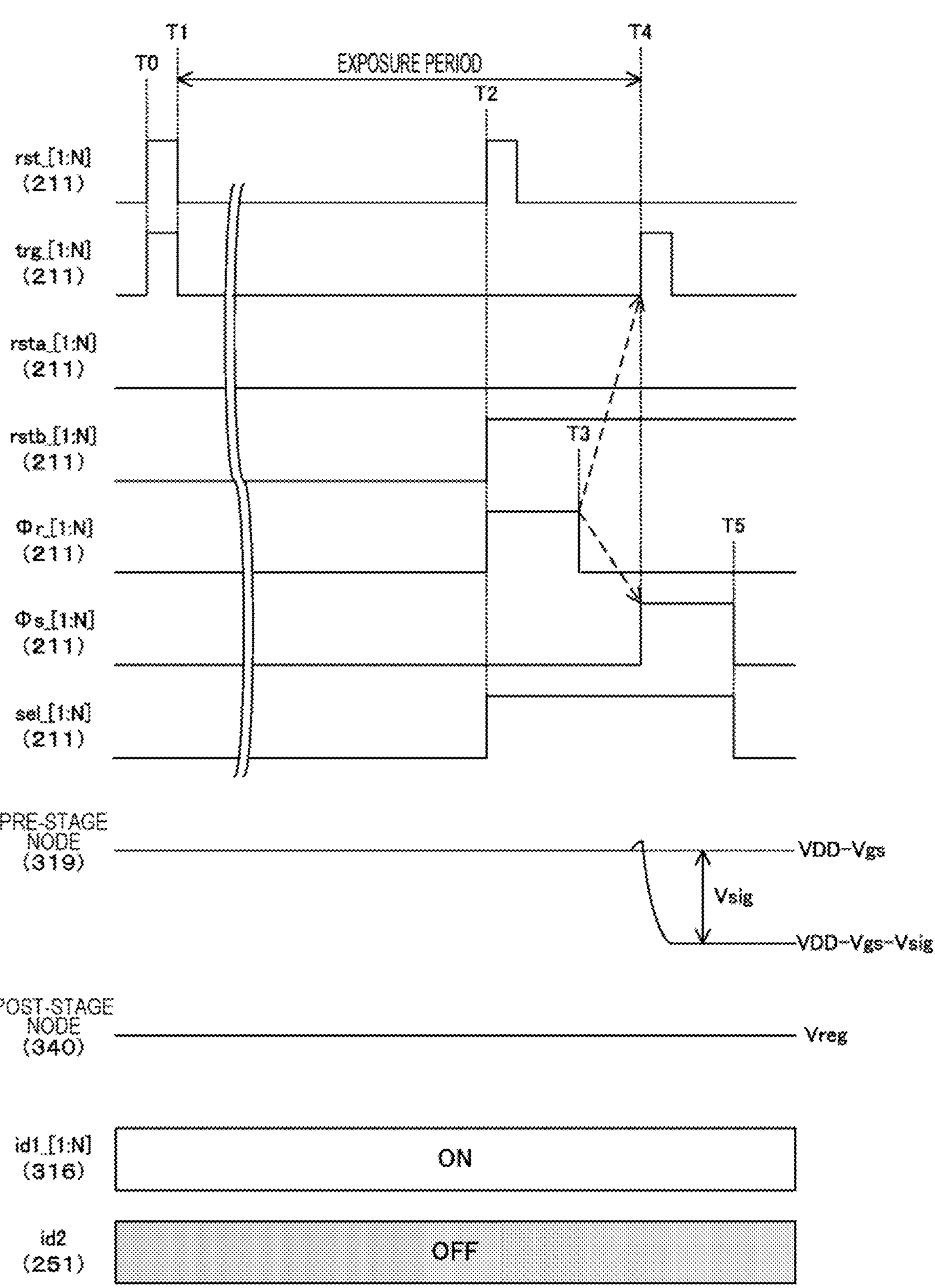
FIG. 22 is a timing chart illustrating an example of a global shutter operation according to the first modification example of the second embodiment of the present technology.

FIG. 22 is a timing chart illustrating an example of a global shutter operation according to the first modification example of the second embodiment of the present technology. The timing chart of the first modification example of the second embodiment is different from the timing chart of the first embodiment in that the vertical scanning circuit 211 further supplies a pre-stage reset signal rsta and the pre-stage selection signal se1. In the drawing, rsta [n] and se1_[n] indicate signals to pixels in the n-th row.

The vertical scanning circuit 211 supplies a high-level pre-stage selection signal se1 to all pixels over a period from timing T2 immediately before the end of exposure to timing T5. The pre-stage reset signal rsta is controlled to the low level.

Figure 23:
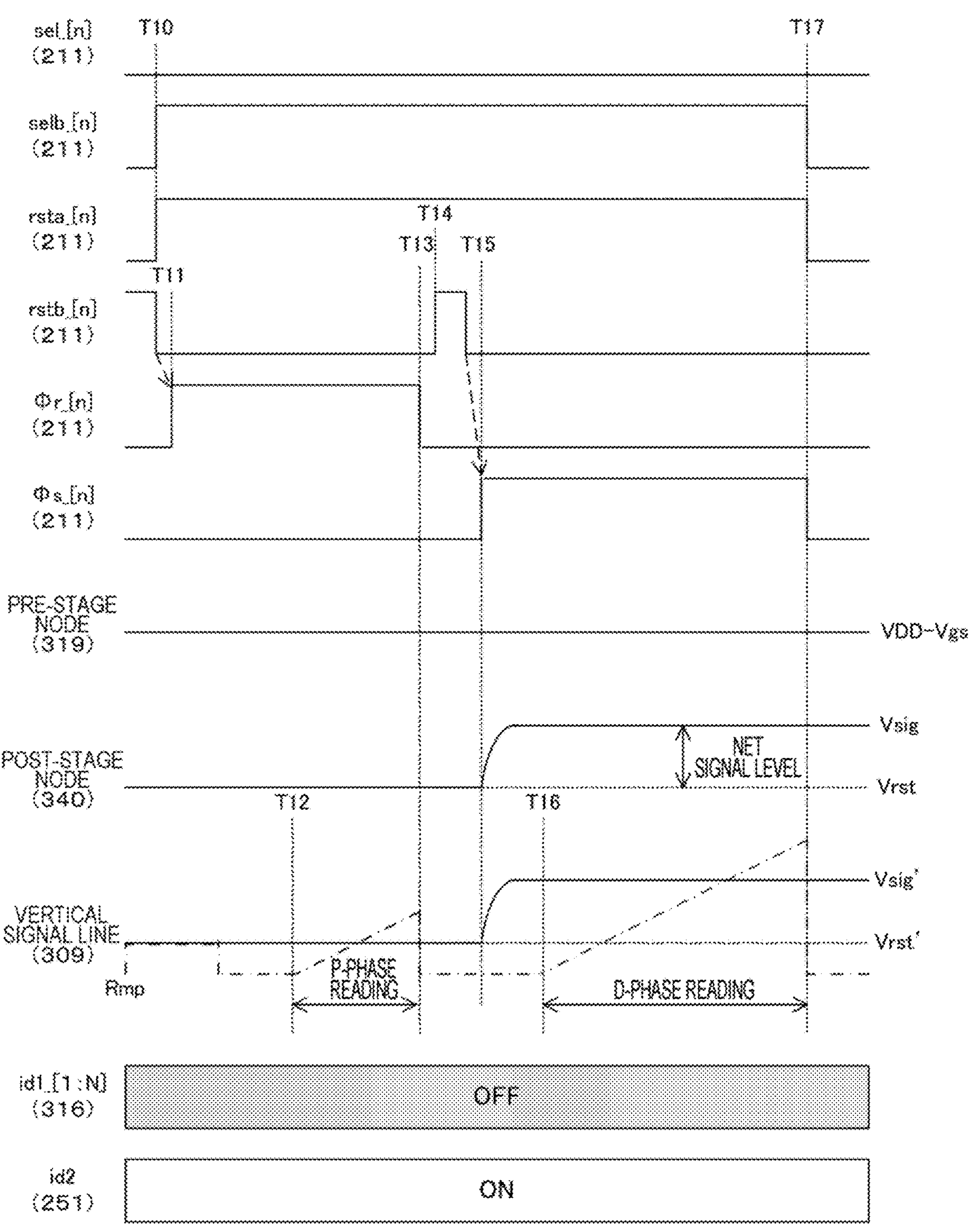
FIG. 23 is a timing chart illustrating an example of a read operation according to the first modification example of the second embodiment of the present technology.

FIG. 23 is a timing chart illustrating an example of a read operation according to the first modification example of the second embodiment of the present technology. During reading of each row, the pre-stage selection signal se1 is controlled to the low level. Through this control, the pre-stage selection transistor 324 shifts to the open state, and the pre-stage node 319 is disconnected from the pre-stage circuit 310. Thereby, noise from the pre-stage node 319 can be blocked during reading.

Furthermore, during the read period of the n-th row from timing T10 to timing T17, the vertical scanning circuit 211 supplies a high-level pre-stage reset signal rsta to the n-th row.

Furthermore, during reading, the vertical scanning circuit 211 controls the current source transistors 316 of all pixels to stop the supply of the current id1. The current id2 is supplied in a manner similar to the second embodiment. In this way, the control of the current id1 is simplified as compared with the second embodiment.

In this way, according to the first modification example of the second embodiment of the present technology, since the pre-stage selection transistor 324 shifts to the open state during reading to disconnect the pre-stage circuit 310 from the pre-stage node 319, it is possible to block noise from the pre-stage circuit 310.

Second Modification Example

In the second embodiment described above, the circuits in the solid-state imaging element 200 are provided in a single semiconductor chip, but there is a possibility that this configuration prevents the elements from fitting in the semiconductor chip in a case where the pixel 300 is miniaturized. A solid-state imaging element 200 of a second modification example of the second embodiment is different from the solid-state imaging element 200 of the second embodiment in that the circuits in the solid-state imaging element 200 are dispersedly disposed in two semiconductor chips.

Figure 24:
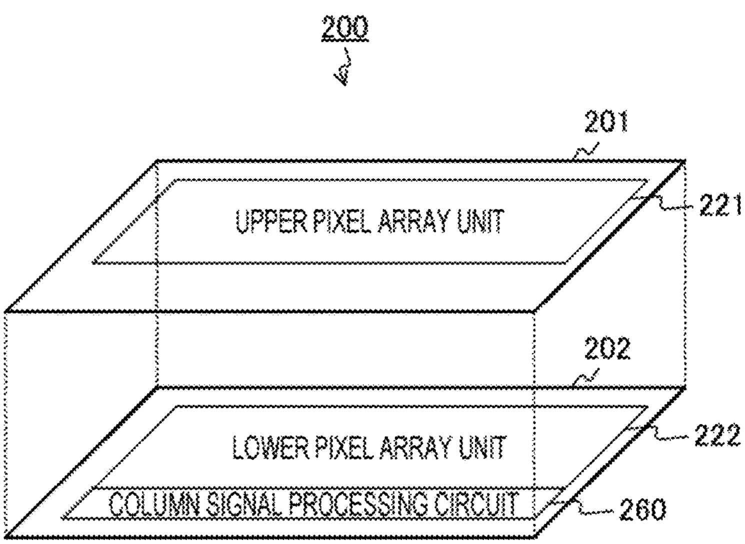
FIG. 24 is a view illustrating an example of a stacked structure of a solid-state imaging element according to a second modification example of the second embodiment of the present technology.

FIG. 24 is a view illustrating an example of a stacked structure of the solid-state imaging element 200 according to the second modification example of the second embodiment of the present technology. The solid-state imaging element 200 of the second modification example of the second embodiment includes a lower pixel Chip 202 and an upper pixel chip 201 stacked on the lower pixel chip 202. These chips are electrically connected by, for example, Cu—Cu bonding. Note that, in addition to the Cu—Cu bonding, the connection can be made using a via or a bump.

An upper pixel array unit 221 is disposed in the upper pixel chip 201. A lower pixel array unit 222 and a column signal processing circuit 260 are disposed in the lower pixel chip 202. For each pixel in the pixel array unit 220, a part of the pixel is disposed in the upper pixel array unit 221, and the rest is disposed in the lower pixel array unit 222.

Furthermore, in the lower pixel chip 202, a vertical scanning circuit 211, a timing control circuit 212, a DAC 213, and a load MOS circuit block 250 are also disposed. These circuits are omitted in the drawing.

Furthermore, the upper pixel chip 201 is manufactured, for example, by a pixel-dedicated process, and the lower pixel chip 202 is manufactured, for example, by a complementary MOS (CMOS) process.

Figure 25:
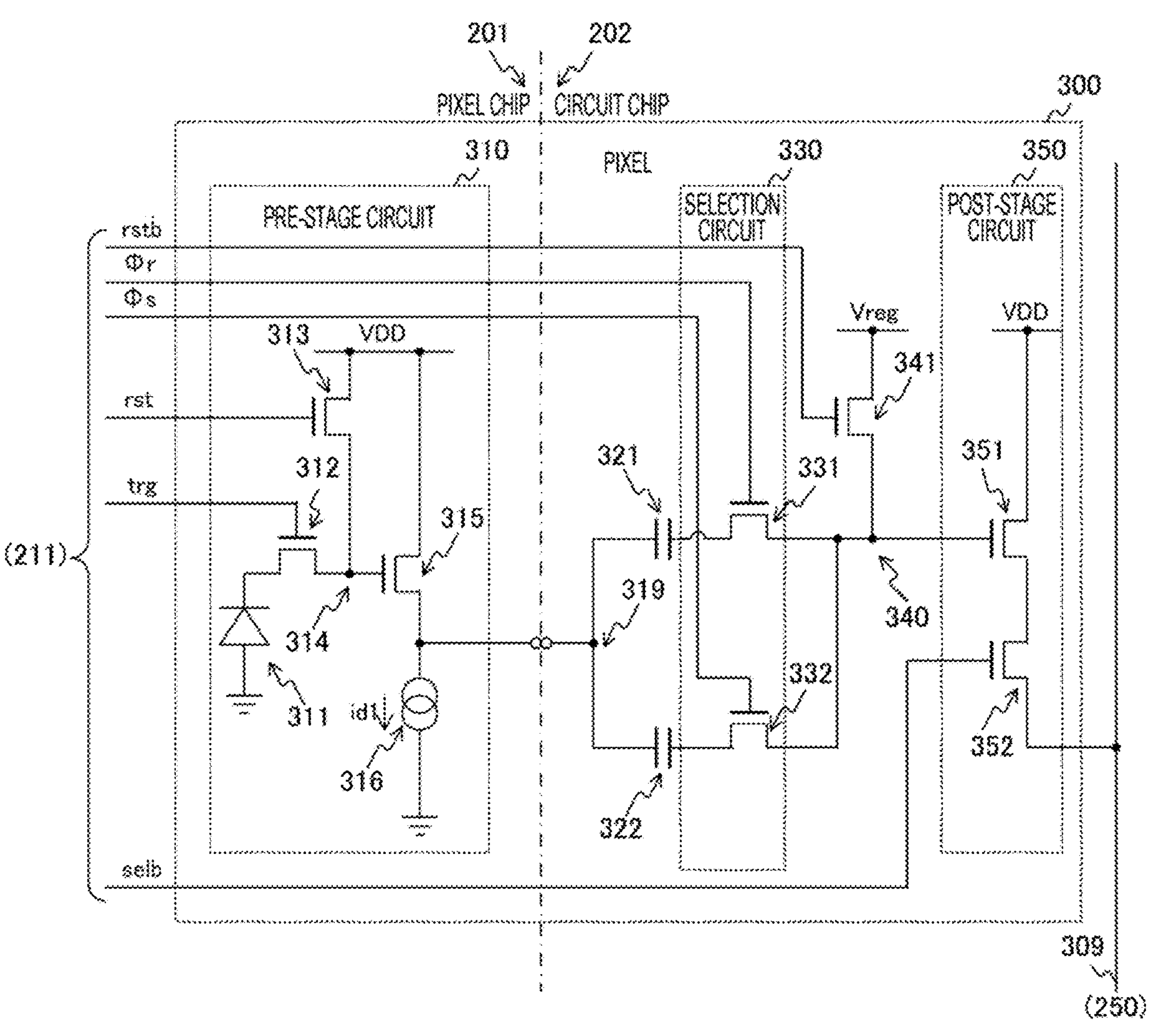
FIG. 25 is a circuit diagram illustrating a configuration example of a pixel according to the second modification example of the second embodiment of the present technology.

FIG. 25 is a circuit diagram illustrating a configuration example of a pixel 300 according to the second modification example of the second embodiment of the present technology. In the pixel 300, the pre-stage circuit 310 is disposed in the upper pixel chip 201, and the other circuits and elements (such as the capacitor elements 321 and 322) are disposed in the lower pixel chip 202. Note that the current source transistor 316 can be further disposed in the lower pixel chip 202. As illustrated in the drawing, dispersedly disposing the elements in the pixel 300 in the upper pixel chip 201 and lower pixel chip 202 stacked on top of each other allows a reduction in pixel area, thereby facilitating pixel miniaturization.

In this way, according to the second modification example of the second embodiment of the present technology, since the circuits and elements in the pixel 300 are dispersedly disposed in the two semiconductor chips, pixel miniaturization is facilitated.

Third Modification Example

In the second modification example of the second embodiment described above, a part of the pixel 300 and the peripheral circuits (such as the column signal processing circuit 260) are provided in the lower pixel chip 202 on the lower side. However, in this configuration, the arrangement area of the circuits and elements on the lower pixel chip 202 side is larger than the arrangement area of the upper pixel chip 201 by the peripheral circuit, and there is a possibility that an unnecessary space without circuits and elements is generated in the upper pixel chip 201. A solid-state imaging element 200 of a third modification example of the second embodiment is different from the solid-state imaging element 200 of the second modification example of the second embodiment in that the circuits in the solid-state imaging element 200 are dispersedly disposed in three semiconductor chips.

Figure 26:
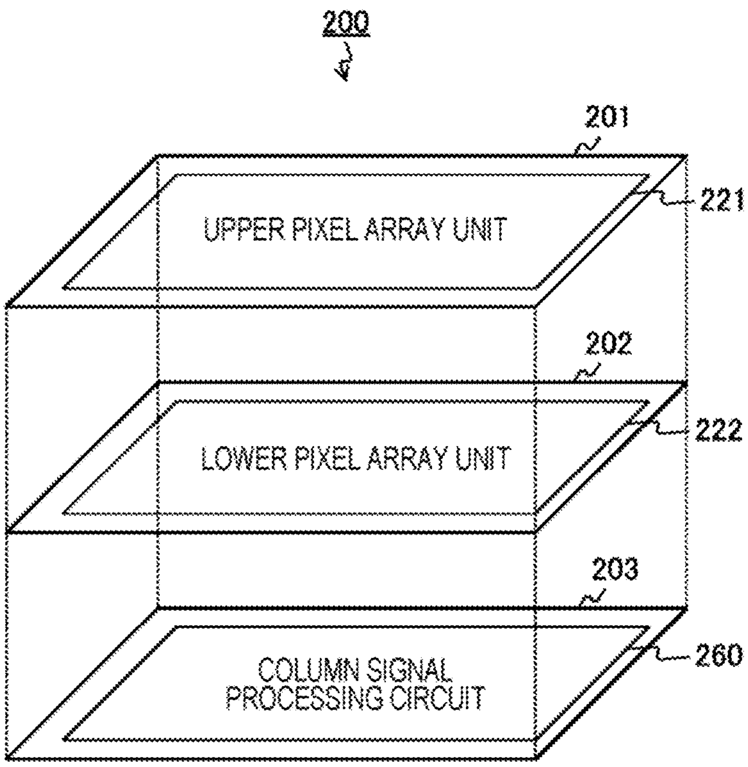
FIG. 26 is a view illustrating an example of a stacked structure of a solid-state imaging element according to a third modification example of the second embodiment of the present technology.

FIG. 26 is a view illustrating an example of a stacked structure of the solid-state imaging element 200 according to the third modification example of the second embodiment of the present technology. The solid-state imaging element 200 of the third modification example of the second embodiment includes the upper pixel chip 201, the lower pixel chip 202, and a circuit chip 203. These chips are stacked, and are electrically connected by, for example, Cu—Cu bonding. Note that, in addition to the Cu—Cu bonding, the connection can be made using a via or a bump.

An upper pixel array unit 221 is disposed in the upper pixel chip 201. The lower pixel array unit 222 is disposed in the lower pixel chip 202. For each pixel in the pixel array unit 220, a part of the pixel is disposed in the upper pixel array unit 221, and the rest is disposed in the lower pixel array unit 222.

Furthermore, in the circuit chip 203, the column signal processing circuit 260, the vertical scanning circuit 211, the timing control circuit 212, the DAC 213, and the load MOS circuit block 250 are disposed. Circuits other than the column signal processing circuit 260 are omitted in the drawing.

Adopting the three-layer configuration as illustrated in the drawing allows a reduction in unnecessary space and further pixel miniaturization as compared with the two-layer configuration. Furthermore, the lower pixel chip 202 that is the second layer can be manufactured by a dedicated process for the capacitor and switch.

In this way, in the third modification example of the second embodiment of the present technology, since the circuits in the solid-state imaging element 200 are dispersedly disposed in the three semiconductor chips, the pixel can be further miniaturized as compared with a case where the circuits are dispersedly disposed in the two semiconductor chips.

3. Third Embodiment

In the second embodiment described above, the reset level is sampled and held in the exposure period, but this configuration prevents the exposure period from being shorter than the sample and hold period of the reset level. A solid-state imaging element 200 of this third embodiment is different from the solid-state imaging element 200 of the second embodiment in that a transistor that discharges charges from a photoelectric conversion element is added to make the exposure period shorter.

Figure 27:
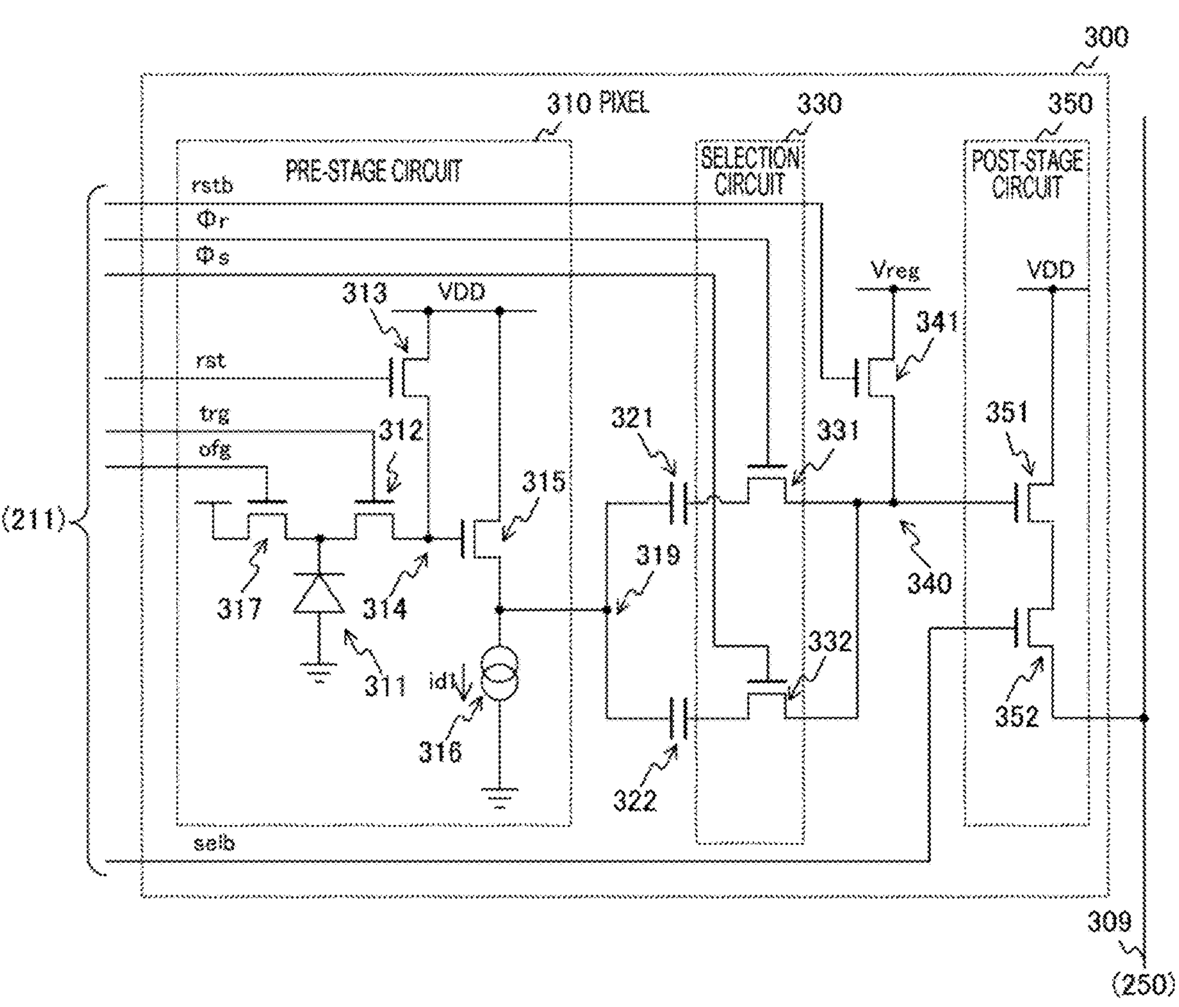
FIG. 27 is a circuit diagram illustrating a configuration example of a pixel according to a third embodiment of the present technology.

FIG. 27 is a circuit diagram illustrating a configuration example of a pixel 300 according to the third embodiment of the present technology. The pixel 300 of the third embodiment is different from the pixel 300 of the second embodiment in that a discharge transistor 317 is further provided in the pre-stage circuit 310.

The discharge transistor 317 functions as an overflow drain that discharges charges from the photoelectric conversion element 311 in accordance with a discharge signal ofg from the vertical scanning circuit 211. As the discharge transistor 317, for example, an nMOS transistors is used.

In a configuration in which the discharge transistor 317 is not provided as in the second embodiment, blooming may occur when charges are transferred from the photoelectric conversion element 311 to the FD 314 for all pixels. Then, at the time of FD reset, the potential of the FD 314 and the potential of the pre-stage node 319 drop. In response to the drop in potential, charging and discharging currents of the capacitor elements 321 and 322 continue to occur, and IR drop in the power supply or the ground changes from a steady state without blooming.

On the other hand, at the time of sampling and holding the signal levels of all pixels, after the transfer of the signal charges, the photoelectric conversion element 311 has no charge, so that blooming does not occur, and IR drop in the power supply or the ground goes into the steady state without blooming. Due to a difference in IR drop at the time of sampling and holding the reset level and the signal level, streaking noise occurs.

On the other hand, in the third embodiment in which the discharge transistor 317 is provided, the charges in the photoelectric conversion element 311 are discharged toward the overflow drain. Therefore, IR drops at the time of sampling and holding the reset level and the signal level become almost identical to each other, so that it is possible to suppress streaking noise.

Figure 28:
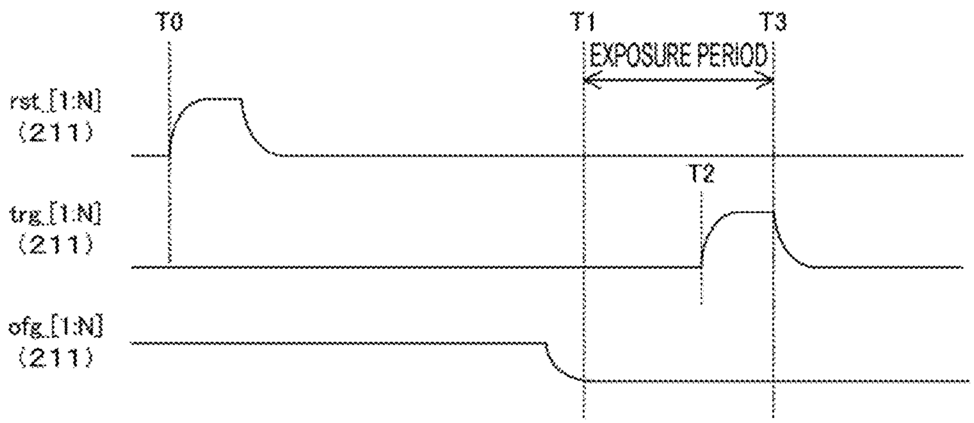
FIG. 28 is a timing chart illustrating an example of a global shutter operation according to a fourth embodiment of the present technology.

FIG. 28 is a timing chart illustrating an example of a global shutter operation according to the third embodiment of the present technology. At timing TO before the start of exposure, the vertical scanning circuit 211 supplies a high-level FD reset signal rst to all pixels over the pulse period while setting the discharge signal ofg to the high level for all pixels. Accordingly, the PD reset and the FD reset are performed for all pixels. Furthermore, the reset level is sampled and held. Here, ofg [n] in the drawing indicates signals to pixels in the n-th row of the N rows.

Then, at timing T1 that is the start of exposure, the vertical scanning circuit 211 returns the discharge signal ofg to the low level for all pixels. Then, the vertical scanning circuit 211 supplies a high-level transfer signal trg to all pixels over a period from timing T2 immediately before the end of exposure to timing T3 at the end of exposure. Accordingly, the signal level is sampled and held.

In a configuration in which the discharge transistor 317 is not provided as in the second embodiment, both the transfer transistor 312 and the FD reset transistor 313 need to be turned on at the start of exposure (that is, at the time of PD reset). With this control, at the time of PD reset, the FD 314 also needs to be reset at the same time. Therefore, it is necessary to perform the FD reset again within the exposure period and sample and hold the reset level, and the exposure period cannot be made shorter than the sample and hold period of the reset level. When the reset levels of all pixels are sampled and held, a certain waiting time is required until the voltage or the current stabilizes, and for example, a sample and hold period of several microseconds (μs) to several tens of microseconds (μs) is required.

On the other hand, in the third embodiment in which the discharge transistor 317 is provided, the PD reset and the FD reset can be separately performed. Therefore, as illustrated in the drawing, it is possible to sample and hold the reset level by performing the FD reset before cancellation of the PD reset (the start of exposure). Thereby, the exposure period can be made shorter than the sample hold period of the reset level.

Note that, the first to third modification examples of the second embodiment can also be applied to the third embodiment.

In this way, according to the third embodiment of the present technology, since the discharge transistor 317 that discharges charges from the photoelectric conversion element 311 is provided, it is possible to sample and hold the reset level by performing the FD reset before the start of exposure. Thereby, the exposure period can be made shorter than the sample hold period of the reset level.

4. Fourth Embodiment

In the second embodiment described above, the FD 314 is initialized with the power supply voltage VDD, but there is a possibility that this configuration causes deterioration of photo response non-uniformity (PRNU) due to variations of the capacitor elements 321 and 322 or parasitic capacitance. A solid-state imaging element 200 of this fourth embodiment is different from the solid-state imaging element 200 of the second embodiment in that PRNU is improved by lowering the power supply of the FD reset transistor 313 during reading.

Figure 29:
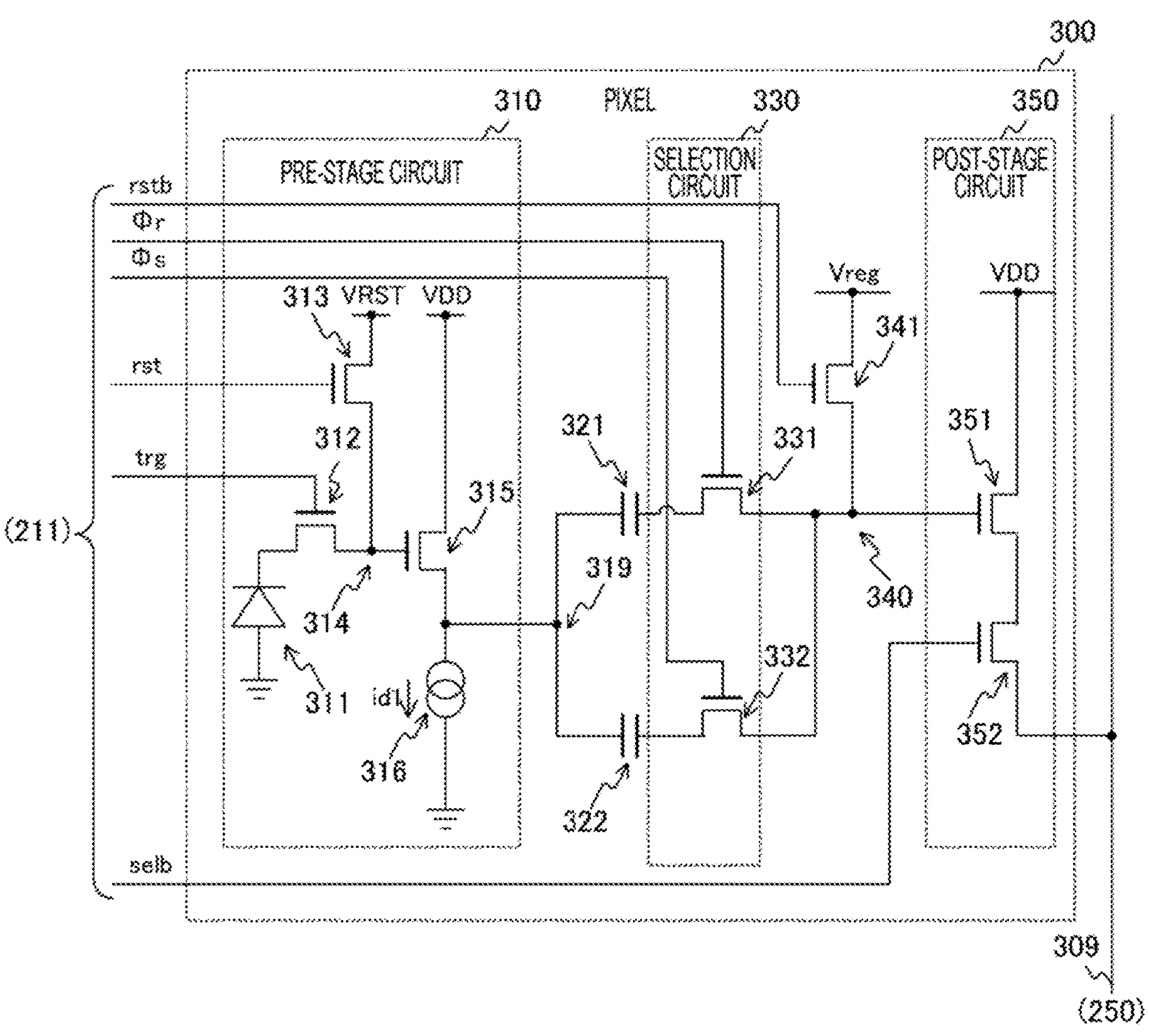
FIG. 29 is a circuit diagram illustrating a configuration example of a pixel according to the fourth embodiment of the present technology.

FIG. 29 is a circuit diagram illustrating a configuration example of a pixel 300 according to the fourth embodiment of the present technology. The pixel 300 of the fourth embodiment is different from the pixel 300 of the second embodiment in that the power supply of the FD reset transistor 313 is separated from the power supply voltage VDD of the pixel 300.

The FD reset transistor 313 of the fourth embodiment has a drain connected to a reset power supply voltage VRST. The reset power supply voltage VRST is controlled by, for example, the timing control circuit 212.

Figure 30:
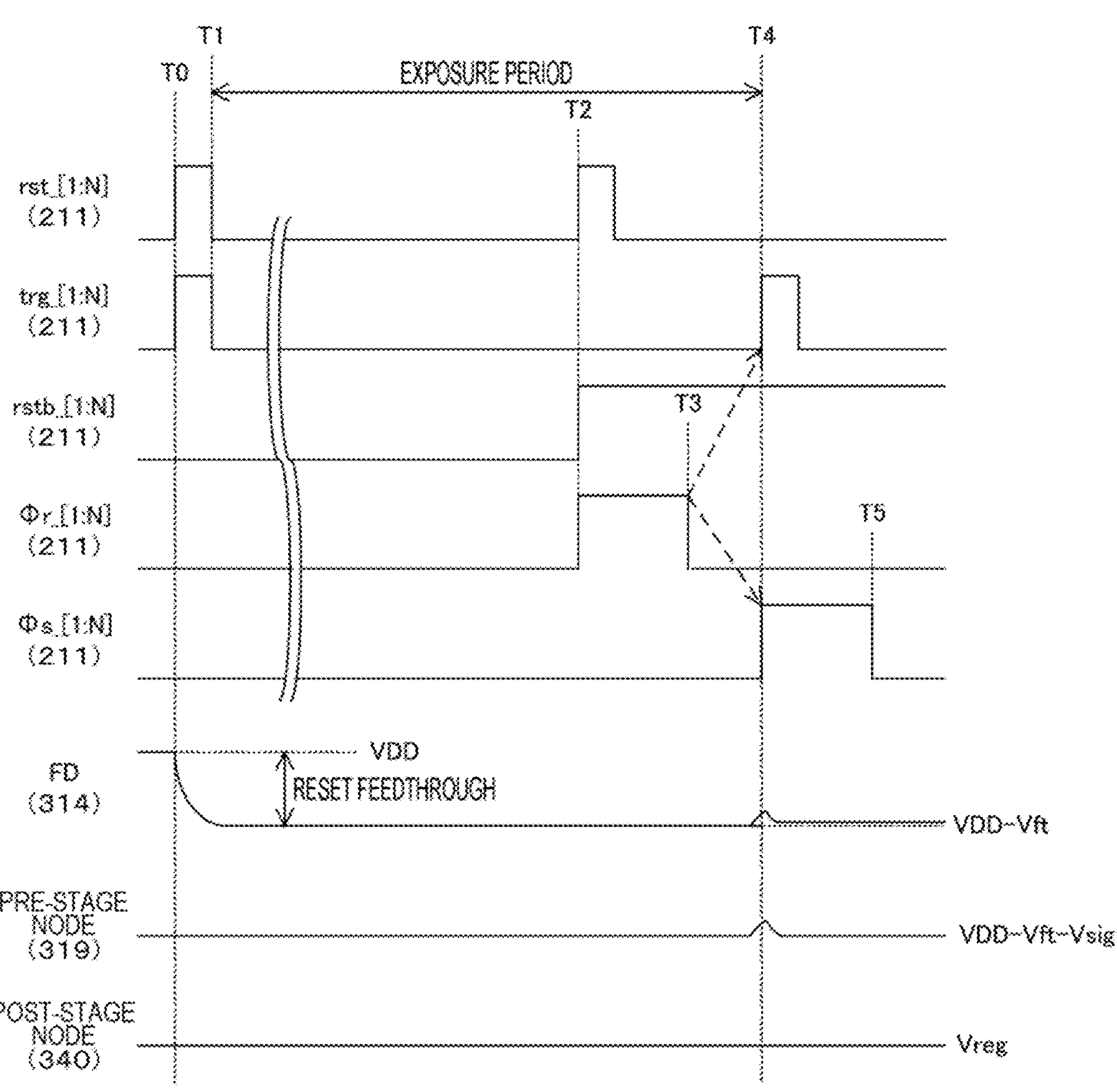
FIG. 30 is a diagram for describing reset feedthrough according to the fourth embodiment of the present technology.
Figure 31:
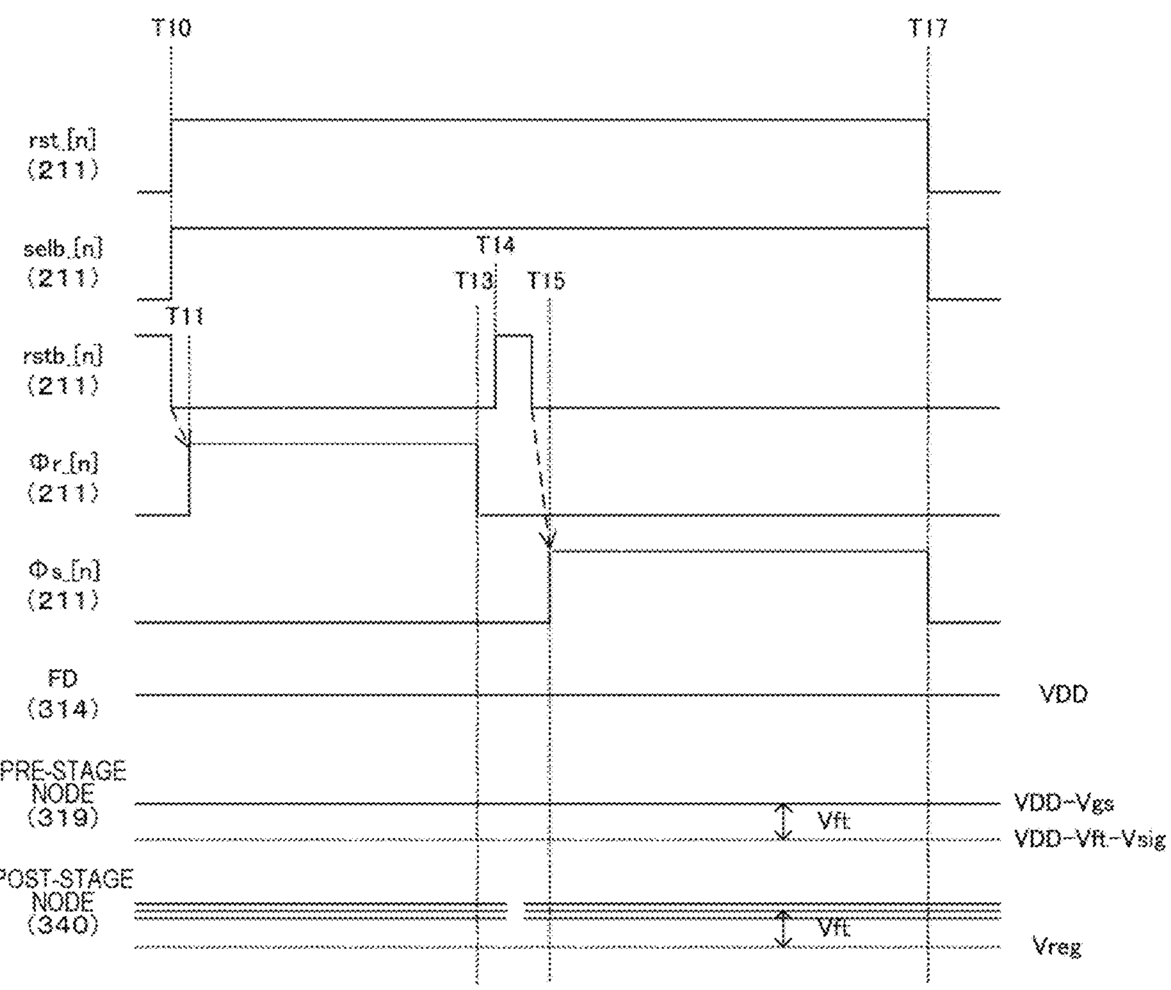
FIG. 31 is a diagram for describing variations in level caused by reset feedthrough according to the fourth embodiment of the present technology.

Here, deterioration of PRNU in the pixel 300 of the second embodiment will be considered with reference to FIGS. 30 and 31. In the second embodiment, as illustrated in FIG. 30, at timing TO immediately before the start of exposure, the potential of the FD 314 decreases due to reset feedthrough of the FD reset transistor 313. This variation is denoted as Vft.

In the second embodiment, since the power supply voltage of the FD reset transistor 313 is VDD, the potential of the FD 314 varies from VDD to VDD-Vft at timing TO. Furthermore, the potential of the pre-stage node 319 during exposure becomes equal to VDD-Vft-Vsig.

Furthermore, in the second embodiment, as illustrated in FIG. 31, the FD reset transistor 313 shifts to the on state during reading to fix the FD 314 to the power supply voltage VDD. The potential of the pre-stage node 319 and the potential of the post-stage node 340 during reading are shifted higher by about the variation Vft of the FD 314. However, due to variations in capacitance values of the capacitor elements 321 and 322 or parasitic capacitance, the shift voltage amount varies for each pixel, which causes deterioration of PRNU.

The amount of transition of the post-stage node 340 in a case where the pre-stage node 319 transitions by Vft is expressed by, for example, the following expression.

$$\{(Cs+\delta Cs)/(Cs+\delta Cs+Cp)\}*Vft \qquad \text{Expression 2}$$

In the above expression, Cs is a capacitance value of the capacitor element 322 on the signal level side, and δCs is a variation in Cs. Cp is a capacitance value of the parasitic capacitance of the post-stage node 340.

Expression 2 can be approximated by the following expression.

$$\{1-(\delta Cs/Cs)*(Cp/Cs)\}*Vft \qquad \text{Expression 3}$$

From Expression 3, the variations of the post-stage node 340 can be expressed by the following expression.

$$\{(\delta Cs/Cs)*(Cp/Cs)\}*Vft \qquad \text{Expression 4}$$

With (δCs/Cs) set to $10^{-2}$, (Cp/Cs) set to $10^{-1}$, and Vft set to 400 millivolt (mV), PRNU is 400 μVrms according to Expression 4, which is a relatively large value.

In particular, in order to reduce kTC noise during sampling and holding input conversion capacitance, it is necessary to increase a charge-voltage conversion efficiency of the FD 314. In order to increase the Charge-voltage conversion efficiency, it is necessary to reduce the capacitance of the FD 314, but the smaller the capacitance of the FD 314, the larger the variation Vft, which may be several hundred millivolts (mV). In this case, PRNU impact may be non-negligible according to Expression 6.

Figure 32:
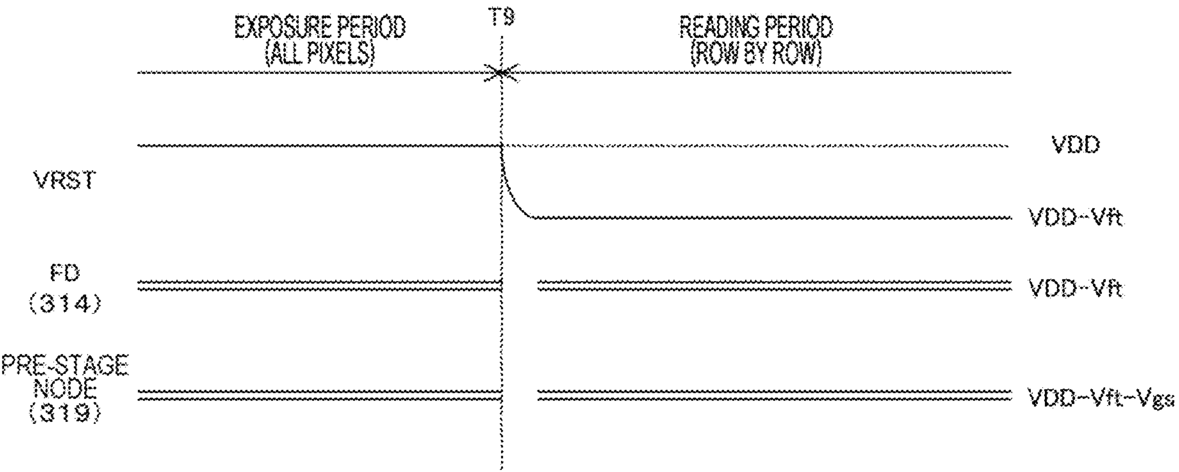
FIG. 32 is a timing chart illustrating an example of voltage control according to the fourth embodiment of the present technology.

FIG. 32 is a timing chart illustrating an example of voltage control according to the fourth embodiment of the present technology.

The timing control circuit 212 performs control to make the reset power supply voltage VRST for the row-by-row read period after timing 19 different from the reset power supply voltage VRST for the exposure period.

For example, for the exposure period, the timing control circuit 212 sets the reset power supply voltage VRST identical to the power supply voltage VDD. On the other hand, during the read period, the timing control circuit 212 decreases the reset power supply voltage VRST to VDD-Vft. That is, during the read period, the timing control circuit 212 decreases the reset power supply voltage VRST by amount approximately equal to the variation Vft caused by reset feedthrough. Through this control, the reset level of the FD 314 can be made the same during exposure and during reading.

Controlling the reset power supply voltage VRST allows, as illustrated in the drawing, a reduction in variations in voltage of the FD 314 and the pre-stage node 319. Therefore, it is possible to suppress variations of the capacitor elements 321 and 322 and deterioration of PRNU due to parasitic capacitance.

Note that the first to third modification examples of the second embodiment or the third embodiment can also be applied to the fourth embodiment.

In this way, according to the fourth embodiment of the present technology, since the timing control circuit 212 decreases the reset power supply voltage VRST by the variation Vft caused by reset feedthrough during reading, it is possible to make the reset level during exposure and the reset level during reading identical to each other. Therefore, it is possible to suppress deterioration of photo response non-uniformity (PRNU).

5. Fifth Embodiment

In the second embodiment described above, the reset level and the signal level are read in this order for each frame, but there is a possibility that this configuration causes deterioration of photo response non-uniformity (PRNU) due to variations of the capacitor elements 321 and 322 or parasitic capacitance. A solid-state imaging element 200 of this fifth embodiment is different from the solid-state imaging element 200 of the second embodiment in that PRNU is improved by switching between the level held in the capacitor element 321 and the level held in the capacitor element 322 for each frame.

The solid-state imaging element 200 of the fifth embodiment continuously captures a plurality of frames in synchronization with the vertical synchronization signal. An odd-numbered frame is referred to as "odd frame", and an even-numbered frame is referred to as "even frame".

Figure 33:
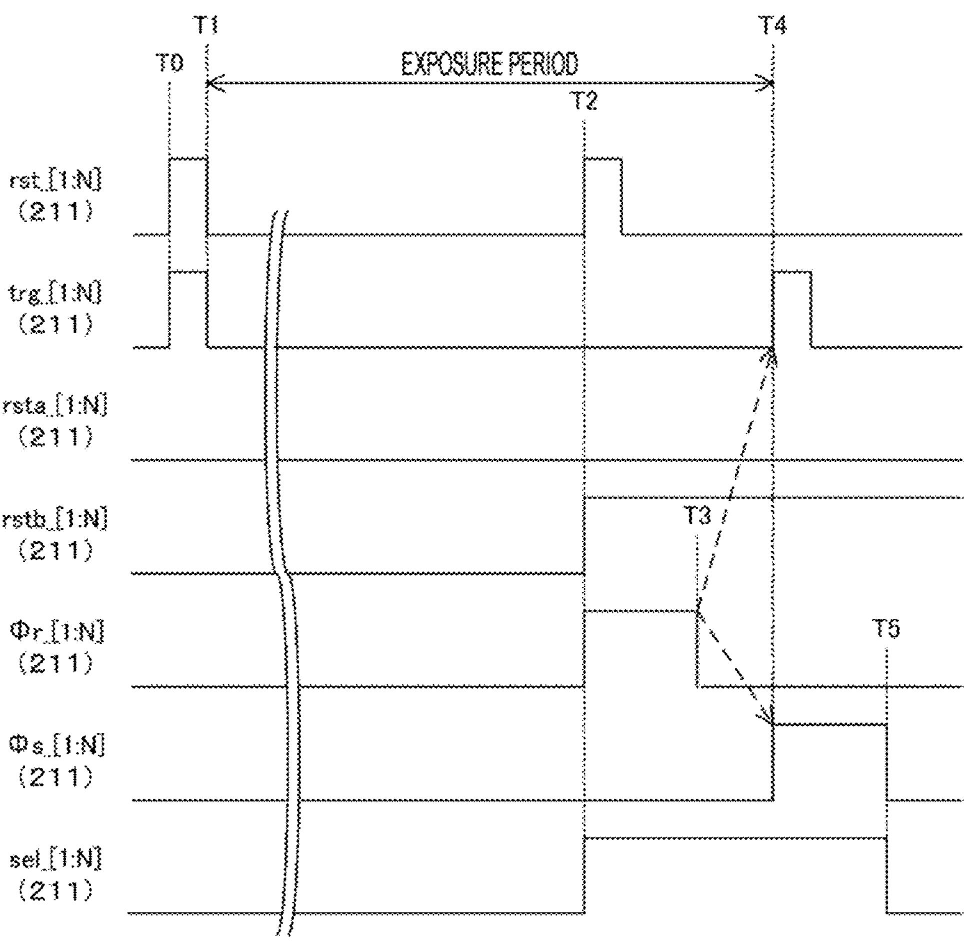
FIG. 33 is a timing chart illustrating an example of a global shutter operation for odd frames according to a fifth embodiment of the present technology.

FIG. 33 is a timing chart illustrating an example of a global shutter operation for odd frames according to the fifth embodiment. The pre-stage circuit 310 in the solid-state imaging element 200 sets the selection signal Ør and the selection signal Φs to the high level in this order within the exposure period of the odd frame, so as to cause the capacitor element 321 to hold the reset level and then cause the capacitor element 322 to hold the signal level.

Figure 34:
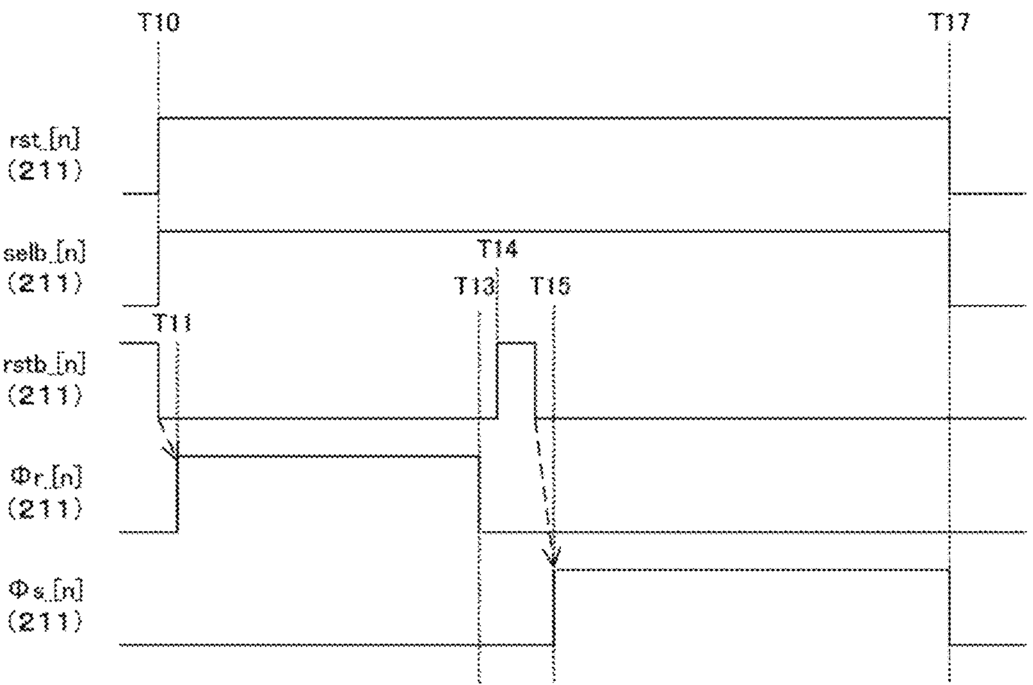
FIG. 34 is a timing chart illustrating an example of a read operation for odd frames according to the fifth embodiment of the present technology.

FIG. 34 is a timing chart illustrating an example of a read operation for odd frames according to the fifth embodiment of the present technology. The post-stage circuit 350 in the solid-state imaging element 200 sets the selection signal Φr and the selection signal Φs to the high level in this order to read the reset level and the signal level in this order within the read period of the odd frame.

Figure 35:
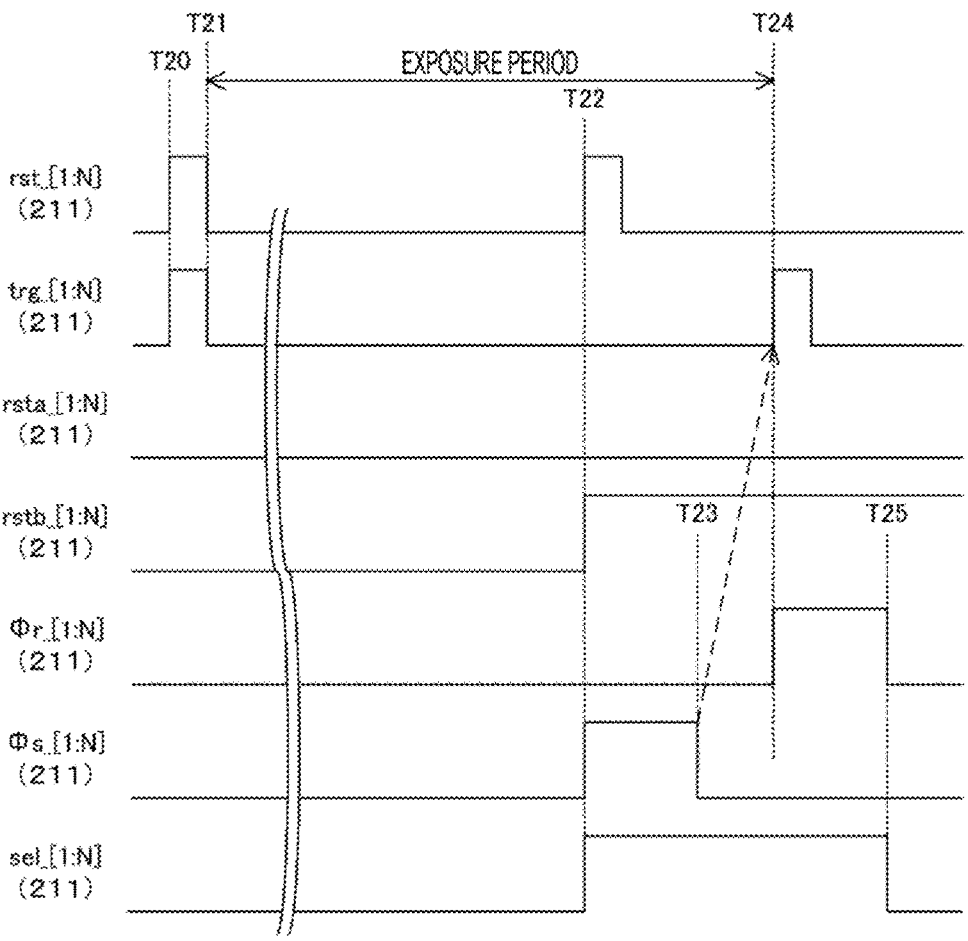
FIG. 35 is a timing chart illustrating an example of a global shutter operation for even frames according to the fifth embodiment of the present technology.

FIG. 35 is a timing chart illustrating an example of a global shutter operation for even frames according to the fifth embodiment. The pre-stage circuit 310 in the solid-state imaging element 200 sets the selection signal Φs and the selection signal Φr to the high level in this order within the exposure period of the even frame, so as to cause the capacitor element 322 to hold the reset level and then cause the capacitor element 321 to hold the signal level.

Figure 36:
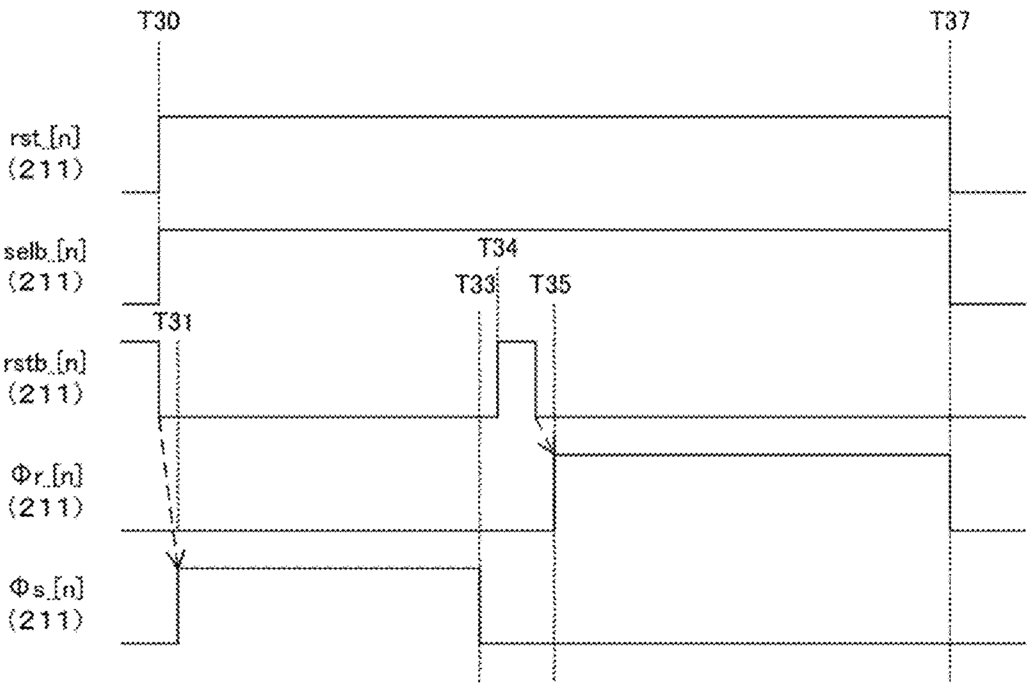
FIG. 36 is a timing chart illustrating an example of a read operation for even frames according to the fifth embodiment of the present technology.

FIG. 36 is a timing chart illustrating an example of a read operation for even frames according to the fifth embodiment of the present technology. The post-stage circuit 350 in the solid-state imaging element 200 sets the selection signal Φs and the selection signal ør to the high level in this order to read the reset level and the signal level in this order within the read period of the even frame.

As illustrated in FIGS. 33 and 35, the levels held in the capacitor elements 321 and 322 are reversed between the even frame and the odd frame. Accordingly, the polarity of PRNU is also reversed between even and odd frames. The column signal processing circuit 260 in the subsequent stage obtains an arithmetic mean of the odd frame and the even frame. Accordingly, it is possible to cancel out PRNU with opposite polarities.

This control is effective in capturing a moving image or adding up frames. Furthermore, it is not necessary to add an element to the pixel 300, and it can be achieved only by changing a driving system.

Note that the first to third modification examples of the second embodiment or the third and fourth embodiments can also be applied to the fifth embodiment.

In this way, according to the fifth embodiment of the present technology, since the level held in the capacitor element 321 and the level held in the capacitor element 322 are reversed between the odd frame and the even frame, the polarity of PRNU can be reversed between the odd frame and the even frame. The column signal processing circuit 260 adds up the odd frame and the even frame, so that it is possible to suppress deterioration of PRNU.

6. Sixth Embodiment

In the second embodiment described above, the column signal processing circuit 260 obtains a difference between the reset level and the signal level for each column. However, there is a possibility that this configuration suffers, when very high intensity light is incident on the pixel, a black spot phenomenon in which luminance decreases due to overflow of charges from the photoelectric conversion element 311 and sinks into black. A solid-state imaging element 200 of this sixth embodiment is different from the solid-state imaging element 200 of the second embodiment in that whether or not the black spot phenomenon has occurred is determined for each pixel.

Figure 37:
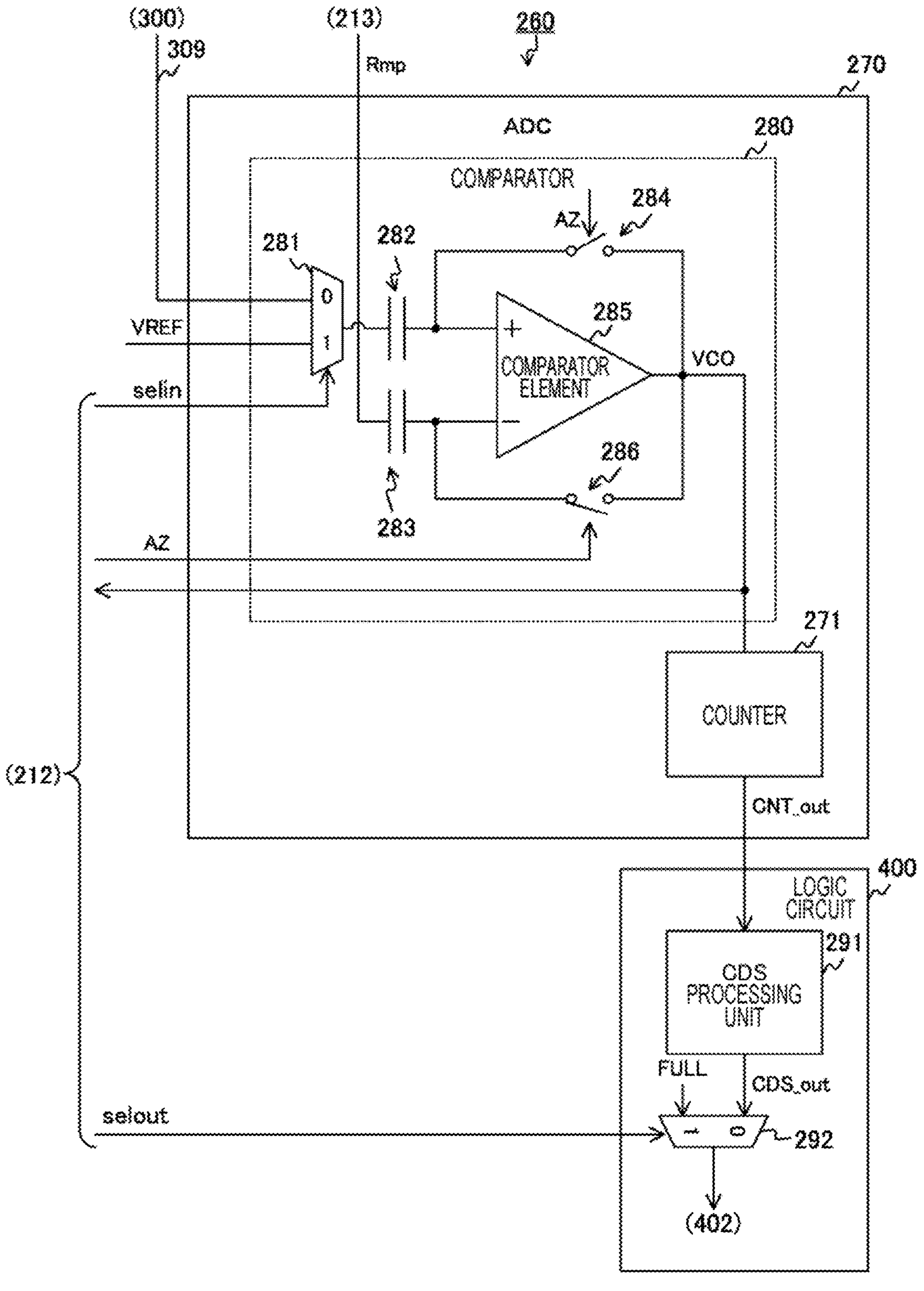
FIG. 37 is a circuit diagram illustrating a configuration example of a column signal processing circuit according to a sixth embodiment of the present technology.

FIG. 37 is a circuit diagram illustrating a configuration example of a column signal processing circuit 260 according to the sixth embodiment of the present technology. In the column signal processing circuit 260 of the sixth embodiment, a plurality of ADCs 270 and a logic circuit 400 are disposed. In addition, a plurality of CDS processing units 291 and a plurality of selectors 292 are disposed in the logic circuit 400. The ADC 270, the CDS processing unit 291, and the selector 292 are provided for each column. Note that other circuits (the metadata extraction unit 404 and the like) in the logic circuit 400 are omitted in the drawing.

Furthermore, the ADC 270 includes a comparator 280 and a counter 271. The comparator 280 compares the level of the vertical signal line 309 with the ramp signal Rmp from the DAC 213, and outputs a comparison result VCO. The comparison result VCO is supplied to the counter 271 and the timing control circuit 212. The comparator 280 includes a selector 281, capacitor elements 282 and 283, auto-zero switches 284 and 286, and a comparator element 285.

The selector 281 connects either the vertical signal line 309 of the corresponding column or a node of a predetermined reference voltage VREF to a non-inverting input terminal (+) of the comparator element 285 via the capacitor element 282 in accordance with an input-side selection signal selin. The input-side selection signal selin is supplied from the timing control circuit 212. Note that the selector 281 is an example of an input-side selector described in the claims.

The comparator element 285 compares a level of the non-inverting input terminal (+) with a level of an inverting input terminal (−), and outputs the comparison result VCO to the counter 271. The ramp signal Rmp is input to the inverting input terminal (−) via the capacitor element 283.

The auto-zero switch 284 short-circuits the non-inverting input terminal (+) and an output terminal of the comparison result VCO in accordance with an auto-zero signal Az from the timing control circuit 212. The auto-zero switch 286 short-circuits the inverting input terminal (−) and the output terminal of the comparison result Vco in accordance with the auto-zero signal Az.

The counter 271 counts a count value over a period until the comparison result VCO is inverted, and outputs a digital signal CNT_out indicating the count value to the CDS processing unit 291.

The CDS processing unit 291 performs CDS processing on the digital signal CNT_out. The CDS processing unit 291 calculates a difference between the digital signal CNT_out corresponding to the reset level and the digital signal CNT_out corresponding to the signal level, and outputs the difference to the selector 292 as CDS_out.

The selector 292 outputs, in accordance with an output-side selection signal selout from the timing control circuit 212, either the digital signal CDS_out subjected to the CDS processing or a full-code digital signal FULL as pixel data of the corresponding column. Note that the selector 292 is an example of an output-side selector described in the claims.

Figure 38:
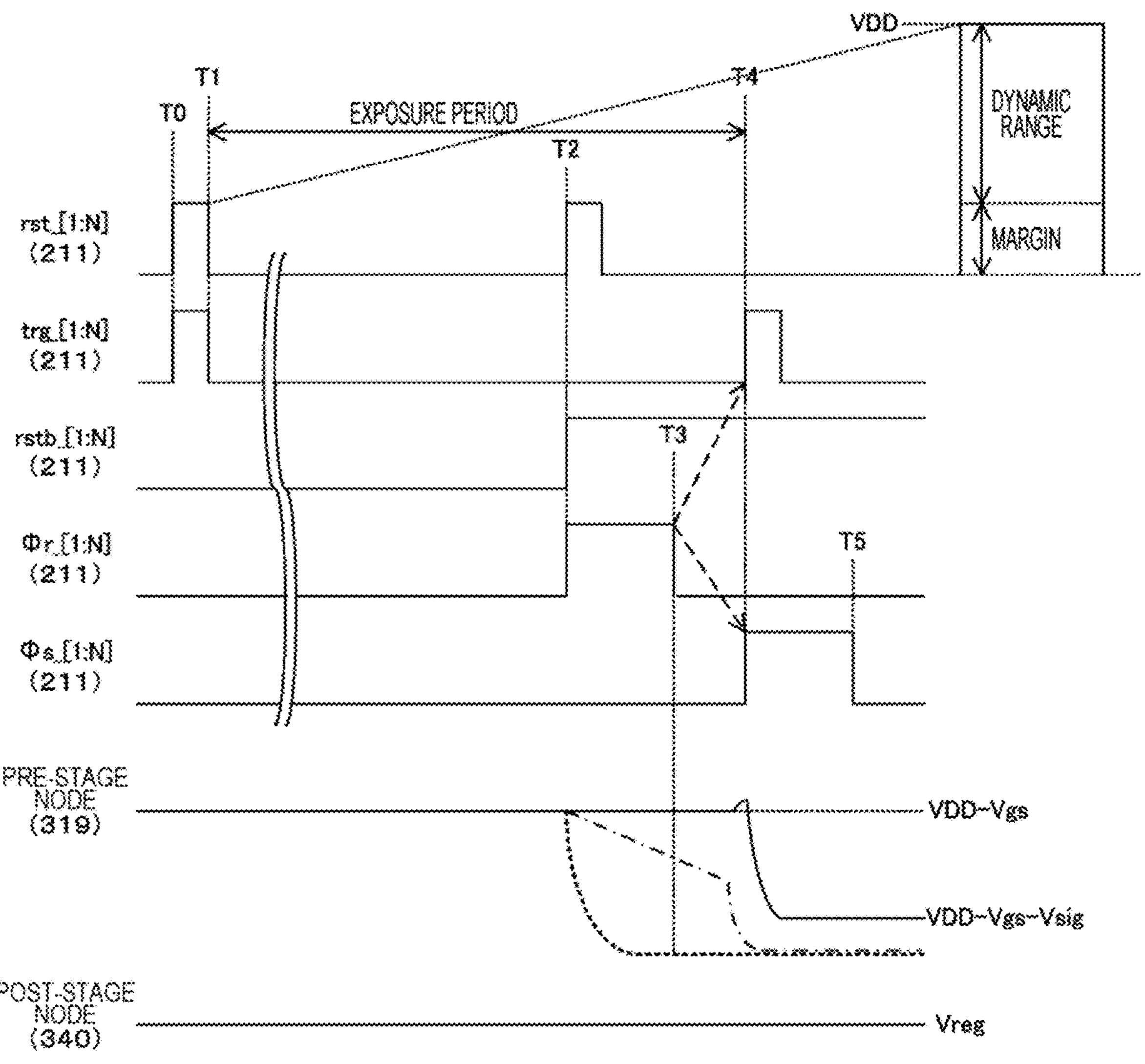
FIG. 38 is a timing chart illustrating an example of a global shutter operation according to the sixth embodiment of the present technology.

FIG. 38 is a timing chart illustrating an example of a global shutter operation according to the sixth embodiment of the present technology. A method for controlling transistors at the time of global shutter in the sixth embodiment is similar to the method in the second embodiment.

Here, it is assumed that very high intensity light is incident on the pixel 300. In this case, the photoelectric conversion element 311 becomes full of charges and the charges overflow from the photoelectric conversion element 311 to the FD 314, thereby causing a decrease in potential of the FD 314 subjected to the ED reset. A long dashed short dashed line in the drawing indicates variations in potential of the FD 314 when weak sunlight that causes a relatively small amount of charges to overflow is incident. A dotted line in the drawing indicates variations in potential of the FD 314 when strong sunlight that causes a relatively large amount of charges to overflow is incident.

When weak sunlight is incident, the reset level is dropping at timing T3 when the FD reset is completed, but the level does not fully drop at this time.

On the other hand, when strong sunlight is incident, the reset level fully drops at timing T3. In this case, the signal level becomes the same as the reset level, and the potential difference between the signal level and the reset level becomes "0", so that the digital signal subjected to the CDS processing becomes the same as a digital signal in a dark state and sinks into black. In this way, a phenomenon in which the pixel becomes black even though very high intensity light such as sunlight is incident is called a black spot phenomenon or blooming.

Furthermore, when the level of the FD 314 of the pixel in which the black spot phenomenon has occurred is too low, the operating point of the pre-stage circuit 310 cannot be secured, and the current id1 of the current source transistor 316 varies accordingly. Since the current source transistor 316 of each pixel is connected to a common power supply or ground, when a certain pixel suffers variations in current, variations in IR drop in the pixel affect a sample level of another pixel. A pixel in which the black spot phenomenon occurs becomes an aggressor, and a pixel whose sample level fluctuates due to the pixel becomes a victim. As a result, streaking noise occurs.

Note that, in a case where the discharge transistor 317 is provided as in the third embodiment, in a pixel suffering a black spot (blooming), overflow charges are discharged toward the discharge transistor 317, so that the black spot phenomenon is less likely to occur. However, even if the discharge transistor 317 is provided, some charges may flow to the FD 314, and the black spot phenomenon may be difficult to get rid of completely. Moreover, there is also a disadvantage that a ratio of the effective area/the charge amount for each pixel decreases due to the addition of the discharge transistor 317. Therefore, it is desirable to suppress the black spot phenomenon without using the discharge transistor 317.

As a method for suppressing the black spot phenomenon without using the discharge transistor 317, there are two possible methods. The first is adjustment of a clip level of the FD 314. The second is a method in which whether or not the black spot phenomenon has occurred during reading is determined, and when the black spot phenomenon has occurred, the output is replaced with the full code.

Regarding the first method, the high level of the FD reset signal rst (in other words, the gate of the FD reset transistor 313) in the drawing corresponds to the power supply voltage VDD, and the low level corresponds to the clip level of the FD 314. In the first embodiment, a difference between the high level and the low level (that is, amplitude) is set to a value corresponding to a dynamic range. In contrast, in the sixth embodiment, the value is adjusted to a value that further adds a margin to that value. Here, the value corresponding to the dynamic range corresponds to a difference between the power supply voltage VDD and the potential of the ED 314 when the digital signal becomes the full code.

Lowering the gate voltage (the low level of the FD reset signal rst) when the FD reset transistor 313 is off makes it possible to prevent the FD 314 from being excessively lowered due to blooming and the operating point of the pre-stage amplification transistor 315 from being lost.

Note that the dynamic range varies in a manner that depends on the analog gain of the ADC. When the analog gain is low, a large dynamic range is required; conversely, when the analog gain is high, a small dynamic range is required. Therefore, it is possible to change the gate voltage when the FD reset transistor 313 is off in accordance with the analog gain.

Figure 39:
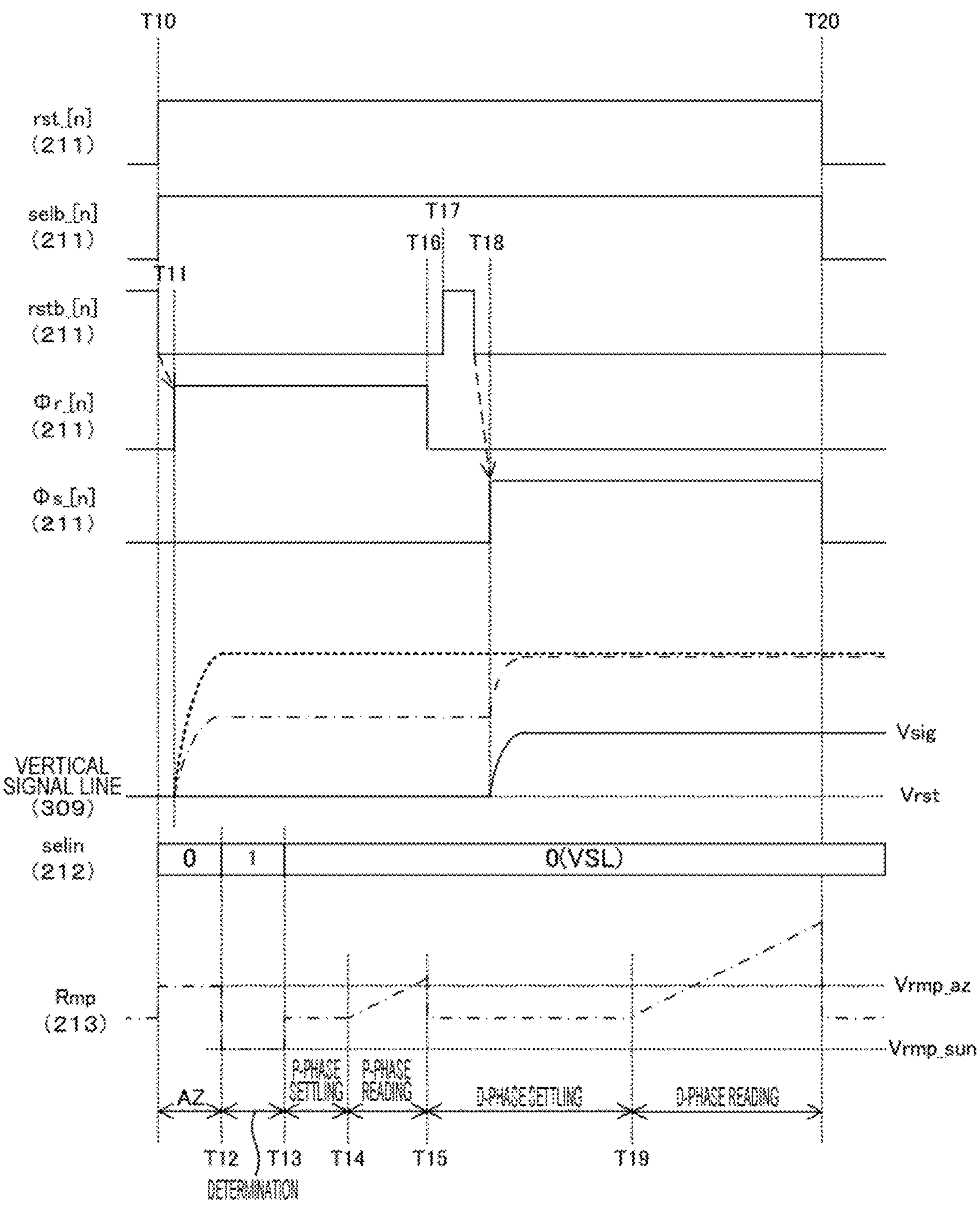
FIG. 39 is a timing chart illustrating an example of a read operation according to the sixth embodiment of the present technology.

FIG. 39 is a timing chart illustrating an example of a read operation according to the sixth embodiment of the present technology. When the selection signal or becomes the high level at timing T11 immediately after timing T10 that is the start of reading, the potential of the vertical signal line 309 varies in the pixel on which sunlight is incident. A long dashed short dashed line in the drawing indicates variations in potential of the vertical signal line 309 when weak sunlight is incident. A dotted line in the drawing indicates variations in potential of the vertical signal line 309 when strong sunlight is incident.

In an auto-zero period from timing T10 to timing T12, the timing control circuit 212 supplies, for example, the input-side selection signal selin of "0" to connect the comparator element 285 to the vertical signal line 309. Within this auto-zero period, the timing control circuit 212 performs auto-zero using the auto-zero signal Az.

Regarding the second method, the timing control circuit 212 supplies, for example, the input-side selection signal selin of "1" within a determination period from timing T12 to timing T13. The input-side selection signal selin disconnects the comparator element 285 from the vertical signal line 309 and connects the comparator element 285 to the node of the reference voltage VREF. The reference voltage VREF is set to an expected value of the level of the vertical signal line 309 when blooming does not occur. For example, when the gate-source voltage of the post-stage amplification transistor 351 is denoted as Vgs2, Vrst corresponds to Vreg-Vgs2. Furthermore, the DAC 213 lowers the level of the ramp signal Rmp from Vrmp_az to Vrmp_sun within the determination period.

Furthermore, in a case where blooming does not occur within the determination period, the reset level Vrst of the vertical signal line 309 is almost the same as the reference voltage VREF, and is not much different from when the potential of the inverting input terminal (+) of the comparator element 285 is auto-zero. On the other hand, since the non-inverting input terminal (−) lowers from Vrmp_az to Vrmp_sun, the comparison result VCO becomes the high level.

Conversely, in a case where blooming occurs, the reset level Vrst becomes sufficiently higher than the reference voltage VREF, and the comparison result Vco becomes the low level when the following expression is established.

$$Vrst - VREF > \mathrm{Vrmp\_az} - \mathrm{Vrmp\_sun} \qquad \text{Expression 5}$$

That is, the timing control circuit 212 can determine whether or not blooming has occurred on the basis of whether or not the comparison result VCO becomes the low level within the determination period.

Note that it is necessary to secure some large margin for sun determination (the right side of Expression 5) so as to prevent erroneous determination due to variations in threshold voltage of the post-stage amplification transistor 351, IR drop differences of the in-plane Vreg, or the like.

After timing T13 after the determination period has elapsed, the timing control circuit 212 connects the comparator element 285 to the vertical signal line 309. Furthermore, after a P-phase settling period from timing T13 to timing T14 has elapsed, the P-phase is read within a period from timing T14 to timing T15. After a D-phase settling period from timing T15 to timing T19 has elapsed, the D-phase is read within a period from timing T19 to timing T20.

In a case where it is determined that blooming has not occurred during the determination period, the timing control circuit 212 controls the selector 292 in accordance with the output-side selection signal selout to output the digital signal CDS_out subjected to the CDS processing as it is.

On the other hand, in a case where it is determined that blooming has occurred during the determination period, the timing control circuit 212 controls the selector 292 in accordance with the output-side selection signal selout to output the full code FULL instead of the digital signal CDS_out subjected to the CDS processing. Therefore, it is possible to suppress the black spot phenomenon.

Note that the first to third modification examples of the second embodiment or the third to fifth embodiments can also be applied to the sixth embodiment.

In this way, according to the sixth embodiment of the present technology, since the timing control circuit 212 determines whether or not the black spot phenomenon has occurred on the basis of the comparison result VCO, and outputs the full code when the black spot phenomenon has occurred, it is possible to suppress the black spot phenomenon.

7. Seventh Embodiment

In the second embodiment described above, the vertical scanning circuit 211 performs control to simultaneously expose all rows (all pixels) (that is, the global shutter operation). However, in a case where the simultaneity of exposure is not required, but low noise is required, such as during test or analysis, it is desirable to perform a rolling shutter operation. A solid-state imaging element 200 of this seventh embodiment is different from the solid-state imaging element 200 of the second embodiment in that the rolling shutter operation is performed during test or the like.

Figure 40:
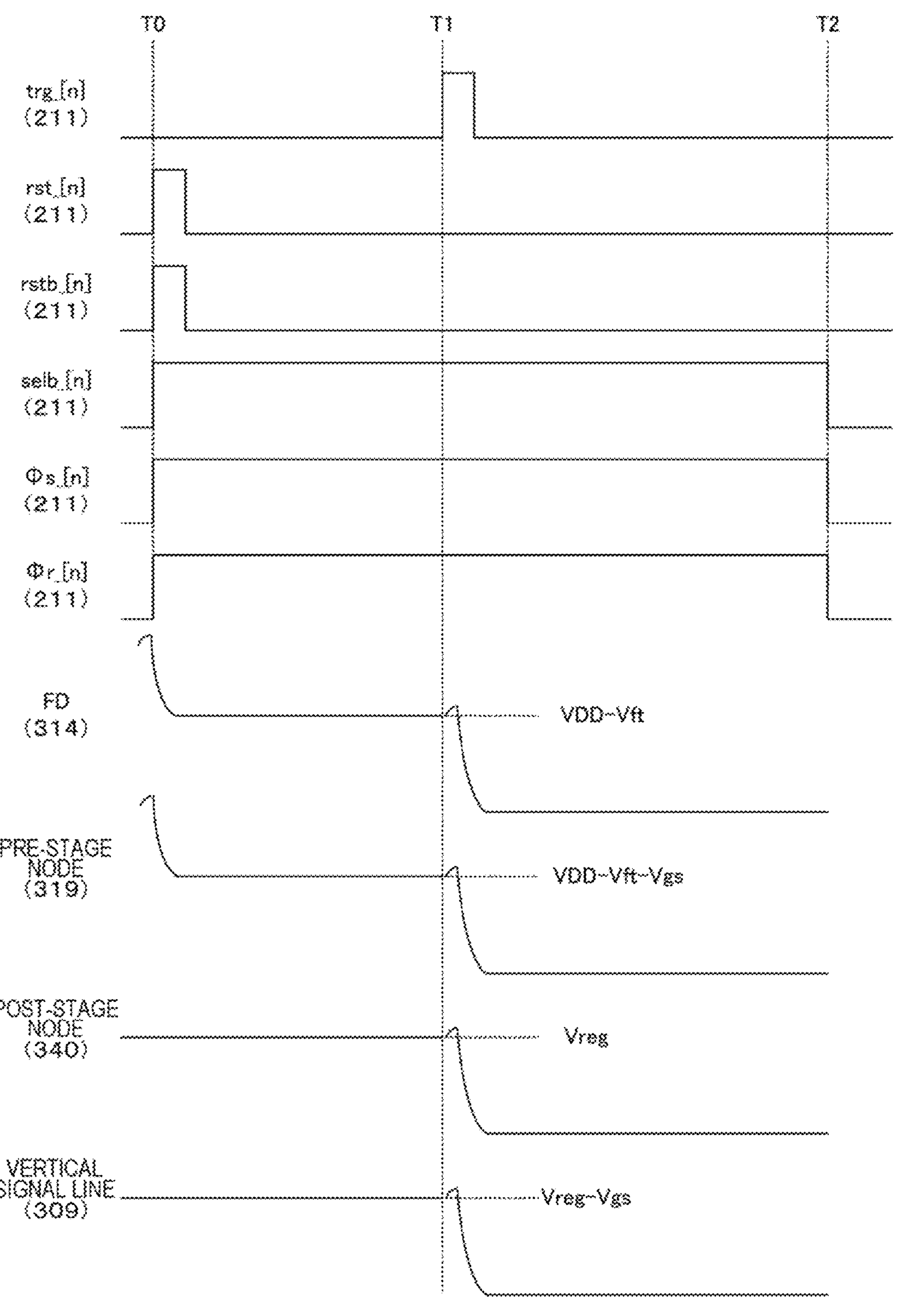
FIG. 40 is a timing chart illustrating an example of a rolling shutter operation according to a seventh embodiment of the present technology.

FIG. 40 is a timing chart illustrating an example of a rolling shutter operation according to the seventh embodiment of the present technology. The vertical scanning circuit 211 performs control to sequentially select a plurality of rows and start exposure. This drawing illustrates exposure control of the n-th row.

During the period from timing T0 to timing T2, the vertical scanning circuit 211 supplies a high-level post-stage selection signal selb, the high-level selection signal Φr, and the high-level selection signal Φs to the n-th row. Furthermore, at timing TO that is the start of exposure, the vertical scanning circuit 211 supplies a high-level FD reset signal rst and the high-level post-stage reset signal rstb to the n-th row over the pulse period. At timing T1 at the end of exposure, the vertical scanning circuit 211 supplies the transfer signal trg to the n-th row. The rolling shutter operation in the drawing allows the solid-state imaging element 200 to generate low-noise image data. Note that, it is assumed that the two times of AD conversion and metadata extraction described in the first embodiment are not executed in the rolling shutter operation of the drawing.

Note that, during normal imaging, the solid-state imaging element 200 of the seventh embodiment performs the global shutter operation in a manner similar to the second embodiment.

Furthermore, the first to third modification examples of the second embodiment or the third to sixth embodiments can also be applied to the seventh embodiment.

In this way, according to the seventh embodiment of the present technology, since the vertical scanning circuit 211 performs control to sequentially select a plurality of rows and start exposure (that is, the rolling shutter operation), it is possible to generate low-noise image data.

8. Eighth Embodiment

In the second embodiment described above, the source of the pre-stage source follower (the pre-stage amplification transistor 315 and the current source transistor 316) is connected to the power supply voltage VDD, and row-by-row reading is performed with the source follower in the on state. However, there is a possibility that this driving method causes circuit noise of the pre-stage source follower during row-by-row reading to propagate to the subsequent stages, and random noise increases accordingly. A solid-state imaging element 200 of this eighth embodiment is different from the solid-state imaging element 200 of the first embodiment in that the pre-stage source follower is brought into the off state during reading to reduce noise.

Figure 41:
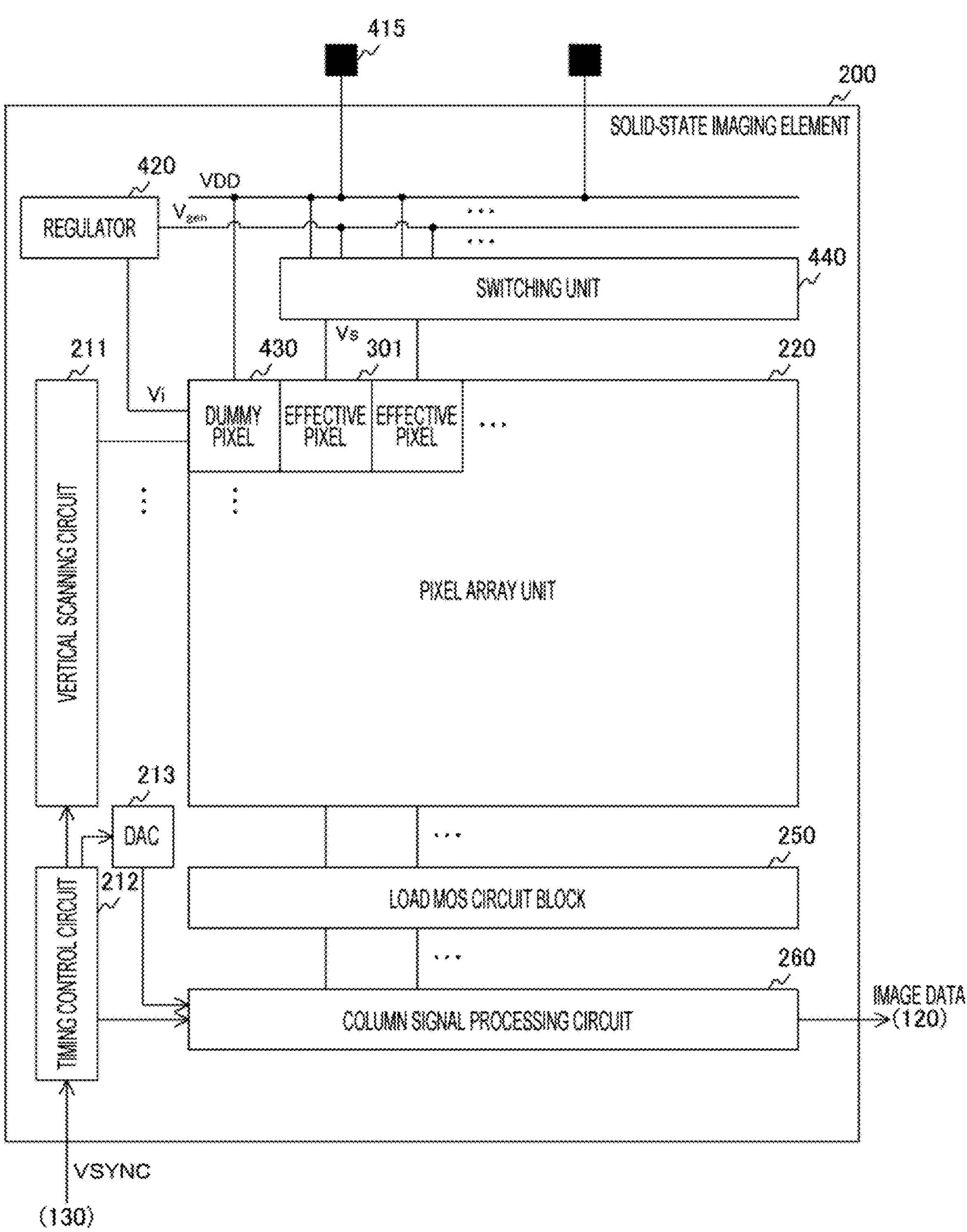
FIG. 41 is a block diagram illustrating a configuration example of a solid-state imaging element according to an eighth embodiment of the present technology.

FIG. 41 is a block diagram illustrating a configuration example of the solid-state imaging element 200 according to the eighth embodiment of the present technology. The solid-state imaging element 200 of the eighth embodiment is different from the solid-state imaging element 200 of the second embodiment in that a regulator 420 and a switching unit 440 are further provided. Furthermore, in the pixel array unit 220 of the eighth embodiment, a plurality of effective pixels 301 and a predetermined number of dummy pixels 430 are arranged. The dummy pixels 430 are arranged around a region where the effective pixels 301 are arranged.

Furthermore, the power supply voltage VDD is supplied to each of the dummy pixels 430, and the power supply voltage VDD and a source voltage Vs are supplied to each of the effective pixels 301. A signal line through which the power supply voltage VDD is supplied to the effective pixels 301 is omitted in the drawing. Furthermore, the power supply voltage VDD is supplied from a pad 415 located outside the solid-state imaging element 200.

The regulator 420 generates a constant generated voltage $V_{gen}$ on the basis of an input potential Vi from the dummy pixel 430 and supplies the generated voltage $V_{gen}$ to the switching unit 440. The switching unit 440 selects either the power supply voltage VDD from the pad 415 or the generated voltage $V_{gen}$ from the regulator 420, and supplies the selected voltage as the source voltage Vs to each of the columns of the effective pixels 301.

Figure 42:
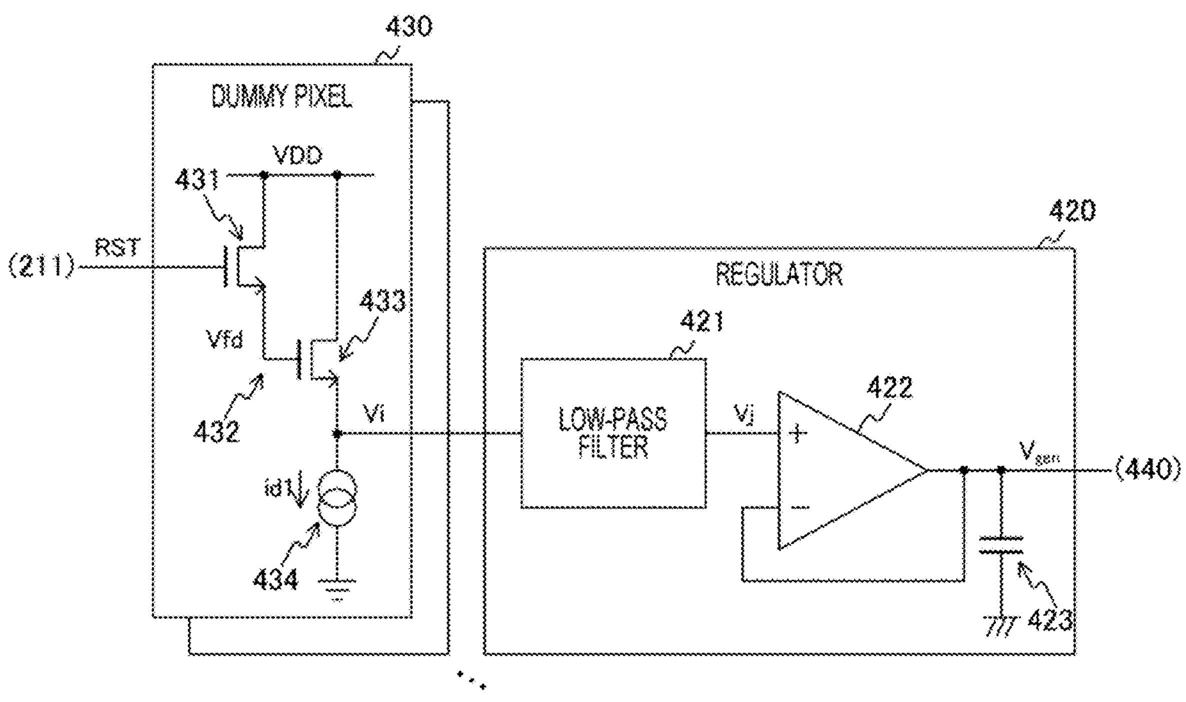
FIG. 42 is a circuit diagram illustrating a configuration example of a dummy pixel, a regulator, and a switching unit according to the eighth embodiment of the present technology.
Figure 42:
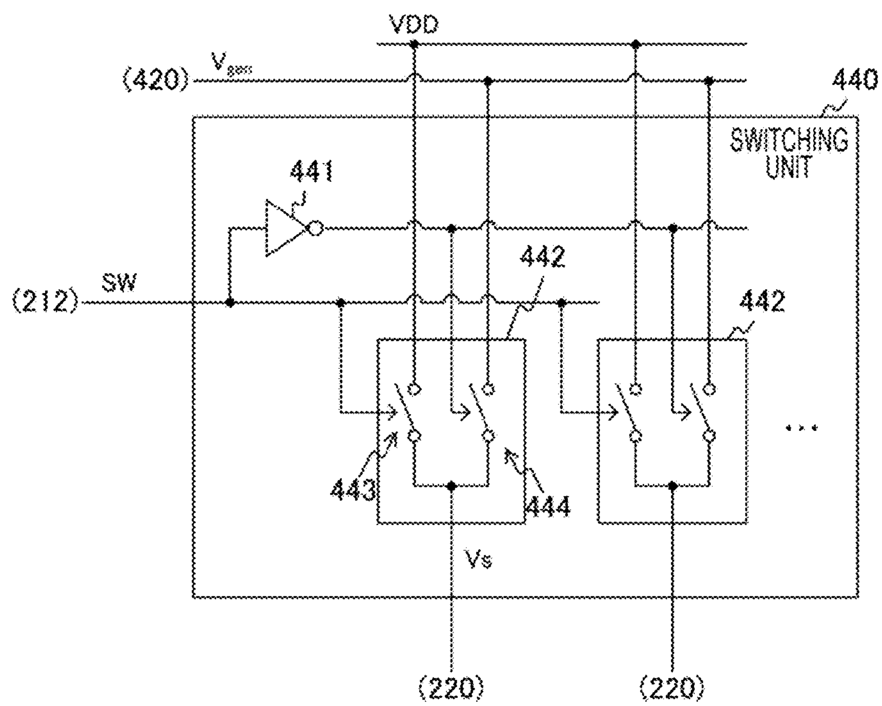

FIG. 42 is a circuit diagram illustrating a configuration example of the dummy pixel 430, the regulator 420, and the switching unit 440 according to the eighth embodiment of the present technology. In the drawing, a indicates a circuit diagram of the dummy pixel 430 and the regulator 420, and b in the drawing indicates a circuit diagram of the switching unit 440.

As illustrated in a of the drawing, the dummy pixel 430 includes a reset transistor 431, an FD 432, an amplification transistor 433, and a current source transistor 434. The reset transistor 431 initializes the FD 432 in accordance with a reset signal RST from the vertical scanning circuit 211. The FD 432 accumulates charges, and generates a voltage corresponding to a Charge amount. The amplification transistor 433 amplifies a level of a voltage of the FD 432 and supplies the amplified voltage as the input voltage Vi to the regulator 420.

Furthermore, the reset transistor 431 and the amplification transistor 433 have their respective sources connected to the power supply voltage VDD. The current source transistor 434 is connected to a drain of the amplification transistor 433. The current source transistor 434 supplies the current id1 under the control of the vertical scanning circuit 211.

The regulator 420 includes a low-pass filter 421, a buffer amplifier 422, and a capacitor element 423. The low-pass filter 421 passes, as an output voltage Vj, a component in a low-frequency band below a predetermined frequency out of a signal of the input voltage Vi.

The output voltage Vj is input to a non-inverting input terminal (+) of the buffer amplifier 422. An inverting input terminal (−) of the buffer amplifier 422 is connected to an output terminal of the buffer amplifier 422. The capacitor element 423 holds a voltage of the output terminal of the buffer amplifier 422 as $V_{gen}$. This $V_{gen}$ is supplied to the switching unit 440.

As illustrated in b of the drawing, the switching unit 440 includes an inverter 441 and a plurality of switching circuits 442. The switching circuits 442 are each disposed for a corresponding one of the columns of the effective pixels 301.

The inverter 441 inverts a switching signal SW sent from the timing control circuit 212. The inverter 441 supplies the inverted signal to each of the switching circuits 442.

The switching circuit 442 selects either the power supply voltage VDD or the generated voltage $V_{gen}$ and supplies the selected voltage as the source voltage Vs to the corresponding column in the pixel array unit 220. The switching circuit 442 includes switches 443 and 444. The switch 443 opens and closes a path between the node of the power supply voltage VDD and the corresponding column in accordance with the switching signal SW. The switch 444 opens and closes a path between the node of the generated voltage $V_{gen}$ and the corresponding column in accordance with the inverted signal of the switching signal SW.

Figure 43:
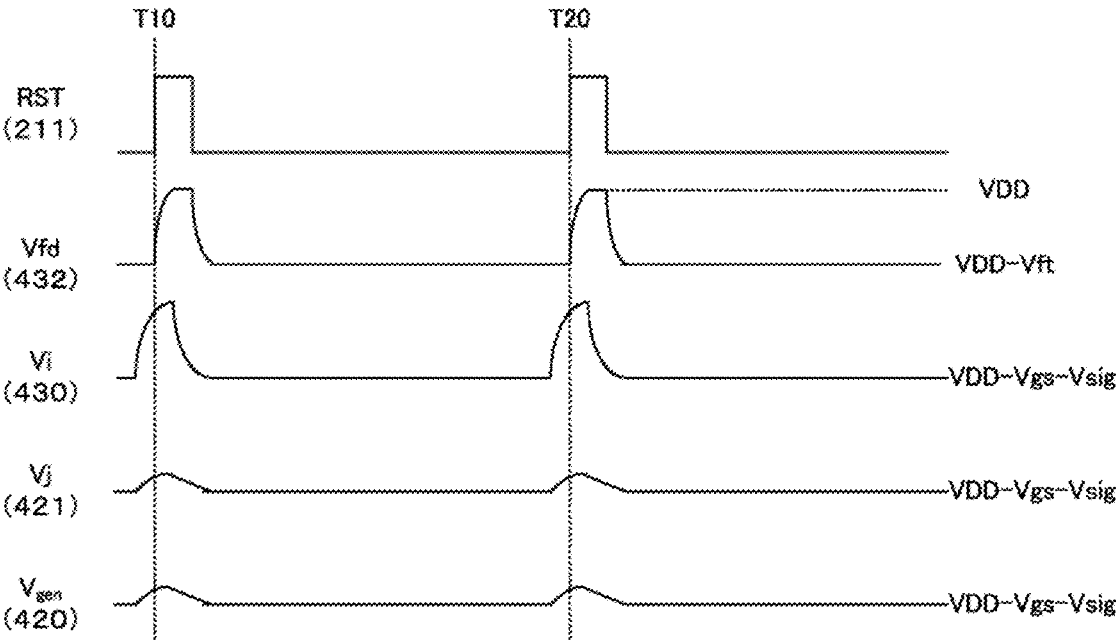
FIG. 43 is a timing chart illustrating an example of an operation of the dummy pixel and the regulator according to the eighth embodiment of the present technology.

FIG. 43 is a timing chart illustrating an example of how the dummy pixel 430 and the regulator 420 operate according to the eighth embodiment of the present technology. At timing T10 immediately before reading of a certain row, the vertical scanning circuit 211 supplies a high-level reset signal RST (here, the power supply voltage VDD) to each of the dummy pixels 430. A potential Vfd of the FD 432 in the dummy pixel 430 is initialized to the power supply voltage VDD. Then, when the reset signal RST becomes the low level, reset feedthrough causes a change to VDD-Vit.

Furthermore, the input voltage Vi decreases to VDD-Vgs-Vsig after the reset. By passing through the low-pass filter 421, Vj and $V_{gen}$ become approximately constant voltages.

After timing T20 immediately before reading of the next row, similar control is performed for each row, and the constant generated voltage $V_{gen}$ is supplied.

Figure 44:
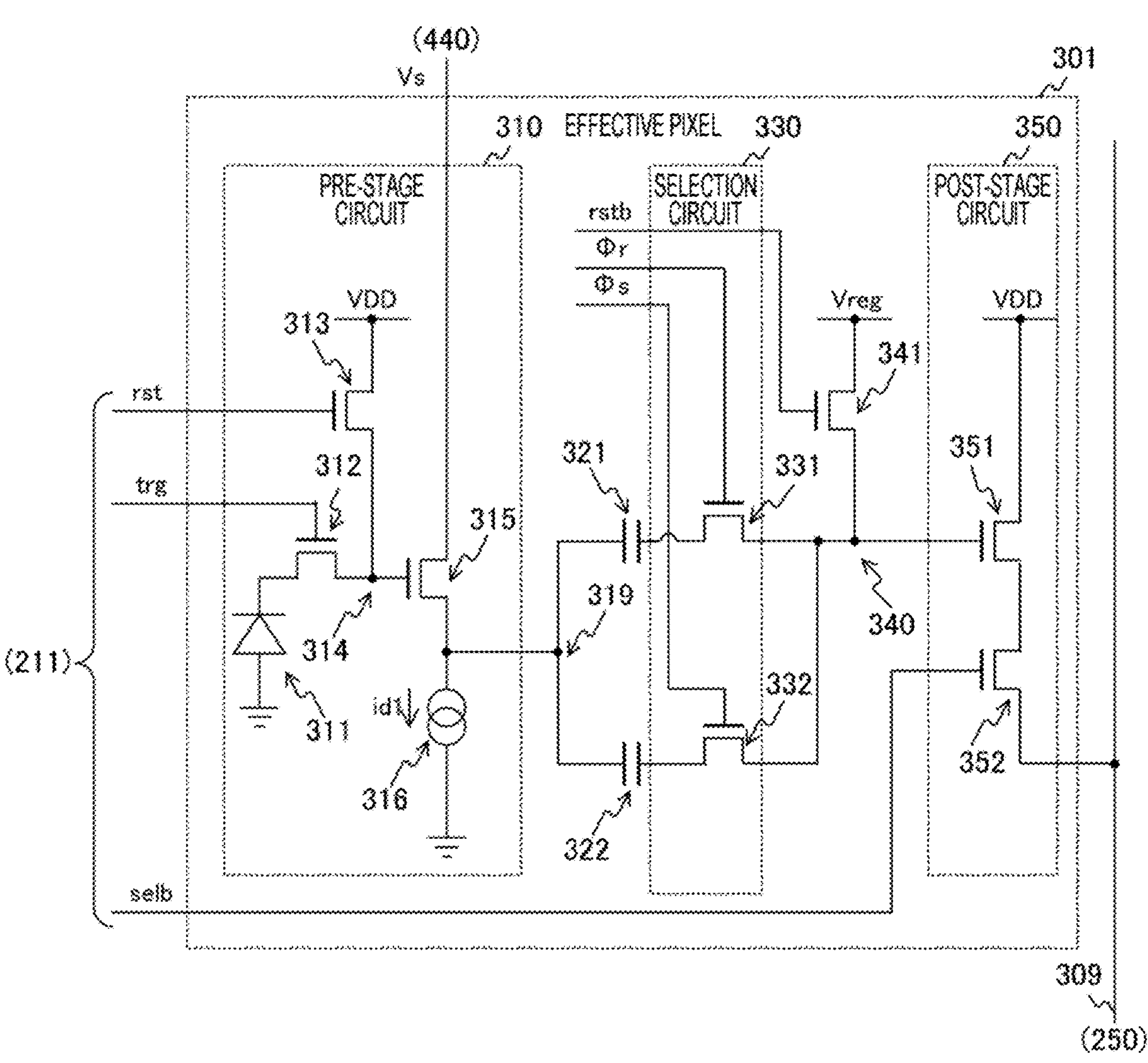
FIG. 44 is a circuit diagram illustrating a configuration example of an effective pixel according to the eighth embodiment of the present technology.

FIG. 44 is a circuit diagram illustrating a configuration example of the effective pixel 301 according to the eighth embodiment of the present technology. The effective pixel 301 is similar in circuit configuration to the pixel 300 of the second embodiment except that the source voltage Vs from the switching unit 440 is supplied to the source of the pre-stage amplification transistor 315.

Figure 45:
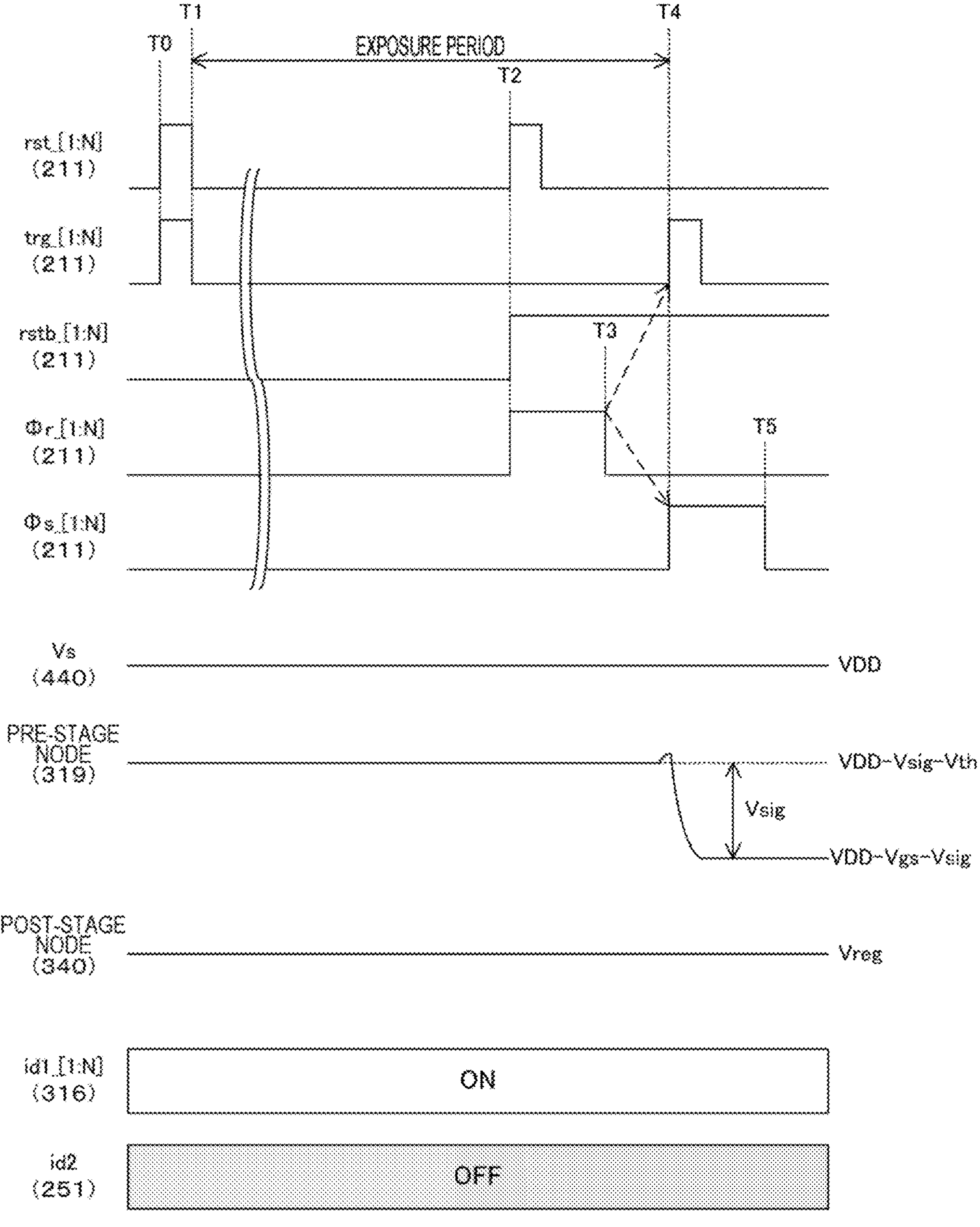
FIG. 45 is a timing chart illustrating an example of a global shutter operation according to the eighth embodiment of the present technology.

FIG. 45 is a timing chart illustrating an example of a global shutter operation according to the eighth embodiment of the present technology. In the eighth embodiment, when all pixels are exposed simultaneously, the switching unit 440 selects the power supply voltage VDD and supplies the power supply voltage VDD as the source voltage Vs. Furthermore, the voltage of the pre-stage node decreases from VDD-Vgs-Vth to VDD-Vgs-Vsig at timing T4. Here, Vth represents a threshold voltage of the transfer transistor 312.

Figure 46:
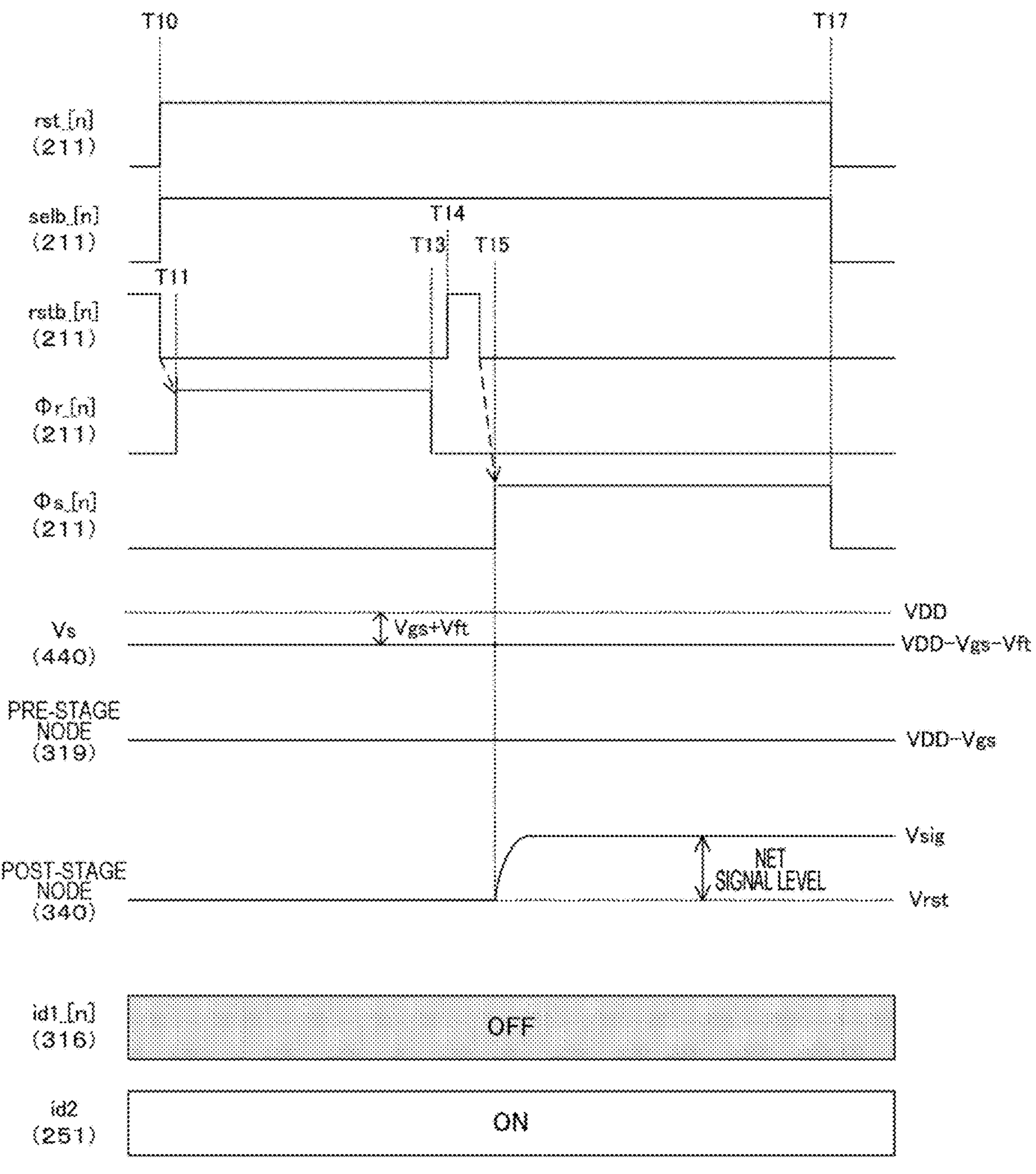
FIG. 46 is a timing chart illustrating an example of a read operation according to the eighth embodiment of the present technology.

FIG. 46 is a timing chart illustrating an example of a read operation according to the eighth embodiment of the present technology. In the eighth embodiment, during reading, the switching unit 440 selects the generated voltage $V_{gen}$ and supplies the generated voltage $V_{gen}$ as the source voltage Vs. The generated voltage $V_{gen}$ is adjusted to VDD-Vgs-Vft. Furthermore, in the eighth embodiment, the vertical scanning circuit 211 controls the current source transistors 316 of all rows (all pixels) to stop the supply of the current id1.

FIG. 47 is a diagram for describing effects according to the eighth embodiment of the present technology. In the first embodiment, the source follower (the pre-stage amplification transistor 315 and the current source transistor 316) of the pixel 300 to be read is turned on during the row-by-row reading. However, there is a possibility that this driving method causes circuit noise of the pre-stage source follower to propagate to the subsequent stages (capacitor element, and post-stage source follower and ADC), and read noise increases accordingly.

For example, in the second embodiment, as illustrated in the drawing, kTC noise generated in a pixel during the global shutter operation is 450 (μVrms).

Furthermore, noise generated in the pre-stage source follower (the pre-stage amplification transistor 315 and the current source transistor 316) during the row-by-row reading is 380 (μVrms). Noise generated in the post-stage source follower and the subsequent stages is 160 (μVrms). Therefore, the total noise is 610 (μVrms). In this way, in the second embodiment, a proportion of the noise of the pre-stage source follower in the total noise becomes relatively large.

In order to reduce the noise of the pre-stage source follower in the eighth embodiment, the voltage (Vs) that can be adjusted is supplied to the source of the pre-stage source follower as described above. During the global shutter (exposure) operation, the switching unit 440 selects the power supply voltage VDD and supplies the selected power supply voltage as the source voltage Vs. Then, after the end of exposure, the switching unit 440 switches the source voltage Vs to VDD-Vgs-Vit. Furthermore, the timing control circuit 212 turns on the pre-stage current source transistor 316 during the global shutter (exposure) operation, and turns off the pre-stage current source transistor 316 after the end of exposure.

As illustrated in FIGS. 45 and 46, the above-described control makes the potential of the pre-stage node during the global shutter operation and the potential during the row-by-row reading identical to each other and thus allows an improvement in PRNU. Furthermore, since the pre-stage source follower is in the off state during the row-by-row reading, circuit noise of the source follower does not occur and becomes zero (μVrms) as illustrated in FIG. 47. Note that, in the pre-stage source follower, the pre-stage amplification transistor 315 is in the on state.

In this way, according to the eighth embodiment of the present technology, since the pre-stage source follower is brought into the off state during reading, noise generated in the source follower can be reduced.

9. Application Example to Mobile Body

The technology according to the present disclosure (the present technology) is applicable to various products. For example, the technology according to the present disclosure may also be realized as a device mounted on any type of mobile body such as an automobile, an electric vehicle, a hybrid electric vehicle, a motorcycle, a bicycle, a personal mobility, an airplane, a drone, a ship, and a robot.

FIG. 48 is a block diagram illustrating a schematic configuration example of a vehicle control system which is an example of a mobile body control system to which the technology according to the present disclosure can be applied.

The vehicle control system 12000 includes a plurality of electronic control units connected to each other via a communication network 12001. In the example illustrated in FIG. 48, the vehicle control system 12000 includes a driving system control unit 12010, a body system control unit 12020, an outside-vehicle information detecting unit 12030, an in-vehicle information detecting unit 12040, and an integrated control unit 12050. Furthermore, as a functional configuration of the integrated control unit 12050, a microcomputer 12051, a sound/image output section 12052, and an in-vehicle network interface (I/F) 12053 are illustrated.

The driving system control unit 12010 controls the operation of devices related to the driving system of the vehicle in accordance with various kinds of programs. For example, the driving system control unit 12010 functions as a control device for a driving force generating device for generating the driving force of the vehicle, such as an internal combustion engine, a driving motor, or the like, a driving force transmitting mechanism for transmitting the driving force to wheels, a steering mechanism for adjusting the steering angle of the vehicle, a braking device for generating the braking force of the vehicle, and the like.

The body system control unit 12020 controls the operation of various kinds of devices provided to a vehicle body in accordance with various kinds of programs. For example, the body system control unit 12020 functions as a control device for a keyless entry system, a smart key system, a power window device, or various kinds of lamps such as a headlamp, a backup lamp, a brake lamp, a turn signal, a fog lamp, or the like. In this case, radio waves transmitted from a mobile device as an alternative to a key or signals of various kinds of switches can be input to the body system control unit 12020. The body system control unit 12020 receives these input radio waves or signals, and controls a door lock device, the power window device, the lamps, or the like of the vehicle.

The outside-vehicle information detecting unit 12030 detects information about the outside of the vehicle including the vehicle control system 12000. For example, the outside-vehicle information detecting unit 12030 is connected with an imaging section 12031. The outside-vehicle information detecting unit 12030 makes the imaging section 12031 image an image of the outside of the vehicle, and receives the imaged image. On the basis of the received image, the outside-vehicle information detecting unit 12030 may perform processing of detecting an object such as a human, a vehicle, an obstacle, a sign, a character on a road surface, or the like, or processing of detecting a distance thereto.

The imaging section 12031 is an optical sensor that receives light, and which outputs an electric signal corresponding to a received light amount of the light. The imaging section 12031 can output the electric signal as an image, or can output the electric signal as information about a measured distance. In addition, the light received by the imaging section 12031 may be visible light, or may be invisible light such as infrared rays or the like.

The in-vehicle information detecting unit 12040 detects information about the inside of the vehicle. The in-vehicle information detecting unit 12040 is, for example, connected with a driver state detecting section 12041 that detects the state of a driver. The driver state detecting section 12041, for example, includes a camera that images the driver. On the basis of detection information input from the driver state detecting section 12041, the in-vehicle information detecting unit 12040 may calculate a degree of fatigue of the driver or a degree of concentration of the driver, or may determine whether the driver is dozing.

The microcomputer 12051 can calculate a control target value for the driving force generating device, the steering mechanism, or the braking device on the basis of the information about the inside or outside of the vehicle which information is obtained by the outside-vehicle information detecting unit 12030 or the in-vehicle information detecting unit 12040, and output a control command to the driving system control unit 12010. For example, the microcomputer 12051 can perform cooperative control intended to implement functions of an advanced driver assistance system (ADAS) which functions include collision avoidance or shock mitigation for the vehicle, following driving based on a following distance, vehicle speed maintaining driving, a warning of collision of the vehicle, a warning of deviation of the vehicle from a lane, or the like.

In addition, the microcomputer 12051 can perform cooperative control intended for automated driving, which makes the vehicle to travel automatedly without depending on the operation of the driver, or the like, by controlling the driving force generating device, the steering mechanism, the braking device, or the like on the basis of the information about the outside or inside of the vehicle which information is obtained by the outside-vehicle information detecting unit 12030 or the in-vehicle information detecting unit 12040.

Furthermore, the microcomputer 12051 can output a control command to the body system control unit 12020 on the basis of the vehicle exterior information acquired by the outside-vehicle information detecting unit 12030. For example, the microcomputer 12051 can perform cooperative control intended to prevent a glare by controlling the headlamp so as to change from a high beam to a low beam, for example, in accordance with the position of a preceding vehicle or an oncoming vehicle detected by the outside-vehicle information detecting unit 12030.

The sound/image output section 12052 transmits an output signal of at least one of a sound and an image to an output device capable of visually or auditorily notifying information to an occupant of the vehicle or the outside of the vehicle. In the example of FIG. 48, an audio speaker 12061, a display section 12062, and an instrument panel 12063 are illustrated as the output device. The display section 12062 may, for example, include at least one of an on-board display and a head-up display.

Figure 49:
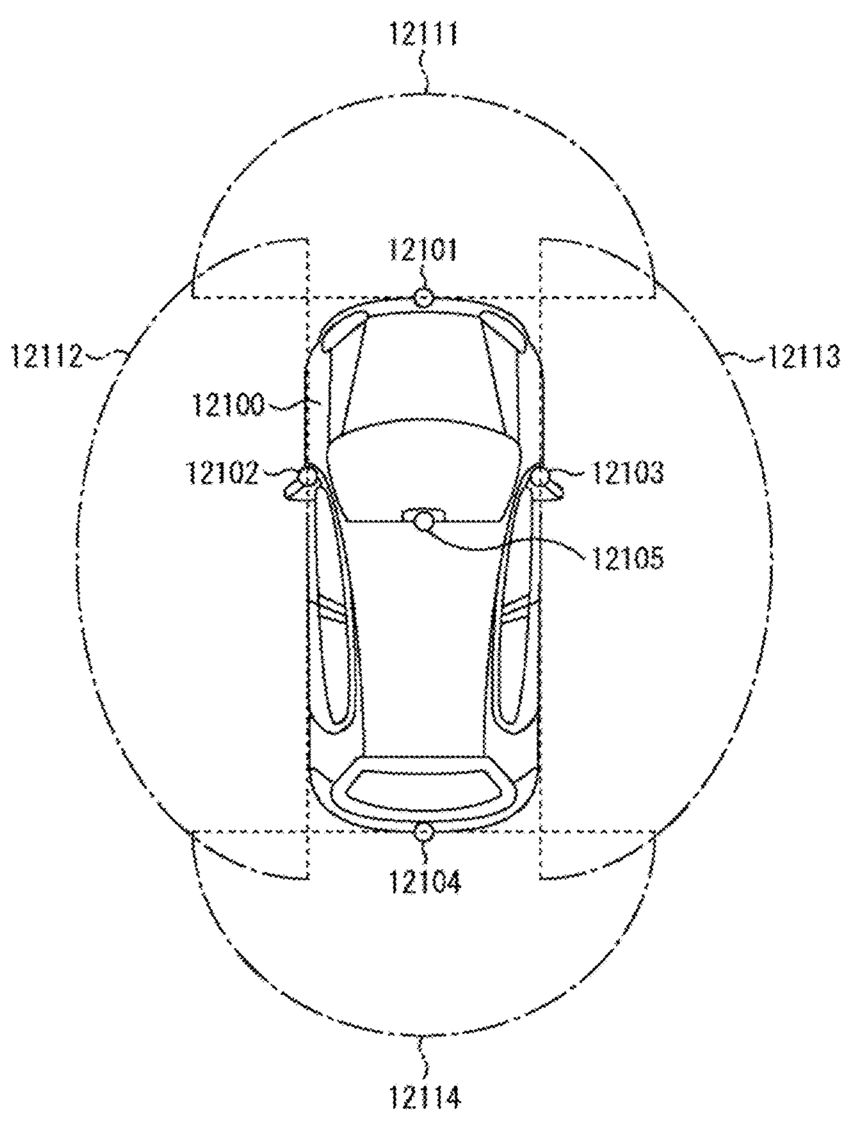
FIG. 49 is an explanatory view illustrating an example of an installation position of an imaging section.

FIG. 49 is a diagram illustrating an example of the installation position of the imaging section 12031.

In FIG. 49, the imaging section 12031 includes imaging sections 12101, 12102, 12103, 12104, and 12105.

The imaging sections 12101, 12102, 12103, 12104, and 12105 are, for example, provided at positions on a front nose, sideview mirrors, a rear bumper, and a back door of the vehicle 12100 as well as a position on an upper portion of a windshield within the interior of the vehicle, for example. The imaging section 12101 provided to the front nose and the imaging section 12105 provided to the upper portion of the windshield within the interior of the vehicle obtain mainly an image of the front of the vehicle 12100. The imaging sections 12102 and 12103 provided to the sideview mirrors obtain mainly an image of the sides of the vehicle 12100. The imaging section 12104 provided to the rear bumper or the back door obtains mainly an image of the rear of the vehicle 12100. The imaging section 12105 provided to the upper portion of the windshield within the interior of the vehicle is used mainly to detect a preceding vehicle, a pedestrian, an obstacle, a signal, a traffic sign, a lane, or the like.

Note that FIG. 49 illustrates an example of imaging ranges of the imaging sections 12101 to 12104. An imaging range 12111 represents the imaging range of the imaging section 12101 provided to the front nose. Imaging ranges 12112 and 12113 respectively represent the imaging ranges of the imaging sections 12102 and 12103 provided to the sideview mirrors. An imaging range 12114 represents the imaging range of the imaging section 12104 provided to the rear bumper or the back door. A bird's-eye image of the vehicle 12100 as viewed from above is obtained by superimposing image data imaged by the imaging sections 12101 to 12104, for example.

At least one of the imaging sections 12101 to 12104 may have a function of obtaining distance information. For example, at least one of the imaging sections 12101 to 12104 may be a stereo camera constituted of a plurality of imaging elements, or may be an imaging element having pixels for phase difference detection.

For example, the microcomputer 12051 can determine a distance to each three-dimensional object within the imaging ranges 12111 to 12114 and a temporal change in the distance (relative speed with respect to the vehicle 12100) on the basis of the distance information obtained from the imaging sections 12101 to 12104, and thereby extract, as a preceding vehicle, a nearest three-dimensional object in particular that is present on a traveling path of the vehicle 12100 and which travels in substantially the same direction as the vehicle 12100 at a predetermined speed (for example, equal to or more than 0 km/hour). Further, the microcomputer 12051 can set a following distance to be maintained in front of a preceding vehicle in advance, and perform automatic brake control (including following stop control), automatic acceleration control (including following start control), or the like. It is thus possible to perform cooperative control intended for automated driving that makes the vehicle travel automatedly without depending on the operation of the driver or the like.

For example, the microcomputer 12051 can classify three-dimensional object data on three-dimensional objects into three-dimensional object data of a two-wheeled vehicle, a standard-sized vehicle, a large-sized vehicle, a pedestrian, a utility pole, and other three-dimensional objects on the basis of the distance information obtained from the imaging sections 12101 to 12104, extract the classified three-dimensional object data, and use the extracted three-dimensional object data for automatic avoidance of an obstacle. For example, the microcomputer 12051 identifies obstacles around the vehicle 12100 as obstacles that the driver of the vehicle 12100 can recognize visually and obstacles that are difficult for the driver of the vehicle 12100 to recognize visually. Then, the microcomputer 12051 determines a collision risk indicating a risk of collision with each obstacle. In a situation in which the collision risk is equal to or higher than a set value and there is thus a possibility of collision, the microcomputer 12051 outputs a warning to the driver via the audio speaker 12061 or the display section 12062, and performs forced deceleration or avoidance steering via the driving system control unit 12010. The microcomputer 12051 can thereby assist in driving to avoid collision.

At least one of the imaging sections 12101 to 12104 may be an infrared camera that detects infrared rays. The microcomputer 12051 can, for example, recognize a pedestrian by determining whether or not there is a pedestrian in imaged images of the imaging sections 12101 to 12104. Such recognition of a pedestrian is, for example, performed by a procedure of extracting characteristic points in the imaged images of the imaging sections 12101 to 12104 as infrared cameras and a procedure of determining whether or not it is the pedestrian by performing pattern matching processing on a series of characteristic points representing the contour of the object. When the microcomputer 12051 determines that there is a pedestrian in the imaged images of the imaging sections 12101 to 12104, and thus recognizes the pedestrian, the sound/image output section 12052 controls the display section 12062 so that a square contour line for emphasis is displayed so as to be superimposed on the recognized pedestrian. The sound/image output section 12052 may also control the display section 12062 so that an icon or the like representing the pedestrian is displayed at a desired position.

An example of the vehicle control system to which the technology according to the present disclosure can be applied has been described above. The technology according to the present disclosure may be applied to the imaging section 12031 among the configurations described above. Specifically, for example, the imaging device 100 in FIG. 1 can be applied to the imaging section 12031. By applying the technology according to the present disclosure to the imaging section 12031, it is possible to obtain a captured image that is easier to view, thereby making it possible to reduce driver fatigue.

Note that the embodiments described above are examples for embodying the present technology, and the matters in the embodiments and the matters used to specify the invention in the claims have a corresponding relationship. Similarly, there is a correspondence relationship between the matters specifying the invention in claims and the matters in the embodiments of the present technology having the same names. However, the present technology is not limited to the embodiments, and can be embodied by applying various modifications to the embodiments without departing from the gist thereof.

Note that, the effects described in the present specification are merely examples and are not limiting, and other effects may also be present.

Note that the present technology may also have the following configuration.

(1) A solid-state imaging element including:

a plurality of pixels each provided with a sample-and-hold circuit that holds a pixel signal;

a signal processing unit that generates a first digital signal by performing signal processing on each of the held pixel signals and generates a second digital signal by performing the signal processing on each of the held pixel signals;

a metadata extraction unit that extracts predetermined metadata from the first digital signal; and an image processing unit that performs predetermined image processing on the second digital signal using the metadata.

(2) The solid-state imaging element according to (1), in which the metadata extraction unit performs recognition processing of recognizing a predetermined object on a frame in which the first digital signals are arranged, and generates data indicating a result of the recognition processing as the metadata.

(3) The solid-state imaging element according to (1) or (2), in which the metadata indicates a predetermined region, and the image processing unit performs processing of replacing a color in the region with a specific color.

(4) The solid-state imaging element according to (1) or (2), in which the metadata indicates a predetermined region, and the image processing unit performs mosaic processing on the region.

(5) The solid-state imaging element according to (1) or (2), in which the metadata indicates a predetermined region, and the image processing unit extracts the region as a region of interest from a frame in which the second digital signals are arranged.

(6) The solid-state imaging element according to any one of (1) to (5), in which each of the plurality of pixels includes:

a pre-stage circuit that generates a pixel signal;

a sample-and-hold circuit that holds the pixel signal; and a post-stage circuit that reads the pixel signal from the sample-and-hold circuit and outputs the read pixel signal.

(7) The solid-state imaging element according to (6), in which the sample-and-hold circuit includes:

first and second capacitor elements; and a selection circuit that sequentially performs control to connect one of the first and second capacitor elements to a predetermined post-stage node and control to connect another of the first and second capacitor elements to the post-stage node.

(8) The solid-state imaging element according to (7), in which the selection circuit sequentially performs control to connect one of the first and second capacitor elements to a predetermined post-stage node, control to disconnect both the first and second capacitor elements from the post-stage node, and control to connect another of the first and second capacitor elements to the post-stage node.

(9) The solid-state imaging element according to (8), in which each of the plurality of pixels further includes a post-stage reset transistor that initializes a level of the post-stage node when both the first and second capacitor elements are disconnected from the post-stage node.

(10) An imaging device including:

a plurality of pixels each provided with a sample-and-hold circuit that holds a pixel signal;

a signal processing unit that generates a first digital signal by performing signal processing on each of the held pixel signals and generates a second digital signal by performing the signal processing on each of the held pixel signals;

a metadata extraction unit that extracts predetermined metadata from the first digital signal;

an image processing unit that performs predetermined image processing on the second digital signal using the metadata; and a recording unit that records a frame in which the second digital signals subjected to the processing are arranged.

(11) A method for controlling a solid-state imaging element, the method including:

a signal processing procedure in which an analog-to-digital conversion unit generates a first digital signal by performing signal processing on a pixel signal held in each of a plurality of pixels, each of which is provided with a sample-and-hold circuit that holds the pixel signal, and generates a second digital signal by performing the signal processing on each of the held pixel signals;

a metadata extraction procedure in which a metadata extraction unit extracts predetermined metadata from the first digital signal; and an image signal processing procedure in which an image processing unit performs predetermined image processing on the second digital signal using the metadata.

REFERENCE SIGNS LIST

100 Imaging device
110 Imaging lens
120 Recording unit
130 Imaging control unit
200 Solid-state imaging element
201 Upper pixel chip
202 Lower pixel chip
203 Circuit chip
211 Vertical scanning circuit
212 Timing control circuit
213 DAC
220 Pixel array unit
221 Upper pixel array unit
222 Lower pixel array unit
250 Load MOS circuit block
251 Load MOS transistor
260 Column signal processing circuit
261 Signal processing unit
262, 270 ADC
271 Counter
280 Comparator
281, 292 Selector
282, 283, 321, 322 Capacitor element
284, 286 Auto-zero switch
285 Comparator element
291 CDS processing unit
300 Pixel
301 Effective pixel
310 Pre-stage circuit
311 Photoelectric conversion element
312 Transfer transistor
313 FD reset transistor
314 FD
315 Pre-stage amplification transistor
316 Current source transistor
317 Discharge transistor
320 Sample-and-hold circuit
323 Pre-stage reset transistor
324 Pre-stage selection transistor
330 Selection circuit
331, 331-1, 331-2, 332, 332-1, 332-2 Selection transistor
333 Sampling transistor
341 Post-stage reset transistor
350, 350-1, 350-2 Post-stage circuit
351, 351-1, 351-2 Post-stage amplification transistor
352, 352-1, 352-2 Post-stage selection transistor
400 Logic circuit
401 Column interface
402 Image processing unit
403 ISP circuit
404 Metadata extraction unit
405 Work memory
410 High-speed interface
420 Regulator
421 Low-pass filter
422 Buffer amplifier
423 Capacitor element
430 Dummy pixel
431 Reset transistor
432 ED
433 Amplification transistor
434 Current source transistor
440 Switching unit
441 Inverter
442 Switching circuit
443, 444 Switch
12031 Imaging section

The invention claimed is:

1. A solid-state imaging element comprising:

a plurality of pixels, the pixels respectively including a sample-and-hold circuit that holds a pixel signal to collectively provide held pixel signals; and at least one processing circuit configured to:

generate a first digital signal by executing a predetermined signal processing on the held pixel signals for an exposure event;

generate a second digital signal by again executing the predetermined signal processing on the held pixel signals for the exposure event;

extract predetermined metadata from the first digital signal; and perform predetermined image processing on the second digital signal using the metadata.

2. The solid-state imaging element according to claim 1, wherein the at least one processing circuit is configured to:

perform recognition processing of recognizing a predetermined object on a frame corresponding to the first digital signals, and generates data indicating a result of the recognition processing as the metadata.

3. The solid-state imaging element according to claim 1, wherein the metadata indicates a predetermined region, and the at least one processing circuit is configured to perform processing of replacing a color in the region with a specific color.

4. The solid-state imaging element according to claim 1, wherein the metadata indicates a predetermined region, and the at least one processing circuit is configured to perform mosaic processing on the region.

5. The solid-state imaging element according to claim 1, wherein the metadata indicates a predetermined region, and the at least one processing circuit is configured to extract the region as a region of interest from a frame corresponding to the second digital signal.

6. The solid-state imaging element according to claim 1, wherein each of the plurality of pixels includes:

a pre-stage circuit that generates a pixel signal;

a sample-and-hold circuit that holds the pixel signal; and a post-stage circuit that reads the pixel signal from the sample-and-hold circuit and outputs the read pixel signal.

7. The solid-state imaging element according to claim 6, wherein the sample-and-hold circuit includes:

first and second capacitor elements; and a selection circuit that sequentially performs control to connect one of the first and second capacitor elements to a predetermined post-stage node and control to connect another of the first and second capacitor elements to the post-stage node.

8. The solid-state imaging element according to claim 7, wherein the selection circuit sequentially performs control to connect one of the first and second capacitor elements to a predetermined post-stage node, control to disconnect both the first and second capacitor elements from the post-stage node, and control to connect another of the first and second capacitor elements to the post-stage node.

9. The solid-state imaging element according to claim 8, wherein each of the plurality of pixels further includes a post-stage reset transistor that initializes a level of the post-stage node when both the first and second capacitor elements are disconnected from the post-stage node.

10. A method for controlling a solid-state imaging element, the method comprising:

receiving held pixel signals for a plurality of pixels for an exposure event;

generating a first digital signal by executing a predetermined signal processing on the held pixel signals for the exposure event;

generating a second digital signal by again executing the predetermined signal processing on the held pixel signals for the exposure event;

extracting predetermined metadata from the first digital signal; and performing predetermined image processing on the second digital signal using the metadata.

11. The method for controlling a solid-state imaging element according to claim 10, further comprising:

performing recognition processing of recognizing a predetermined object on a frame that corresponds to the first digital signal, and generating data indicating a result of the recognition processing as the metadata.

12. The method for controlling a solid-state imaging element according to claim 10, wherein the metadata indicates a predetermined region, and further comprising:

performing processing of replacing a color in the predetermined region with a specific color.

13. The method for controlling a solid-state imaging element according to claim 10, wherein the metadata indicates a predetermined region, and further comprising:

extracting the predetermined region as a region of interest from a frame that corresponds to the second digital signal.

14. A non-transitory computer readable medium storing a program for controlling a solid-state imaging element, the program being executable by a processor to perform operations comprising:

receiving held pixel signals for a plurality of pixels for an exposure event;

generating a first digital signal by executing a predetermined signal processing on the held pixel signals for the exposure event;

generating a second digital signal by again executing the predetermined signal processing on the held pixel signals for the exposure event;

extracting predetermined metadata from the first digital signal; and performing predetermined image processing on the second digital signal using the metadata.

15. The non-transitory computer readable medium according to claim 14, further comprising:

performing recognition processing of recognizing a predetermined object on a frame that corresponds to the first digital signal, and generating data indicating a result of the recognition processing as the metadata.

16. The non-transitory computer readable medium according to claim 14, wherein the metadata indicates a predetermined region, and further comprising:

performing processing of replacing a color in the predetermined region with a specific color.

17. The non-transitory computer readable medium according to claim 14, wherein the metadata indicates a predetermined region, and further comprising:

extracting the predetermined region as a region of interest from a frame that corresponds to the second digital signal.

* * * * *